(12) United States Patent
Hayashi et al.

(10) Patent No.: US 11,336,844 B2
(45) Date of Patent: May 17, 2022

(54) IMAGING DEVICE, IMAGING SYSTEM, AND MOVABLE OBJECT

(71) Applicant: CANON KABUSHIKI KAISHA, Tokyo (JP)

(72) Inventors: Hidetoshi Hayashi, Fujisawa (JP); Katsuhito Sakurai, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/541,485

(22) Filed: Aug. 15, 2019

(65) Prior Publication Data
US 2020/0068147 A1    Feb. 27, 2020

(30) Foreign Application Priority Data

Aug. 23, 2018  (JP) .............................. JP2018-156189

(51) Int. Cl.
  *H04N 5/353*    (2011.01)
  *H04N 5/378*    (2011.01)
  *H04N 5/3745*   (2011.01)
  *H04N 5/341*    (2011.01)
  *G06T 7/55*     (2017.01)

(52) U.S. Cl.
  CPC ............. *H04N 5/3535* (2013.01); *G06T 7/55* (2017.01); *H04N 5/341* (2013.01); *H04N 5/378* (2013.01); *H04N 5/37452* (2013.01)

(58) Field of Classification Search
  CPC .. H04N 5/3535; H04N 5/341; H04N 5/37452; H04N 5/378; G06T 7/55
  See application file for complete search history.

(56) References Cited

U.S. PATENT DOCUMENTS 6,188,094 B1    2/2001  Kochi
6,605,850 B1    8/2003  Kochi
(Continued)

FOREIGN PATENT DOCUMENTS

CN    101675657 A    3/2010
CN    105100650 A    11/2015
(Continued)

OTHER PUBLICATIONS

Chinese Search Report dated Jan. 14, 2022 in corresponding Chinese Application No. 201910766356.9 (English translation included).

*Primary Examiner* — Zaihan Jiang
(74) *Attorney, Agent, or Firm* — Venable LLP

(57) ABSTRACT

An imaging device includes a plurality of pixels arranged to form a plurality of rows and a plurality of columns and each including a photoelectric converter, an accumulation time controller that controls accumulation time of the plurality of pixels, and an amplifier that amplifies a signal based on charge generated by the photoelectric converter. The plurality of pixels are divided into a plurality of pixel blocks each including at least two of the plurality of pixels, the accumulation time controller is configured to control the accumulation time individually for the plurality of pixel blocks, and the amplifier is configured to output, for one pixel block of the plurality of blocks, a plurality of signals which are amplified at different gains and correspond to accumulation time of a common frame.

35 Claims, 29 Drawing Sheets

(56) References Cited

U.S. PATENT DOCUMENTS

| | | |
|---|---|---|
| 6,670,990 B1 | 12/2003 | Kochi |
| 6,946,637 B2 | 9/2005 | Kochi |
| 6,960,751 B2 | 11/2005 | Hiyama |
| 7,110,030 B1 | 9/2006 | Kochi |
| 7,187,052 B2 | 3/2007 | Okita |
| 7,429,764 B2 | 9/2008 | Koizumi |
| 7,466,003 B2 | 12/2008 | Ueno |
| 7,531,885 B2 | 5/2009 | Okita |
| 7,538,810 B2 | 5/2009 | Koizumi |
| 7,547,871 B2 | 6/2009 | Hiyama |
| 7,679,658 B2 | 3/2010 | Sakurai |
| 7,872,286 B2 | 1/2011 | Okita |
| 8,040,400 B2 | 10/2011 | Hayashi |
| 8,089,545 B2 | 1/2012 | Koizumi |
| 8,159,585 B2 | 4/2012 | Parks |
| 8,421,894 B2 | 4/2013 | Koizumi |
| 8,670,058 B2 | 3/2014 | Hayashi |
| 8,754,978 B2 | 6/2014 | Hayashi |
| 8,883,526 B2 | 11/2014 | Okita |
| 9,762,840 B2 | 9/2017 | Yamazaki |
| 10,057,515 B2 | 8/2018 | Kobayashi |
| 10,334,198 B2 * | 6/2019 | Aoki .................. H01L 27/14643 |
| 10,382,707 B2 | 8/2019 | Totsuka |
| 10,504,949 B2 | 12/2019 | Kobayashi |
| 10,728,439 B2 | 7/2020 | Nakayama |
| 2005/0185079 A1 * | 8/2005 | Zarnowski ........... H04N 1/1934 348/308 |
| 2007/0040100 A1 * | 2/2007 | Zarnowski ......... H04N 5/37457 250/208.1 |
| 2009/0002520 A1 | 1/2009 | Yoshida |
| 2009/0284591 A1 * | 11/2009 | Tsuchiya ................... G03F 1/84 348/92 |
| 2009/0310001 A1 * | 12/2009 | Masuyama ............ H04N 5/369 348/300 |
| 2010/0079611 A1 * | 4/2010 | Suzuki .................. H04N 5/369 348/222.1 |
| 2012/0033118 A1 * | 2/2012 | Lee .................... H04N 5/37452 348/296 |
| 2012/0113290 A1 * | 5/2012 | Nakata ............. H01L 27/14812 348/222.1 |
| 2013/0057744 A1 * | 3/2013 | Minagawa ......... H04N 5/37457 348/311 |
| 2013/0181118 A1 | 7/2013 | Koizumi |
| 2014/0362271 A1 * | 12/2014 | Kanagawa ......... H04N 5/37455 348/308 |
| 2015/0373287 A1 | 12/2015 | Uchida |
| 2016/0112644 A1 * | 4/2016 | Nishi .................... H04N 5/379 348/222.1 |
| 2016/0219229 A1 * | 7/2016 | Kimura .................. H04N 5/357 |
| 2017/0214864 A1 * | 7/2017 | Izuha .................... H04N 5/341 |
| 2018/0295274 A1 * | 10/2018 | Nakayama ........ H01L 27/14643 |
| 2018/0332276 A1 | 11/2018 | Hayashi |
| 2019/0013969 A1 * | 1/2019 | Hong .................. H04W 84/045 |
| 2019/0057999 A1 * | 2/2019 | Hatabu ............... H01L 27/1461 |

FOREIGN PATENT DOCUMENTS

| | | |
|---|---|---|
| JP | 2006-197192 | 7/2006 |
| JP | 2018-61192 A | 4/2018 |
| WO | 2017/104765 A1 | 6/2017 |

\* cited by examiner

IMAGING DEVICE, IMAGING SYSTEM, AND MOVABLE OBJECT

BACKGROUND OF THE INVENTION

Field of the Invention

The present invention relates to an imaging device, an imaging system, and a movable object.

Description of the Related Art

Japanese Patent Application Laid-Open No. 2006-197192 discloses an imaging device configured to divide a single screen into a plurality of pixel blocks, detect motion on a pixel block basis, and control exposure time, respectively.

In the imaging device disclosed in Japanese Patent Application Laid-Open No. 2006-197192, however, when an object having a bright spot moves in any one pixel block which is dark as a whole, the exposure time is controlled to be shorter in accordance with such an object. Thus, the background of such a pixel block becomes darker due to influence of the shortened exposure time, which may cause blacked up shadows. Further, when a dark object moves in any one pixel block which is bright as a whole, the exposure time is controlled to be longer in accordance with such an object. Thus, the background of such a pixel block becomes brighter due to influence of the lengthened exposure time, which may cause blown out highlights. Therefore, in the imaging device disclosed in Japanese Patent Application Laid-Open No. 2006-197192, even when exposure time is determined suitably for each pixel block, it is difficult to acquire a suitable image over a background to an object.

SUMMARY OF THE INVENTION

The present invention intends to provide an imaging device and an imaging system that may control exposure time for each pixel block and that may suppress blacked up shadows and blown out highlights over an object to a background and prevent a reduction in accuracy of motion body detection.

According to one aspect of the present invention, provided is an imaging device including a plurality of pixels arranged to form a plurality of rows and a plurality of columns and each including a photoelectric converter, an accumulation time controller that controls a length of accumulation time of the plurality of pixels, and an amplifier that amplifies a signal based on charge generated by the photoelectric converter, wherein the plurality of pixels are divided into a plurality of pixel blocks each including at least two of the plurality of pixels, wherein the accumulation time controller is configured to control the accumulation time individually for the plurality of pixel blocks, and wherein the amplifier is configured to output, for one pixel block of the plurality of pixel blocks, a plurality of signals which are amplified at different gains and correspond to accumulation time of a common frame.

Further, according to another aspect of the present invention, provided is an imaging device including a plurality of pixels arranged to form a plurality of rows and a plurality of columns and each including a photoelectric converter, an accumulation time controller that controls a length of accumulation time of the plurality of pixels, and an analog-to-digital (AD) converter that performs AD conversion on an analog signal generated by the pixel, wherein the plurality of pixels are divided into a plurality of pixel blocks each including at least two of the plurality of pixels, wherein the accumulation time controller is configured to control the accumulation time individually for the plurality of pixel blocks, and wherein the AD converter is configured to output, for one pixel block of the plurality of pixel blocks, a plurality of digital signals which are obtained by AD conversion of different conversion gains and correspond to accumulation time of a common frame.

Further, according to yet another aspect of the present invention, provided is an imaging device including a plurality of pixels arranged to form a plurality of rows and a plurality of columns and each including a photoelectric converter, an accumulation time controller that controls a length of accumulation time of the plurality of pixels, and an analog-to-digital (AD) converter that performs AD conversion on an analog signal generated by the pixel, wherein the plurality of pixels are divided into a plurality of pixel blocks each including at least two of the plurality of pixels, wherein the accumulation time controller is configured to control the accumulation time individually for the plurality of pixel blocks, and wherein the AD converter is configured to output, for one pixel block of the plurality of pixel blocks, a plurality of digital signals which are obtained by AD conversion using a plurality of ramp signals having different slopes and correspond to accumulation time of a common frame.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
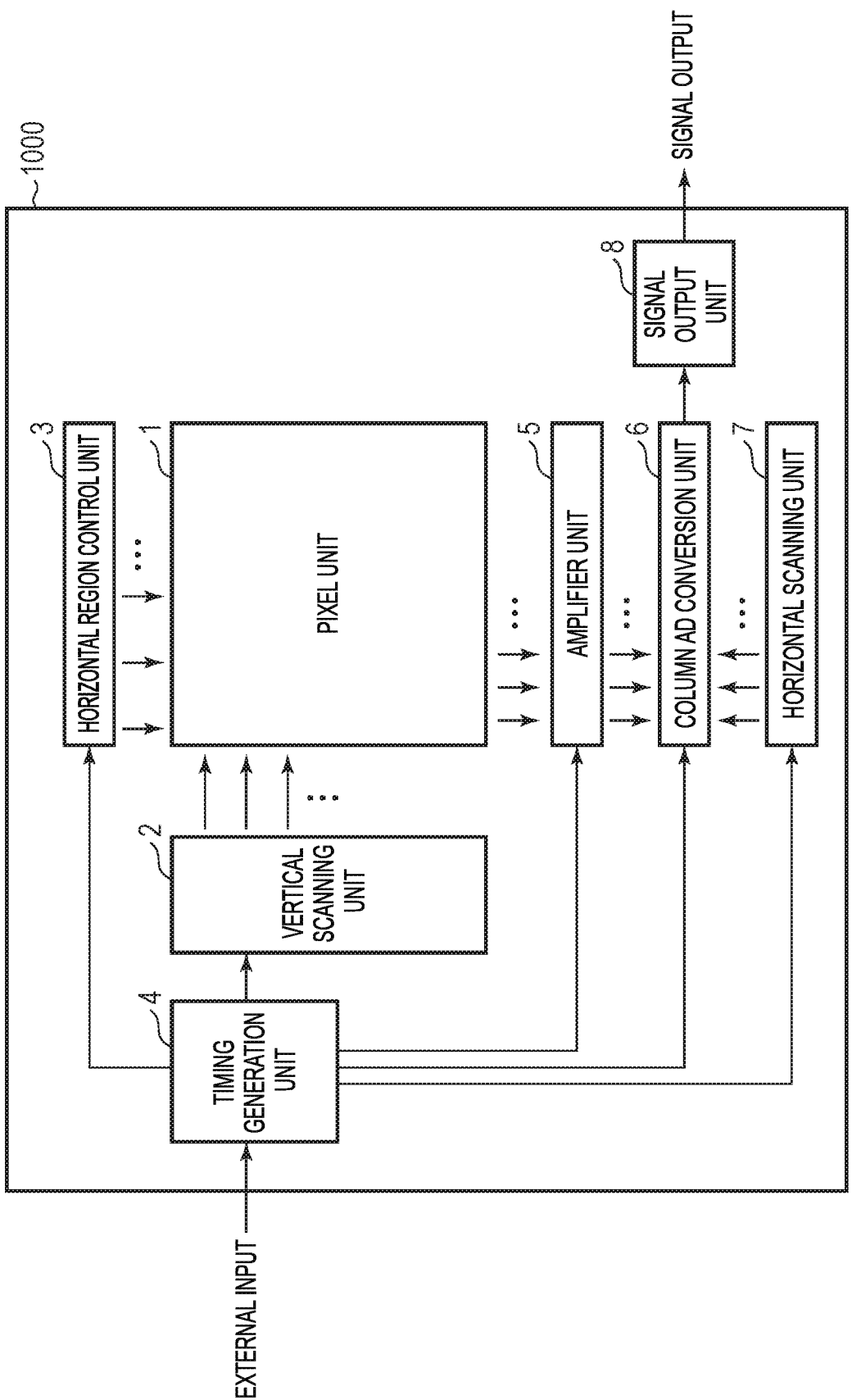
FIG. 1 is a block diagram illustrating a general configuration of an imaging device according to a first embodiment of the present invention.
Figure 2:
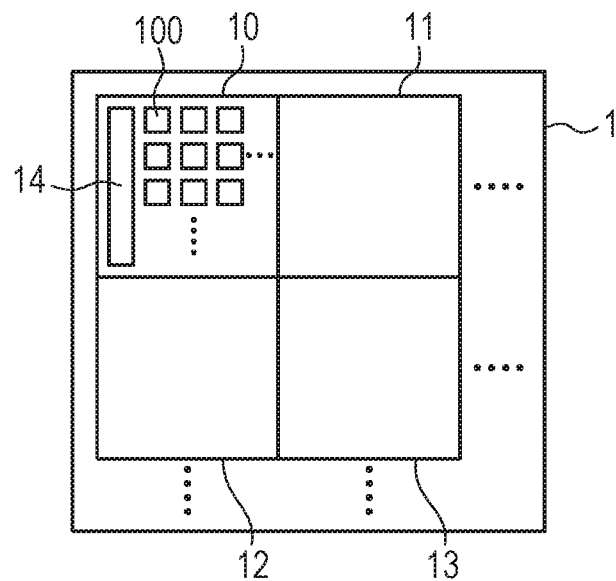
FIG. 2 is a block diagram illustrating a configuration example of a pixel unit in the imaging device according to the first embodiment of the present invention.
Figure 3:
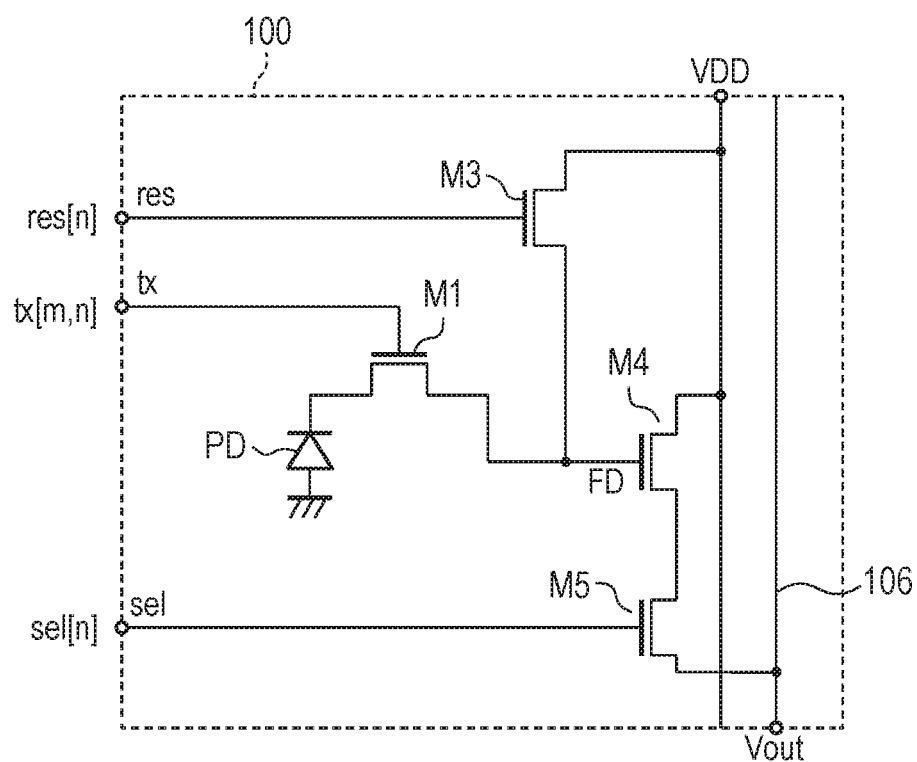
FIG. 3 is a circuit diagram illustrating a configuration example of a pixel in the imaging device according to the first embodiment of the present invention.
Figure 4A:
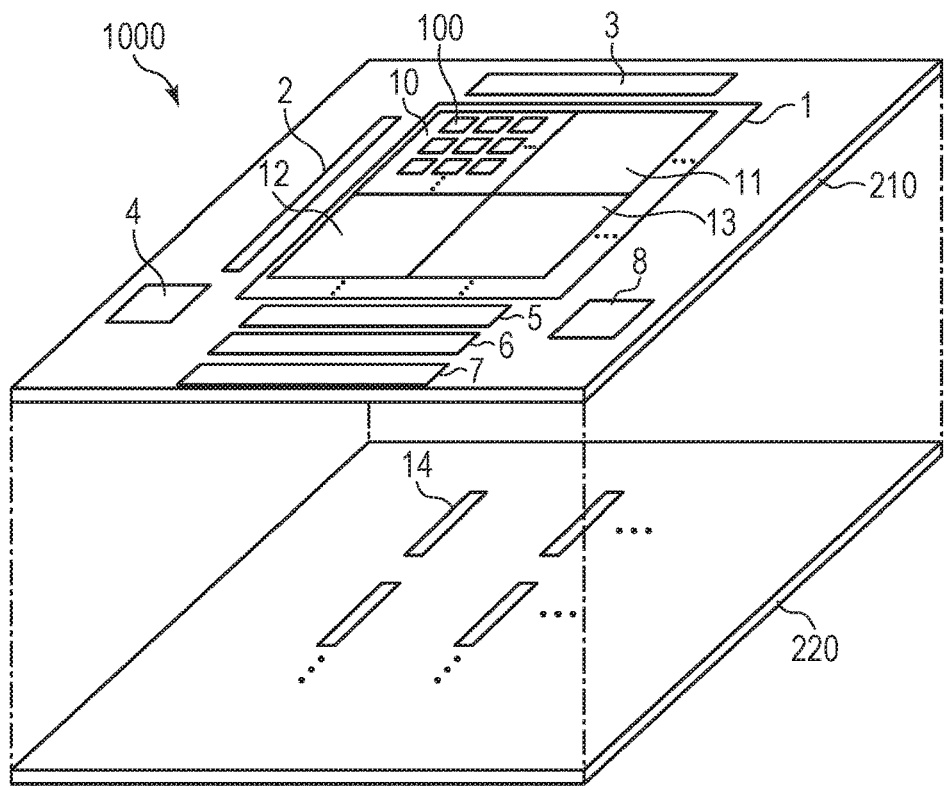
FIG. 4A and FIG. 4B are schematic diagrams illustrating an arrangement example of each block in the imaging device according to the first embodiment of the present invention.
Figure 4B:
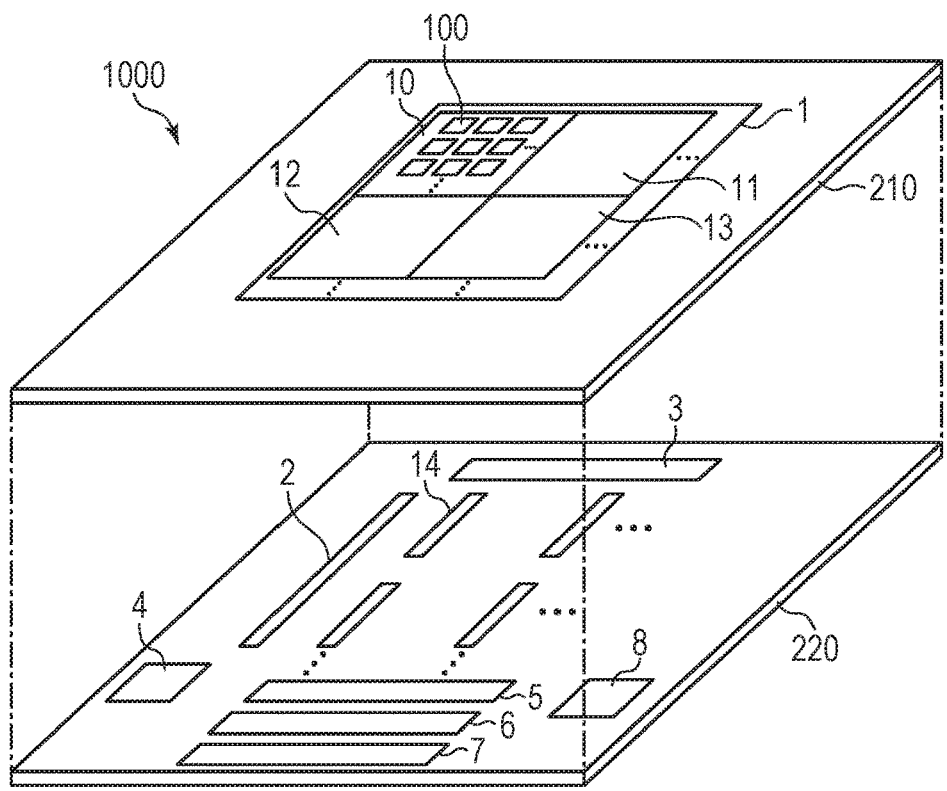
Figure 5:
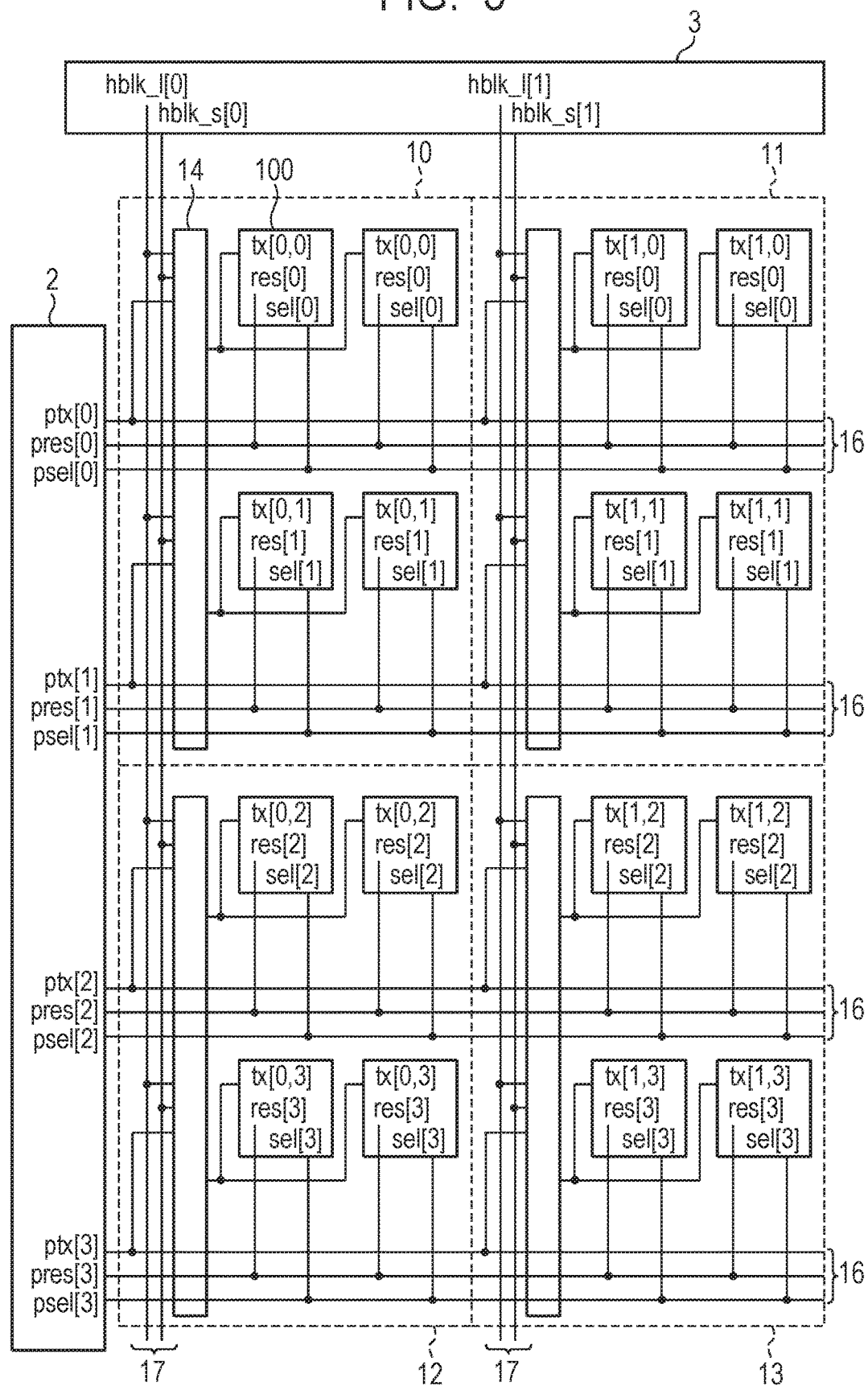
FIG. 5 is a circuit diagram illustrating a connection example between pixel blocks and a vertical scanning unit and a horizontal region control unit in the imaging device according to the first embodiment of the present invention.
Figure 6:
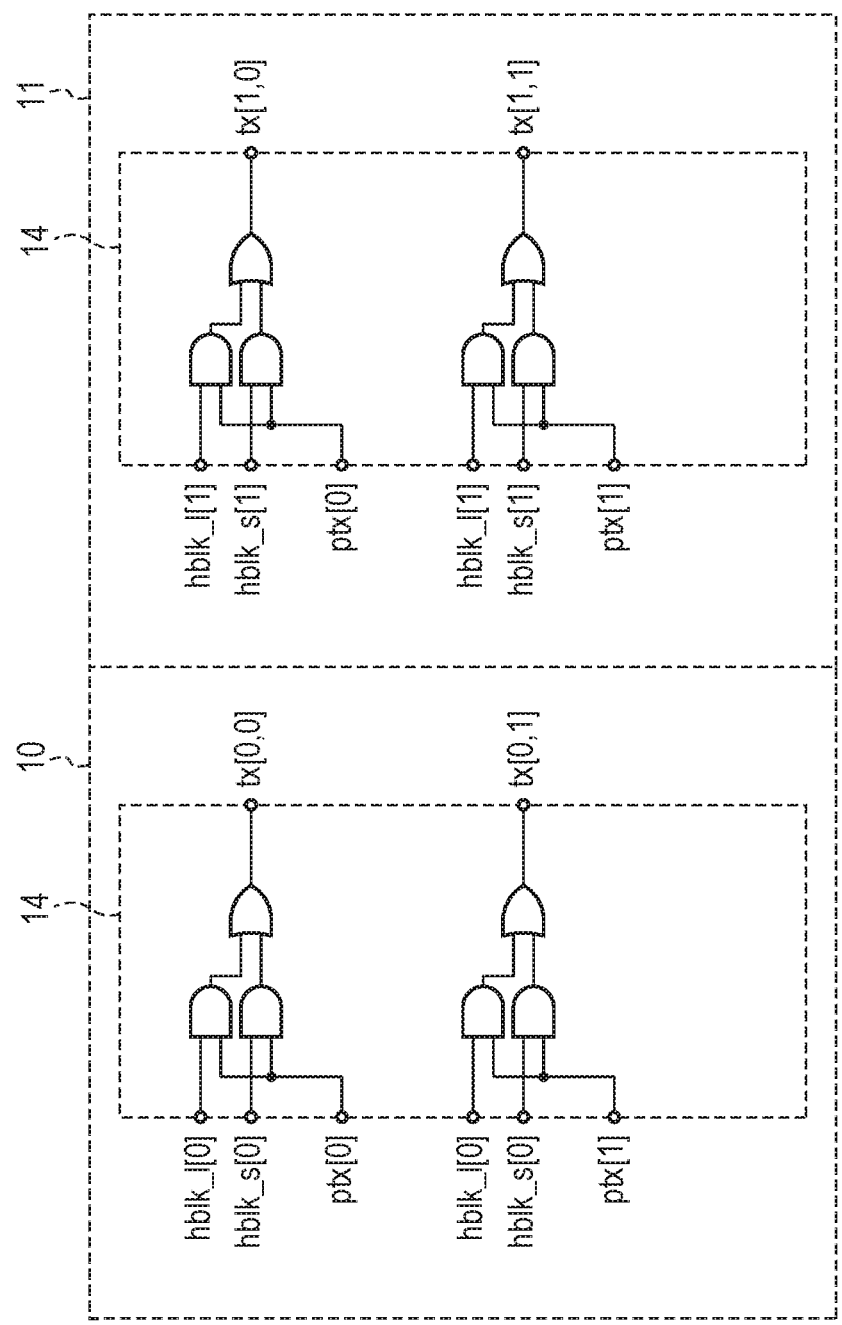
FIG. 6 is a circuit diagram illustrating a configuration example of in-pixel-block control units in the imaging device according to the first embodiment of the present invention.

The general configuration of an imaging device according to a first embodiment of the present invention will be described with reference to FIG. 1 to FIG. 6. FIG. 1 is a block diagram illustrating a general configuration of an imaging device according to the present embodiment. FIG. 2 is a block diagram illustrating a configuration example of a pixel unit in the imaging device according to the present embodiment. FIG. 3 is a circuit diagram illustrating a configuration example of a pixel in the imaging device according to the present embodiment. FIG. 4A and FIG. 4B are schematic diagrams illustrating an arrangement example of each block in the imaging device according to the present embodiment. FIG. 5 is a circuit diagram illustrating a connection example between pixel blocks and a vertical scanning unit and a horizontal region control unit in the imaging device according to the present embodiment. FIG. 6 is a circuit diagram illustrating a configuration example of in-pixel-block control units in the imaging device according to the present embodiment.

As illustrated in FIG. 1, an imaging device 1000 according to the present embodiment includes a pixel unit 1, a vertical scanning unit 2, a horizontal region control unit 3, a timing generation unit 4, an amplifier 5, a column AD conversion unit (column AD converter) 6, a horizontal scanning unit 7, and a signal output unit 8.

The pixel unit 1 includes a plurality of pixels arranged two-dimensionally over a plurality of rows and a plurality of columns, as described later. The vertical scanning unit 2 is a control circuit unit used for performing an operation (vertical scan) that provides drive signals on a row basis to pixels of the pixel unit 1. The horizontal region control unit 3 is a control circuit unit that provides enable/disable signals on a column basis to pixel blocks aligned in the horizontal direction.

The amplifier 5 includes an amplifier circuit that amplifies a signal output from the pixel unit 1 at a predetermined gain. The amplifier 5 is configured to be able to amplify a signal output from the pixel unit 1 at any gain selected from multiple types of gains. The column AD conversion unit 6 includes an AD conversion circuit that performs an AD conversion process on a signal amplified by the amplifier 5 and a memory unit (line memory) that temporarily holds a digital signal on which an AD conversion process has been performed, as described above. The horizontal scanning unit 7 is a control circuit unit that outputs a control signal that designates an address to the column AD conversion unit 6 and outputs a digital signal on an address-designated column to the signal output unit 8. The signal output unit 8 has a function of performing a predetermined process on a signal output from the column AD conversion unit 6 and externally outputting the processed signal as a signal that conforms to an external protocol.

The timing generation unit 4 is provided with standard drive setting of the imaging device 1000 from the external input and provided with various settings of the imaging device 1000 through external communication. The timing generation unit 4 supplies timing signals to control operation timings to the vertical scanning unit 2, the horizontal region control unit 3, the amplifier 5, the column AD conversion unit 6, and the horizontal scanning unit 7 based on the externally provided setting.

As illustrated in FIG. 2, the pixel unit 1 includes a plurality of pixel blocks 10, 11, 12, 13, . . . arranged two-dimensionally. Each of the plurality of pixel blocks 10, 11, 12, 13, . . . includes a plurality of pixels 100 arranged two-dimensionally over a plurality of rows and a plurality of columns and an in-pixel-block control unit 14. In accordance with control signals from the vertical scanning unit 2 and the horizontal region control unit 3, the in-pixel-block control unit 14 performs control of accumulation time (exposure time) of signal charge or control of readout on the pixels 100 of the pixel block to which the in-pixel-block control unit 14 belongs. That is, the in-pixel-block control unit 14 forms a control unit (an accumulation time controller) that controls the pixel unit 1 together with the vertical scanning unit 2 and the horizontal region control unit 3.

As illustrated in FIG. 3, each pixel 100 includes a photoelectric converter PD, a transfer transistor M1, a reset transistor M3, an amplifier transistor M4, and a select transistor M5.

The photoelectric converter PD is a photodiode, for example. The photodiode forming the photoelectric converter PD has an anode and a cathode, the anode is connected to a ground node, and the cathode is connected to the source of the transfer transistor M1. The drain of the transfer transistor M1 is connected to the source of the reset transistor M3 and the gate of the amplifier transistor M4. The connection node of the drain of the transfer transistor M1, the source of the reset transistor M3, and the gate of the amplifier transistor M4 is a so-called floating diffusion (FD) node (in FIG. 3, denoted as "FD"). The capacitance component coupled to the FD node functions as a holding portion of charge transferred from the photoelectric converter PD and also functions as a charge-to-voltage conversion unit. The drain of the reset transistor M3 and the drain of the amplifier transistor M4 are connected to a power supply node that supplies a voltage VDD. The source of the amplifier transistor M4 is connected to the drain of the select transistor M5. The source of the select transistor M5 is connected to the vertical output line 106. The vertical output line 106 is connected to a current source (not illustrated).

The photoelectric converter PD converts (photoelectrically converts) incident light into amount of charge in accordance with the light amount and accumulates the generated charge. When turned on, the transfer transistor M1 transfers charge in the photoelectric converter PD to the FD node. The FD node has a voltage in accordance with the amount of charge transferred from the photoelectric converter PD through charge-to-voltage conversion by the capacitance component of the FD node. The amplifier transistor M4 is configured such that the voltage VDD is supplied to the drain and a bias current is supplied from a current source (not illustrated) to the source via the select transistor M5 and forms an amplifier (source follower circuit) whose gate is the input node. Thereby, the amplifier transistor M4 outputs a signal based on a voltage of the FD node to the vertical output line 106 via the select transistor M5. When turned on, the reset transistor M3 resets the FD node to a voltage in accordance with the voltage VDD.

The imaging device 1000 according to the present embodiment may be formed by distributing respective blocks illustrated in FIG. 1 and FIG. 2 to two semiconductor substrates 210 and 220 and joining these semiconductor substrates 210 and 220, as illustrated in FIG. 4A and FIG. 4B, for example. The semiconductor substrate 210 and the semiconductor substrate 220 may be electrically connected to each other via conductive members such as bump electrodes or through electrodes, for example.

FIG. 4A illustrates a configuration example in which, out of respective blocks illustrated in FIG. 1 and FIG. 2, only the in-pixel-block control units 14 are arranged on the lower semiconductor substrate 220, and the rest is arranged on the upper semiconductor substrate 210. By arranging the pixels 100 and the in-pixel-block control units 14 on the separate semiconductor substrates 210 and 220, it is possible to arrange the plurality of pixels 100 included in a plurality of pixel blocks within the pixel unit 1 evenly without being affected by the arrangement of the in-pixel-block control units 14.

In the configuration example illustrated in FIG. 4A, control signals from the vertical scanning unit 2 located on the upper semiconductor substrate 210 and control signals from the horizontal region control unit 3 located on the same upper semiconductor substrate 210 are transmitted to the in-pixel-block control unit 14 located on the lower semiconductor substrate 220. Control signals decoded by the in-pixel-block control units 14 are transmitted again to the upper semiconductor substrate 210 to drive the pixels 100 of the pixel unit 1. Output signals from the pixel unit 1 are directly processed by the amplifier 5 and the column AD conversion unit 6 on the upper semiconductor substrate 210. Then, a digital signal on a column whose address is designated by the horizontal scanning unit 7 located on the same upper semiconductor substrate 210 is subjected to signal processing by the signal output unit 8 located on the upper semiconductor substrate 210 and output to the outside of the imaging device 1000.

FIG. 4B is a configuration example in which, out of respective blocks illustrated in FIG. 1 and FIG. 2, only the pixels 100 of the pixel unit 1 are arranged on the upper semiconductor substrate 210 and the in-pixel-block control unit 14, and the rest of the pixel unit 1 are arranged on the lower semiconductor substrate 220. Also in this configuration example, the pixels 100 and the in-pixel-block control units 14 are arranged on the separate semiconductor substrates 210 and 220.

In the configuration example illustrated in FIG. 4B, control signals from the vertical scanning unit 2 located on the lower semiconductor substrate 220 and control signals from the horizontal region control unit 3 located on the same lower semiconductor substrate 220 are directly transmitted to the in-pixel-block control units 14 located on the lower semiconductor substrate 220. Control signals decoded by the in-pixel-block control units 14 are transmitted to the upper semiconductor substrate 210 to drive the pixels 100 of the pixel unit 1 located on the upper semiconductor substrate 210. Output signals from the pixel unit 1 are transmitted to the lower semiconductor substrate 220 and processed by the amplifier 5 and the column AD conversion unit 6 located on the lower semiconductor substrate 220. Then, a digital signal on a column whose address is designated by the horizontal scanning unit 7 located on the same lower semiconductor substrate 220 is subjected to signal processing by the signal output unit 8 located on the lower semiconductor substrate 220 and output to the outside of the imaging device 1000.

Next, a connection example between the pixel blocks 10, 11, 12, and 13 and the vertical scanning unit 2 and the horizontal region control unit 3 will be described by using FIG. 5. Note that, while FIG. 5 illustrates only the four pixel blocks 10, 11, 12, and 13 for simplified illustration, the number of pixel blocks included in the pixel unit 1 is not limited thereto. Further, while FIG. 5 illustrates a case where each of the pixel blocks 10, 11, 12, and 13 includes four pixels 100 arranged in a matrix of two rows by two columns, the number of pixels 100 included in each of the pixel blocks 10, 11, 12, and 13 is not limited thereto.

The vertical scanning unit 2 decodes a vertical row address signal (not illustrated) provided from the timing generation unit 4 and generates control signals ptx [n], pres [n], and psel [n]. Here, the index [n] appended to each control signal denotes the value of a vertical row address and may be any integer. FIG. 5 illustrates control signals ptx [0] to ptx [3], pres [0] to pres [3], and psel [0] to psel [3] as control signals corresponding to vertical row addresses [0] to [3].

The control signals ptx [n], pres [n], and psel [n] are supplied to a pixel block including the pixels 100 arranged on a row corresponding to a vertical row address [n] via a control line 16 arranged for each vertical row address. Each of the control lines 16 is arranged extending in a first direction (the horizontal direction or a row direction) to form a signal line common to the in-pixel-block control units 14 or the pixels 100 having a common vertical row address.

The control signal ptx [n] is provided to the in-pixel-block control units 14 of the pixel blocks arranged on a row corresponding to a vertical row address [n]. That is, the control signals ptx [0] and ptx [1] are provided to the in-pixel-block control units 14 of the pixel blocks 10 and 11 arranged on rows corresponding to the vertical row addresses [0] and [1]. The control signals ptx [2] and ptx [3] are provided to the in-pixel-block control units 14 of the pixel blocks 12 and 13 arranged on rows corresponding to the vertical row addresses [2] and [3].

The control signals pres [n] and the control signal psel [n] are provided to the pixels 100 arranged on a row corresponding to a vertical row address [n]. That is, the control signals pres [0] and psel [0] are provided to the pixels 100 arranged to the row corresponding to the vertical row address [0] out of the pixels 100 belonging to the pixel blocks 10 and 11. The control signals pres [1] and psel [1] are provided to the pixels 100 arranged to the row corresponding to the vertical row address [1] out of the pixels 100 belonging to the pixel blocks 10 and 11. The control signals pres [2] and psel [2] are provided to the pixels 100 arranged to the row corresponding to the vertical row address [2] out of the pixels 100 belonging to the pixel blocks 12 and 13. The control signals pres [3] and psel [3] are provided to the pixels 100 arranged to the row corresponding to the vertical row address [3] out of the pixels 100 belonging to the pixel blocks 12 and 13.

The horizontal region control unit 3 generates control signals hblk_1 [m] and hblk_s [m] based on a signal (not illustrated) provided from the timing generation unit 4. Here, the index [m] appended to each control signal denotes the value of a horizontal block address and may be any integer. FIG. 5 illustrates control signals hblk_1 [0], hblk_s [0], hblk_1 [1], and hblk_s [1] as control signals corresponding to the horizontal block addresses [0] to [1]. Here, the control signal hblk_1 [m] is a control signal enabled at the time of control of long-time exposure. Further, the control signal hblk_s [m] is a control signal enabled at the time of control of short-time exposure.

Note that, in the present specification, the term "long-time exposure" refers to an operation to perform accumulation of signal charge during relatively longer exposure time (or accumulation time of relatively longer length) when exposure time of the photoelectric converter PD of the pixel 100 is defined for the pixel blocks individually, or independently from each other. Further, the term "short-time exposure" refers to an operation to perform accumulation of signal charge during relatively shorter exposure time (or accumulation time of relatively shorter length) when exposure time of the photoelectric converter PD of the pixel 100 is defined for the pixel blocks individually, or independently from each other. While a case where two lengths of exposure time is employed will be described in the present embodiment for simplified illustration, three or more lengths of exposure time may be employed. In such a case, the number of control signals hblk for each horizontal block address increases in accordance with the type of the length of exposure time.

The control signals hblk_1 [m] and hblk_s [m] are supplied to pixel blocks belonging to a corresponding horizontal block address [m] via the control line 17 arranged for each horizontal block address. Each of the control lines 17 is arranged extending in a second direction (the vertical direction or a column direction) crossing the first direction to form a signal line common to pixel blocks having a common horizontal block address.

The control signals hblk_1 [m] and hblk_s [m] are provided to the in-pixel-block control units 14 of pixel blocks belonging to a corresponding horizontal block address [m]. That is, the control signals hblk_1 [0] and hblk_s [0] are provided to the in-pixel-block control units 14 of the pixel blocks 10 and 12 belonging to the horizontal block address [0]. The control signals hblk_1 [1] and hblk_s [1] are provided to the in-pixel-block control units 14 of the pixel blocks 11 and 13 belonging to the horizontal block address [1].

Each of the in-pixel-block control units 14 of the pixel blocks 10, 11, 12, and 13 generates a control signal tx [m, n] based on the control signals ptx [n], hblk_1 [m], and hblk_s [m]. The control signal tx [m, n] is provided to the pixels 100 within a pixel block corresponding to a horizontal block address [m] and a vertical row address [n]. That is, the control signal tx [0, 0] is provided to the pixels 100 arranged on the row corresponding to the vertical row address [0] out of the pixels 100 of the pixel block 10. The control signal tx [0, 1] is provided to the pixels 100 arranged on the row corresponding to the vertical row address [1] out of the pixels 100 of the pixel block 10. The control signal tx [1, 0] is provided to the pixels 100 arranged on the row corresponding to the vertical row address [0] out of the pixels 100 of the pixel block 11. The control signal tx [1, 1] is provided to the pixels 100 arranged on the row corresponding to the vertical row address [1] out of the pixels 100 of the pixel block 11. The control signal tx [0, 2] is provided to the pixels 100 arranged on the row corresponding to the vertical row address [2] out of the pixels 100 of the pixel block 12. The control signal tx [0, 3] is provided to the pixels 100 arranged on the row corresponding to the vertical row address [3] out of the pixels 100 of the pixel block 12. The control signal tx [1, 2] is provided to the pixels 100 arranged on the row corresponding to the vertical row address [2] out of the pixels 100 of the pixel block 13. The control signal tx [1, 3] is provided to the pixels 100 arranged on the row corresponding to the vertical row address [3] out of the pixels 100 of the pixel block 13.

Next, a configuration example of the in-pixel-block control unit 14 will be described by using FIG. 6. The in-pixel-block control unit 14 may be formed of a circuit illustrated in FIG. 6, for example.

The in-pixel-block control unit 14 of the pixel block 10 is input with the control signals hblk_1 [0], hblk_s [0], and ptx [0] and outputs the control signal tx [0, 0]. The control signal tx [0, 0] transitions to a high level in response to transition of the control signal ptx [0] to a high level when the control signal hblk_1 [0] or the control signal hblk_s [0] is at a high level. Further, the in-pixel-block control unit 14 of the pixel block 10 is input with the control signals hblk_1 [0], hblk_s [0], and ptx [1] and outputs the control signal tx [0, 1]. The control signal tx [0, 1] transitions to a high level in response to transitions of the control signal ptx [1] to a high level when the control signal hblk_1 [0] or the control signal hblk_s [0] is at a high level.

Further, the in-pixel-block control unit 14 of the pixel block 11 is input with the control signals hblk_1 [1], hblk_s [1], and ptx [0] and outputs the control signal tx [1, 0]. The control signal tx [1, 0] transitions to a high level in response to transition of the control signal ptx [0] to a high level when the control signal hblk_1 [1] or the control signal hblk_s [1] is at a high level. Further, the in-pixel-block control unit 14 of the pixel block 11 is input with the control signals hblk_1 [1], hblk_s [1], and ptx [1] and outputs the control signal tx [1, 1]. The control signal tx [1, 1] transitions to a high level in response to transition of the control signal ptx [1] to a high level when the control signal hblk_1 [1] or the control signal hblk_s [1] is at a high level.

The circuit that implements such operation in the in-pixel-block control unit 14 is not particularly limited and may be formed of the logic circuit illustrated in FIG. 6, for example. The logic circuit illustrated in FIG. 6 includes an AND gate that calculates a logical product of the control signals hblk_1 [m] and ptx [n], an AND gate that calculates a logical product of the control signals hblk_s [m] and ptx [n], and an OR gate that calculates a logical sum of these output values. The output of the OR gate is the control signal tx [m, n].

With such a configuration of the in-pixel-block control unit 14, it is possible to control on a pixel block basis whether or not to transfer, to the pixel 100, the control signal ptx [n] supplied from the vertical scanning unit 2 in accordance with a signal level of the control signals hblk_1 [m] and hblk_s [m].

In such a way, the control signal tx [m, n] to be provided to the pixels 100 is generated by the in-pixel-block control unit 14. The control signals pres [n] and psel [n] generated by the vertical scanning unit 2 are directly provided to the pixels 100 arranged on a row corresponding to a vertical row address [n] as the control signals res[n] and sel [n]. As illustrated in FIG. 3, the control signal tx [m, n] is provided to the gate of the transfer transistor M1. The control signal res [n] is provided to the gate of the reset transistor M3. The control signal sel [n] is provided to the gate of the select transistor M5.

Figure 7:
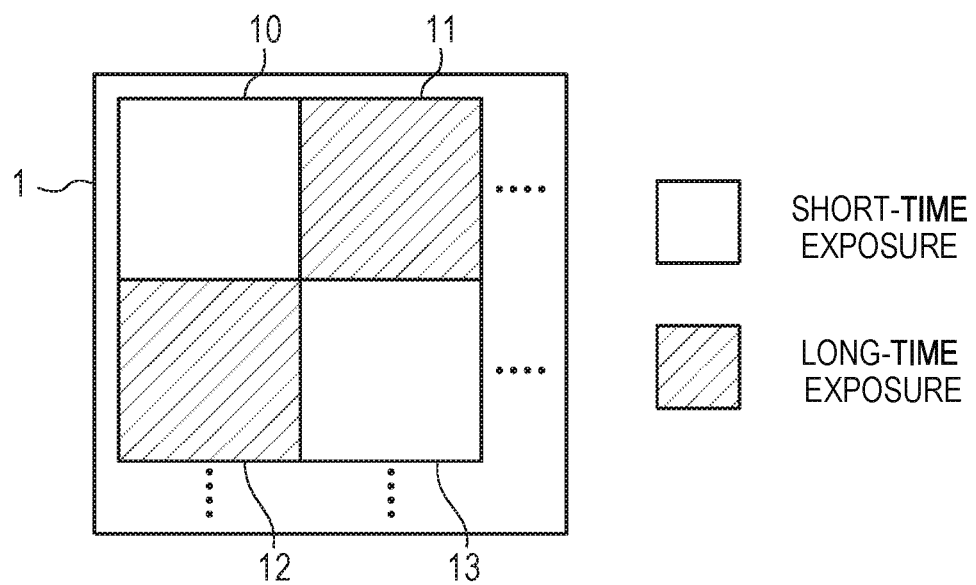
FIG. 7 is a diagram schematically representing exposure time in each pixel block within a pixel unit.
Figure 8:
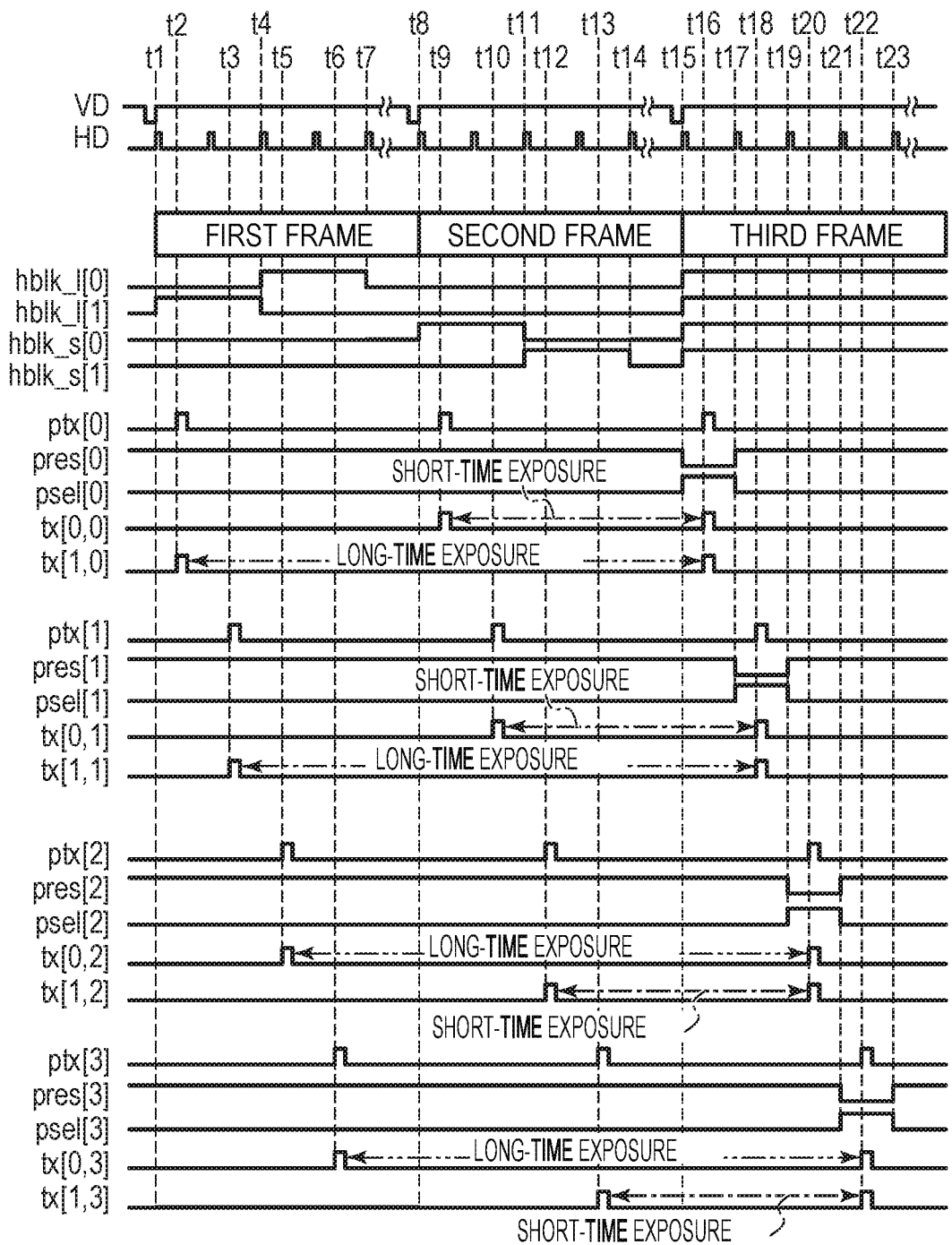
FIG. 8 and FIG. 10 are timing charts illustrating a method of driving the imaging device according to the first embodiment of the present invention.
Figure 9:
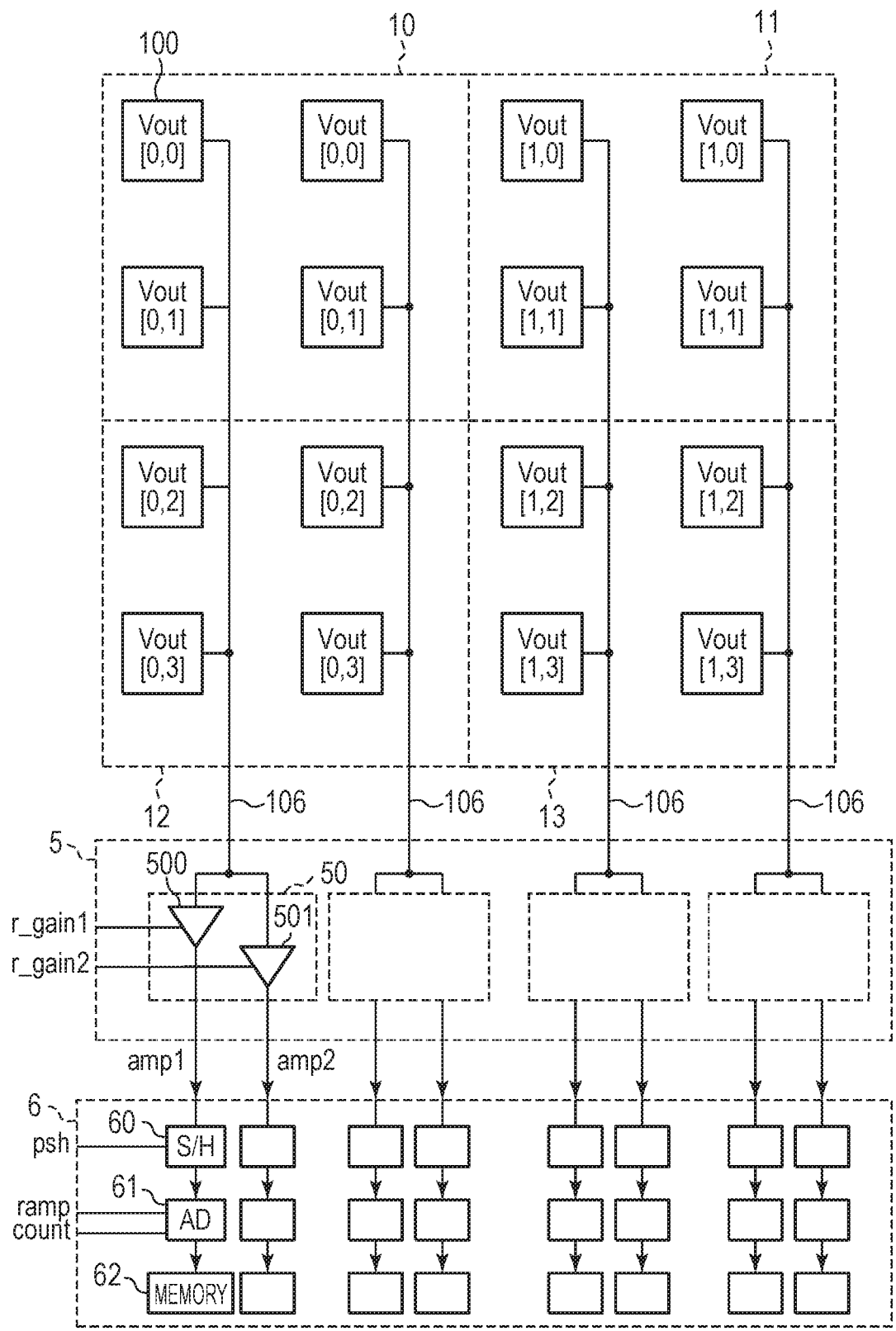
FIG. 9 is a schematic diagram illustrating a configuration example of an amplifier and a column AD conversion unit in the imaging device according to the first embodiment of the present invention.
Figure 10:
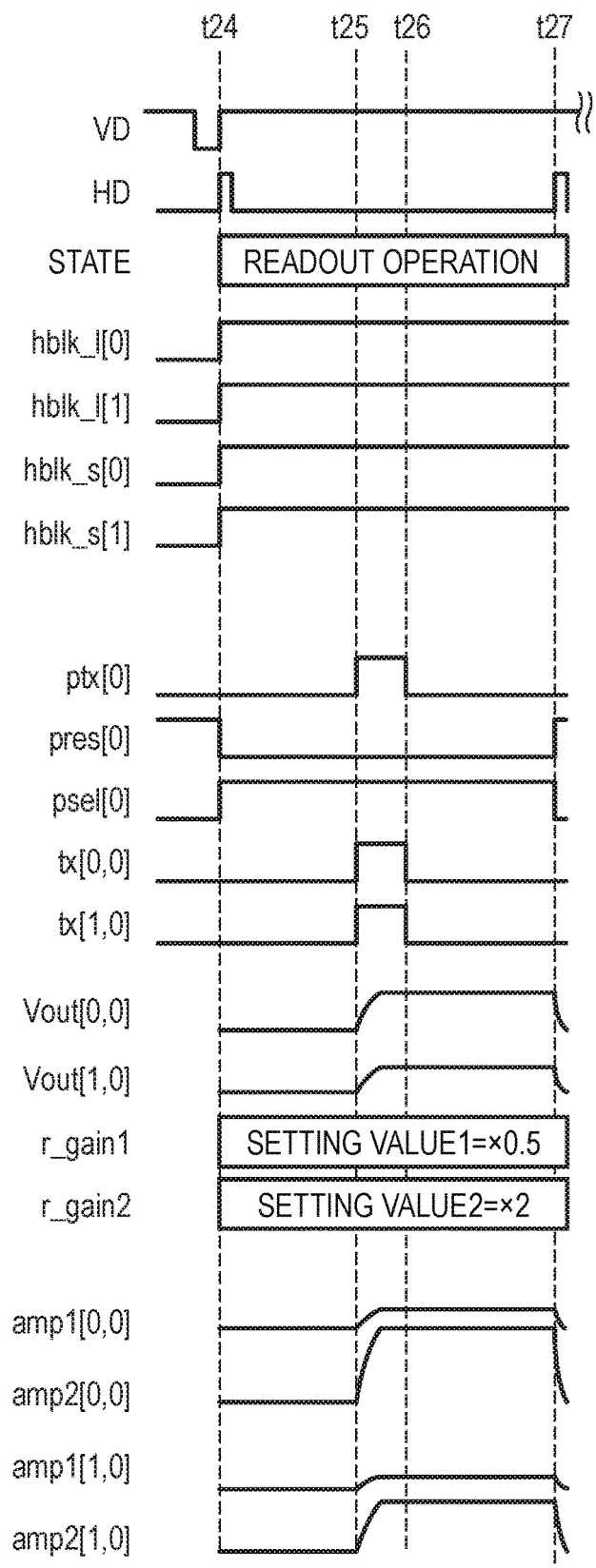

Next, a method of driving the imaging device according to the present embodiment will be described with reference to FIG. 7 to FIG. 10. FIG. 7 is a diagram schematically illustrating exposure time in each pixel block within a pixel unit. FIG. 8 and FIG. 10 are timing charts illustrating a method of driving the imaging device according to the present embodiment. FIG. 9 is a schematic diagram illustrating a configuration example of the amplifier and the column AD conversion unit in the imaging device according to the present embodiment.

Here, an operation as illustrated in FIG. 7 is considered as an example of controlling exposure time individually for the pixel blocks of the pixel unit 1. That is, FIG. 7 illustrates that, in the pixel unit 1, control of short-time exposure is performed on the pixel block 10 and the pixel block 13 that are bright as a whole, and control of long-time exposure is performed on the pixel block 11 and the pixel block 12 that are dark as a whole. In other words, a length of accumulation time for each pixel block can be determined independently from those of the other pixel blocks.

Next, a specific drive example of the imaging device 1000 for implementing driving of FIG. 7 will be described by using FIG. 8. FIG. 8 illustrates a horizontal synchronization signal HD and a vertical synchronization signal VD that are reference timing signals used for driving the imaging device 1000 in addition to the control signals described so far. In the horizontal synchronization signal HD, a period between neighboring pulses is one HD period. In this one HD period, pixel driving on one row is performed and a process up to pixel output of the imaging device is performed. In the vertical synchronization signal VD, a period between the neighboring pulses is one VD period. One VD period corresponds to a period in which pixel output for one frame is performed.

FIG. 8 illustrates an operation for consecutive three frames. In these three frames, the first frame is a frame in which a shutter operation for long-time exposure is performed, the second frame is a frame in which a shutter operation for a short-time exposure is performed, and the third frame is a frame in which a readout operation for reading out a pixel signal from the pixel unit 1 is performed.

First, the first frame, which is a frame in which a shutter operation for long-time exposure is performed, will be described. The first frame is the period approximately from the time t1 to the time t8 in FIG. 8.

It is assumed that, in a period before the time t1, the control signals pres [0], pres [1], pres [2], and pres [3] are at the high level, and other control signals are at the low level.

At the time t1, the vertical synchronization signal VD and the horizontal synchronization signal HD externally supplied to the timing generation unit 4 are controlled to the high level, and the first HD period of the first frame starts. The first HD period is a period to drive the pixels 100 on the row corresponding to the vertical row address [0]. The first frame corresponds to a period to perform a shutter operation for long-time exposure, and in the first HD period, the control signals hblk_1 [0] and hblk_1 [1] are controlled, and the control signals hblk_s [0] and hblk_s [1] are maintained at the low level.

Pixel blocks to which the pixels 100 on the row corresponding to the vertical row address [0] belong are the pixel block 10 on which short-time exposure is performed and the pixel block 11 on which long-time exposure is performed, as illustrated in FIG. 7. Since the first frame corresponds to a period to perform a shutter operation for long-time exposure, the pixels 100 of the pixel block 10 on which short-time exposure is performed is not driven, and the pixels 100 of the pixel block 11 on which long-time exposure is performed is driven. That is, once the horizontal synchronization signal HD is controlled to the high level at the time t1, the horizontal region control unit 3 controls the control signal hblk_1 [1] from the low level to the high level in synchronization with the horizontal synchronization signal HD and maintains the control signal hblk_1 [0] at the low level.

Next, at the time t2, the vertical scanning unit 2 controls the control signal ptx [0] on the row corresponding to the vertical row address [0] to the high level. Thereby, the in-pixel-block control unit 14 of the pixel block 10 outputs the low level control signal tx [0, 0] in accordance with the logic circuit of FIG. 6. Further, the in-pixel-block control unit 14 of the pixel block 11 outputs the high level control signal tx [1, 0] in accordance with the logic circuit of FIG. 6.

Thereby, while no operation occurs in the pixels 100 on the row corresponding to the vertical row address [0] of the pixel block 10, the transfer transistor M1 is turned on in the pixels 100 on the row corresponding to the vertical row address [0] of the pixel block 11. At this time, the control signal pres [0] is at the high level, the reset transistor M3 of the pixels 100 on the row corresponding to the vertical row address [0] is also already turned on, and the FD node is in a reset state. Therefore, when the transfer transistor M1 is turned on, the photoelectric converter PD is reset to a potential in accordance with the voltage VDD via the reset transistor M3 and the transfer transistor M1.

The vertical scanning unit 2 controls the control signal ptx [0] from the high level to the low level at a predetermined timing after the completion of reset of the photoelectric converter PD. Thereby, the control signal tx [1, 0] output from the in-pixel-block control unit 14 of the pixel block 11 also returns to the low level. The timing when the control signal tx [1, 0] transitions to the low level is a timing when exposure time starts in the photoelectric converter PD of the pixels 100 on the row corresponding to the vertical row address [0] of the pixel block 11.

On and after the time t2, the second HD period of the first frame starts at the timing when the horizontal synchronization signal HD is next controlled to the high level. The second HD period is a period to drive the pixels 100 on the row corresponding to the vertical row address [1]. As described previously, the first frame corresponds to a period to perform a shutter operation for long-time exposure, the control signals hblk_1 [0] and hblk_1 [1] are controlled also in the second HD period, and the control signals hblk_s [0] and hblk_s [1] are maintained at the low level.

Pixel blocks to which the pixels 100 on the row corresponding to the vertical row address [1] belong are the pixel block 10 on which short-time exposure is performed and the pixel block 11 on which long-time exposure is performed. That is, the row corresponding to the vertical row address [0] and the row corresponding to the vertical row address [1] belong to the same pixel blocks 10 and 11. Therefore, the operation performed on the row corresponding to the vertical row address [1] in the second HD period is the same as the operation performed on the row corresponding to the vertical row address [0] in the first HD period.

Specifically, the control signals hblk_1 [1] is maintained at the high level subsequently from the first HD period, and the control signals hblk_1 [0], hblk_s [0], and hblk_s [1] are maintained at the low level.

At the time t3, the vertical scanning unit 2 controls the control signal ptx [1] on the row corresponding to the vertical row address [1] to the high level. Thereby, the in-pixel-block control unit 14 of the pixel block 10 outputs the low level control signal tx [0, 1] in accordance with the logic circuit of FIG. 6. Further, the in-pixel-block control unit 14 of the pixel block 11 outputs the high level control signal tx [1, 1] in accordance with the logic circuit of FIG. 6.

Thereby, while no operation occurs in the pixels 100 on the row corresponding to the vertical row address [1] of the pixel block 10, the transfer transistor M1 is turned on in the pixels 100 on the row corresponding to the vertical row address [1] of the pixel block 11. At this time, the control signal pres [1] is at the high level, the reset transistor M3 of the pixels 100 on the row corresponding to the vertical row address [1] is also already turned on, and the FD node is in a reset state. Therefore, when the transfer transistor M1 is turned on, the photoelectric converter PD is reset to a potential in accordance with the voltage VDD via the reset transistor M3 and the transfer transistor M1.

The vertical scanning unit 2 controls the control signal ptx [1] from the high level to the low level at a predetermined timing after the completion of reset of the photoelectric converter PD. Thereby, the control signal tx [1, 1] output from the in-pixel-block control unit 14 of the pixel block 11 also returns to the low level. The timing when the control signal tx [1, 1] transitions to the low level is a timing when exposure time starts in the photoelectric converter PD of the pixels 100 on the row corresponding to the vertical row address [1] of the pixel block 11.

At the time t4, the horizontal synchronization signal HD is controlled to the high level, and the third HD period of the first frame starts. The third HD period is a period to drive the pixels 100 on the row corresponding to the vertical row address [2]. As described previously, the first frame corresponds to a period to perform a shutter operation for long-time exposure, the control signals hblk_1 [0] and hblk_1 [1] are controlled also in the third HD period, and the control signals hblk_s [0] and hblk_s [1] are maintained at the low level.

Pixel blocks to which the pixels 100 on the row corresponding to the vertical row address [2] belong are the pixel block 12 on which long-time exposure is performed and the pixel block 13 on which short-time exposure is performed, as illustrated in FIG. 7. Since the first frame corresponds to a period to perform a shutter operation for long-time exposure, the pixels 100 of the pixel block 13 on which short-time exposure is performed is not driven, and the pixels 100 of the pixel block 12 on which long-time exposure is performed is driven. That is, in synchronization with the horizontal synchronization signal HD being controlled to the high level at the time t4, the horizontal region control unit 3 controls the control signal hblk_1 [0] from the low level to the high level and controls the control signal hblk_1 [1] from the high level to the low level.

Next, at the time t5, the vertical scanning unit 2 controls the control signal ptx [2] on the row corresponding to the vertical row address [2] to the high level. Thereby, the in-pixel-block control unit 14 of the pixel block 12 outputs the high level control signal tx [0, 2] in accordance with the logic circuit of FIG. 6. Further, the in-pixel-block control unit 14 of the pixel block 13 outputs the low level control signal tx [1, 2] in accordance with the logic circuit of FIG. 6.

Thereby, while no operation occurs in the pixels 100 on the row corresponding to the vertical row address [2] of the pixel block 13, the transfer transistor M1 is turned on in the pixels 100 on the row corresponding to the vertical row address [2] of the pixel block 12. At this time, the control signal pres [2] is at the high level, the reset transistor M3 of the pixels 100 on the row corresponding to the vertical row address [2] is also already turned on, and the FD node is in a reset state. Therefore, when the transfer transistor M1 is turned on, the photoelectric converter PD is reset to a potential in accordance with the voltage VDD via the reset transistor M3 and the transfer transistor M1.

The vertical scanning unit 2 controls the control signal ptx [2] from the high level to the low level at a predetermined timing after the completion of reset of the photoelectric converter PD. Thereby, the control signal tx [0, 2] output from the in-pixel-block control unit 14 of the pixel block 12 also returns to the low level. The timing when the control signal tx [0, 2] transitions to the low level is a timing when an exposure period starts in the photoelectric converter PD of the pixels 100 on the row corresponding to the vertical row address [2] of the pixel block 12.

On and after the time t5, the fourth HD period of the first frame starts at the timing when the horizontal synchronization signal HD is next controlled to the high level. The fourth HD period is a period to drive the pixels 100 on the row corresponding to the vertical row address [3]. As described previously, the first frame corresponds to a period to perform a shutter operation for long-time exposure, the control signals hblk_1 [0] and hblk_1 [1] are controlled also in the fourth HD period, and the control signals hblk_s [0] and hblk_s [1] are maintained at the low level.

Pixel blocks to which the pixels 100 on the row corresponding to the vertical row address [3] belong are the pixel block 12 on which long-time exposure is performed and the pixel block 13 on which short-time exposure is performed. That is, the row corresponding to the vertical row address [2] and the row corresponding to the vertical row address [3] belong to the same pixel blocks 12 and 13. Therefore, the operation performed on the row corresponding to the vertical row address [3] in the fourth HD period is the same as the operation performed on the row corresponding to the vertical row address [2] in the third HD period.

Specifically, the control signals hblk_1 [0] is maintained at the high level subsequently from the third HD period, and the control signals hblk_1 [1], hblk_s [0], and hblk_s [1] are maintained at the low level.

At the time t6, the vertical scanning unit 2 controls the control signal ptx [3] on the row corresponding to the vertical row address [3] to the high level. Thereby, the in-pixel-block control unit 14 of the pixel block 12 outputs the low level control signal tx [0, 3] in accordance with the logic circuit of FIG. 6. Further, the in-pixel-block control unit 14 of the pixel block 13 outputs the low level control signal tx [1, 3] in accordance with the logic circuit of FIG. 6.

Thereby, while no operation occurs in the pixels 100 on the row corresponding to the vertical row address [3] of the pixel block 13, the transfer transistor M1 is turned on in the pixels 100 on the row corresponding to the vertical row address [3] of the pixel block 12. Thus, the control signal pres [3] is at the high level, the reset transistor M3 of the pixels 100 on the row corresponding to the vertical row address [3] is also already turned on, and the FD node is in a reset state. Therefore, when the transfer transistor M1 is turned on, the photoelectric converter PD is reset to a potential in accordance with the voltage VDD via the reset transistor M3 and the transfer transistor M1.

The vertical scanning unit 2 controls the control signal ptx [3] from the high level to the low level at a predetermined timing after the completion of reset of the photoelectric converter PD. Thereby, the control signal tx [0, 3] output from the in-pixel-block control unit 14 of the pixel block 12 also returns to the low level. The timing when the control signal tx [0, 3] transitions to the low level is a timing when an exposure period starts in the photoelectric converter PD of the pixels 100 on the row corresponding to the vertical row address [3] of the pixel block 12.

At the time t7, the horizontal synchronization signal HD is controlled to the high level, and the fourth HD period of the first frame ends. The horizontal region control unit 3 controls the control signal hblk_1 [0] from the high level to the low level so that the control signal ptx [n] does not enter any of the pixel blocks.

In such a way, in the first frame, accumulation of signal charge is started in the pixels 100 of the pixel blocks 11 and 12, and no operation is performed on the pixels 100 of the pixel blocks 10 and 13.

Next, the second frame, which is a frame to perform a shutter operation for short-time exposure, will be described. The second frame corresponds to the period approximately from the time t8 to the time t15 in FIG. 8. In the second frame, accumulation of signal charge in the pixels 100 of the pixel blocks 10 and 13 is started without interrupting an accumulation operation of signal charge in the pixels 100 of the pixel blocks 11 and 12.

At the time t8, the vertical synchronization signal VD and the horizontal synchronization signal HD are controlled to the high level, and the first HD period of the second frame starts. The first HD period is a period to drive the pixels 100 on the row corresponding to the vertical row address [0]. The second frame corresponds to a period to perform a shutter operation for short-time exposure, and in the first HD period, the control signals hblk_s [0] and hblk_s [1] are controlled, and the control signals hblk_1 [0] and hblk_1 [1] are maintained at the low level.

Pixel blocks to which the pixels 100 on the row corresponding to the vertical row address [0] belong are the pixel block 10 on which short-time exposure is performed and the pixel block 11 on which long-time exposure is performed, as illustrated in FIG. 7. Since the second frame corresponds to a period to perform a shutter operation for short-time exposure, the pixels 100 of the pixel block 11 on which long-time exposure is performed is not driven, and the pixels 100 of the pixel block 10 on which short-time exposure is performed is driven. That is, once the horizontal synchronization signal HD is controlled to the high level at the time t8, the horizontal region control unit 3 controls the control signal hblk_s [0] from the low level to the high level in synchronization with the horizontal synchronization signal HD and maintains the control signal hblk_s [1] at the low level.

Next, at the time t9, the vertical scanning unit 2 controls the control signal ptx [0] on the row corresponding to the vertical row address [0] to the high level. Thereby, the in-pixel-block control unit 14 of the pixel block 10 outputs the high level control signal tx [0, 0] in accordance with the logic circuit of FIG. 6. Further, the in-pixel-block control unit 14 of the pixel block 11 outputs the low level control signal tx [1, 0] in accordance with the logic circuit of FIG. 6.

Thereby, while no operation occurs in the pixels 100 on the row corresponding to the vertical row address [0] of the pixel block 11, the transfer transistor M1 is turned on in the pixels 100 on the row corresponding to the vertical row address [0] of the pixel block 10. At this time, the control signal pres [0] is at the high level, the reset transistor M3 of the pixels 100 on the row corresponding to the vertical row address [0] is also already turned on, and the FD node is in a reset state. Therefore, when the transfer transistor M1 is turned on, the photoelectric converter PD is reset to a potential in accordance with the voltage VDD via the reset transistor M3 and the transfer transistor M1.

The vertical scanning unit 2 controls the control signal ptx [0] from the high level to the low level at a predetermined timing after the completion of reset of the photoelectric converter PD. Thereby, the control signal tx [0, 0] output from the in-pixel-block control unit 14 of the pixel block 10 also returns to the low level. The timing when the control signal tx [0, 0] transitions to the low level is a timing when an exposure period starts in the photoelectric converter PD of the pixels 100 on the row corresponding to the vertical row address [0] of the pixel block 10.

On and after the time t9, the second HD period of the second frame starts at the timing when the horizontal synchronization signal HD is next controlled to the high level. The second HD period is a period to drive the pixels 100 on the row corresponding to the vertical row address [1]. As described previously, the second frame corresponds to a period to perform a shutter operation for short-time exposure, the control signals hblk_s [0] and hblk_s [1] are controlled also in the second HD period, and the control signals hblk_1 [0] and hblk_1 [1] are maintained at the low level.

Pixel blocks to which the pixels 100 on the row corresponding to the vertical row address [1] belong are the pixel block 10 on which short-time exposure is performed and the pixel block 11 on which long-time exposure is performed. That is, the row corresponding to the vertical row address [0] and the row corresponding to the vertical row address [1] belong to the same pixel blocks 10 and 11. Therefore, the operation performed on the row corresponding to the vertical row address [1] in the second HD period is the same as the operation performed on the row corresponding to the vertical row address [0] in the first HD period.

Specifically, the control signals hblk_s [0] is maintained at the high level subsequently from the first HD period, the control signals hblk_s [1], hblk_1 [0], and hblk_1 [1] are maintained at the low level.

At the time t10, the vertical scanning unit 2 controls the control signal ptx [1] on the row corresponding to the vertical row address [1] to the high level. Thereby, the in-pixel-block control unit 14 of the pixel block 10 outputs the low level control signal tx [0, 1] in accordance with the logic circuit of FIG. 6. Further, the in-pixel-block control unit 14 of the pixel block 11 outputs the low level control signal tx [1, 1] in accordance with the logic circuit of FIG. 6.

Thereby, while no operation occurs in the pixels 100 on the row corresponding to the vertical row address [1] of the pixel block 11, the transfer transistor M1 is turned on in the pixels 100 on the row corresponding to the vertical row address [1] of the pixel block 10. At this time, the control signal pres [1] is at the high level, the reset transistor M3 of the pixels 100 on the row corresponding to the vertical row address [1] is also already turned on, and the FD node is in a reset state. Therefore, when the transfer transistor M1 is turned on, the photoelectric converter PD is reset to a potential in accordance with the voltage VDD via the reset transistor M3 and the transfer transistor M1.

The vertical scanning unit 2 controls the control signal ptx [1] from the high level to the low level at a predetermined timing after the completion of reset of the photoelectric converter PD. Thereby, the control signal tx [0, 1] output from the in-pixel-block control unit 14 of the pixel block 10 also returns to the low level. The timing when the control signal tx [0, 1] transitions to the low level is a timing when exposure time starts in the photoelectric converter PD of the pixels 100 on the row corresponding to the vertical row address [1] of the pixel block 10.

At the time t11, the horizontal synchronization signal HD is controlled to the high level, and the third HD period of the second frame starts. The third HD period is a period to drive the pixels 100 on the row corresponding to the vertical row address [2]. As described previously, the second frame corresponds to a period to perform a shutter operation for short-time exposure, the control signals hblk_s [0] and hblk_s [1] are controlled also in the third HD period, and the control signals hblk_1 [0] and hblk_1 [1] are maintained at the low level.

Pixel blocks to which the pixels 100 on the row corresponding to the vertical row address [2] belong are the pixel block 12 on which long-time exposure is performed and the pixel block 13 on which short-time exposure is performed, as illustrated in FIG. 7. Since the second frame corresponds to a period to perform a shutter operation for short-time exposure, the pixels 100 of the pixel block 12 on which long-time exposure is performed is not driven, and the pixels 100 of the pixel block 13 on which short-time exposure is performed is driven. That is, in synchronization with the horizontal synchronization signal HD being controlled to the high level at the time t11, the horizontal region control unit 3 controls the control signal hblk_s [0] from the high level to the low level and controls the control signal hblk_s [1] from the low level to the high level.

Next, at the time t12, the vertical scanning unit 2 controls the control signal ptx [2] on the row corresponding to the vertical row address [2] to the high level. Thereby, the in-pixel-block control unit 14 of the pixel block 12 outputs the low level control signal tx [0, 2] in accordance with the logic circuit of FIG. 6. Further, the in-pixel-block control unit 14 of the pixel block 13 outputs the low level control signal tx [1, 2] in accordance with the logic circuit of FIG. 6.

Thereby, while no operation occurs in the pixels 100 on the row corresponding to the vertical row address [2] of the pixel block 12, the transfer transistor M1 is turned on in the pixels 100 on the row corresponding to the vertical row address [2] of the pixel block 13. At the same time, the control signal pres [2] is at the high level, the reset transistor M3 of the pixels 100 on the row corresponding to the vertical row address [2] is also already turned on, and the FD node is in a reset state. Therefore, when the transfer transistor M1 is turned on, the photoelectric converter PD is reset to a potential in accordance with the voltage VDD via the reset transistor M3 and the transfer transistor M1.

The vertical scanning unit 2 controls the control signal ptx [2] from the high level to the low level at a predetermined timing after the completion of reset of the photoelectric converter PD. Thereby, the control signal tx [1, 2] output from the in-pixel-block control unit 14 of the pixel block 13 also returns to the low level. The timing when the control signal tx [1, 2] transitions to the low level is a timing when exposure time starts in the photoelectric converter PD of the pixels 100 on the row corresponding to the vertical row address [2] of the pixel block 13.

On and after the time t12, the fourth HD period of the second frame starts at the timing when the horizontal synchronization signal HD is next controlled to the high level. The fourth HD period is a period to drive the pixels 100 on the row corresponding to the vertical row address [3]. As described previously, the second frame corresponds to a period to perform a shutter operation for short-time exposure, the control signals hblk_s [0] and hblk_s [1] are controlled also in the fourth HD period, and the control signals hblk_1 [0] and hblk_1 [1] are maintained at the low level.

Pixel blocks to which the pixels 100 on the row corresponding to the vertical row address [3] belong are the pixel block 12 on which long-time exposure is performed and the pixel block 13 on which short-time exposure is performed. That is, the row corresponding to the vertical row address [2] and the row corresponding to the vertical row address [3] belong to the same pixel blocks 12 and 13. Therefore, the operation performed on the row corresponding to the vertical row address [3] in the fourth HD period is the same as the operation performed on the row corresponding to the vertical row address [2] in the third HD period.

Specifically, the control signals hblk_s [1] is maintained at the high level subsequently from the third HD period, the control signals hblk_s [0], hblk_1 [0], and hblk_1 [1] are maintained at the low level.

At the time t13, the vertical scanning unit 2 controls the control signal ptx [3] on the row corresponding to the vertical row address [3] to the high level. Thereby, the in-pixel-block control unit 14 of the pixel block 12 outputs the low level control signal tx [0, 3] in accordance with the logic circuit of FIG. 6. Further, the in-pixel-block control unit 14 of the pixel block 13 outputs the high level control signal tx [1, 3] in accordance with the logic circuit of FIG. 6.

Thereby, while no operation occurs in the pixels 100 on the row corresponding to the vertical row address [3] of the pixel block 12, the transfer transistor M1 is turned on in the pixels 100 on the row corresponding to the vertical row address [3] of the pixel block 13. At this time, the control signal pres [3] is at the high level, the reset transistor M3 of the pixels 100 on the row corresponding to the vertical row address [3] is also already turned on, and the FD node is in a reset state. Therefore, when the transfer transistor M1 is turned on, the photoelectric converter PD is reset to a potential in accordance with the voltage VDD via the reset transistor M3 and the transfer transistor M1.

The vertical scanning unit 2 controls the control signal ptx [3] from the high level to the low level at a predetermined timing after the completion of reset of the photoelectric converter PD. Thereby, the control signal tx [1, 3] output from the in-pixel-block control unit 14 of the pixel block 13 also returns to the low level. The timing when the control signal tx [1, 3] transitions to the low level is a timing when exposure time starts in the photoelectric converter PD of the pixels 100 on the row corresponding to the vertical row address [3] of the pixel block 13.

At the time t14, the horizontal synchronization signal HD is controlled to the high level, and the fourth HD period of the second frame ends. The horizontal region control unit 3 controls the control signal hblk_s [1] from the high level to the low level so that the control signal ptx [n] does not enter any of the pixel blocks.

In such a way, in the second frame, accumulation of signal charge is started in the pixels 100 of the pixel blocks 10 and 13, and no operation is performed on the pixels 100 of the pixel blocks 11 and 12.

Next, the third frame, which is a frame of a readout operation to read out a pixel signal from the pixel unit 1, will be described. The third frame starts from approximately the time t15 in FIG. 8. In this example, an operation up to outputting, to the vertical output line 106, a signal Vout based on amount of signal charge accumulated in the photoelectric converter PD of the pixel 100 will be described as an operation performed in the third frame.

At the time t15, the vertical synchronization signal VD and the horizontal synchronization signal HD are controlled to the high level, and the first HD period of the third frame starts.

In the third frame, readout of a signal from the pixels 100 belonging to all the pixel blocks is performed. Accordingly, the horizontal region control unit 3 maintains the control signals hblk_1 [0], hblk_1 [1], hblk_s [0], and hblk_s [1] at the high level over the entire period of the third frame. Thereby, the control signal ptx [n] will be input to the in-pixel-block control units 14 of all the pixel blocks located on a row corresponding to the vertical row address [n].

In the first HD period, readout of signals from the pixels 100 belonging to the row corresponding to the vertical row address [0] is performed. In response to the horizontal synchronization signal HD being controlled to the high level at the time t15, the vertical scanning unit 2 controls the control signal pres [0] from the high level to the low level and controls the control signal psel [0] from the low level to the high level in synchronization with the horizontal synchronization signal HD. Thereby, the reset transistor M3 of each pixel 100 belonging to the row corresponding to the vertical row address [0] is turned off, and a reset state of the FD node is released. Further, the select transistor M5 of each pixel 100 belonging to the row corresponding to the vertical row address [0] is turned on to have a state where a signal of the pixel 100 may be output to the vertical output line 106.

At the time t16, the vertical scanning unit 2 controls a control signal ptx [0] of the row corresponding to the vertical row address [0] to the high level. As described previously, since the control signals hblk_1 [0] and hblk_s [0] are at the high level, the high level control signal tx [0, 0] is input to the pixels 100 belonging to the row corresponding to the vertical row address [0] of the pixel block 10. Further, since the control signals hblk_1 [1] and hblk_s [1] are at the high level, the high level control signal tx [1, 0] is input to the pixels 100 belonging to the row corresponding to the vertical row address [0] of the pixel block 11. Thereby, the transfer transistor M1 is turned on in all the pixels 100 belonging to the row corresponding to the vertical row address [0], and signal charge accumulated in the photoelectric converter PD are transferred to the FD node.

Then, the control signal ptx [0] on the row corresponding to the vertical row address [0] is controlled to the low level by the vertical scanning unit 2, and the transfer transistors M1 are turned off in all the pixels 100 belonging to the row corresponding to the vertical row address [0]. Thereby, the potential of the FD node is fixed, and a signal in accordance with the amount of signal charge transferred to the FD node is output to the vertical output line 106 via the amplifier transistor M4 and the select transistor M5. The timing when the transfer transistor M1 is controlled to be turned off, that is, the timing when the control signal ptx [0] transitions from the high level to the low level is the timing when the exposure periods of long-time exposure and short-time exposure on the row corresponding to the vertical row address [0] end.

At the time t17, the horizontal synchronization signal HD is controlled to the high level, the first HD period of the third frame ends, and the second HD period of the third frame starts.

At the time t17, the vertical scanning unit 2 controls the control signal pres [0] from the low level to the high level in synchronization with the horizontal synchronization signal HD to control the control signal psel [0] from the high level to the low level. Thereby, the reset transistor M3 of each pixel 100 belonging to the row corresponding to the vertical row address [0] is turned on, and the FD nodes enter a reset state again. Further, the select transistor M5 of each pixel 100 belonging to the row corresponding to the vertical row address [0] is turned off, and the pixels 100 are separated from the vertical output lines 106. Thereby, a series of processes of the first HD period end.

Similarly, at the time t17, the vertical scanning unit 2 controls the control signal pres [1] from the high level to the low level in synchronization with the horizontal synchronization signal HD to control the control signal psel [1] from the low level to the high level. Thereby, the reset transistor M3 of each pixel 100 belonging to the row corresponding to the vertical row address [1] is turned off, and the reset state of the FD nodes is released. Further, the select transistor M5 of each pixel 100 belonging to the row corresponding to the vertical row address [1] is turned on to have a state where a signal of the pixel 100 may be output to the vertical output line 106.

At the time t18, the vertical scanning unit 2 controls a control signal ptx [1] of the row corresponding to the vertical row address [1] to the high level. As described previously, since the control signals hblk_1 [1] and hblk_s [1] are at the high level, the high level control signal tx [0, 1] is input to the pixels 100 belonging to the row corresponding to the vertical row address [1] of the pixel block 10. Further, since the control signals hblk_1 [1] and hblk_s [1] are at the high level, the high level control signal tx [1, 1] is input to the pixels 100 belonging to the row corresponding to the vertical row address [1] of the pixel block 11. Thereby, the transfer transistors M1 are turned on in all the pixels 100 belonging to the row corresponding to the vertical row address [1], and signal charge accumulated in the photoelectric converter PD are transferred to the FD node.

Then, the control signal ptx [1] on the row corresponding to the vertical row address [1] is controlled to the low level by the vertical scanning unit 2, and the transfer transistors M1 are turned off in all the pixels 100 belonging to the row corresponding to the vertical row address [1]. Thereby, the potential of the FD node is fixed, and a signal in accordance with the amount of signal charge transferred to the FD node is output to the vertical output line 106 via the amplifier transistor M4 and the select transistor M5. The timing when the transfer transistor M1 is controlled to be turned off, that is, the timing when the control signal ptx [1] transitions from the high level to the low level is the timing when the exposure periods of long-time exposure and short-time exposure on the row corresponding to the vertical row address [1] end.

At the time t19, the horizontal synchronization signal HD is controlled to the high level, the second HD period of the third frame ends, and the third HD period of the third frame starts.

At the time t19, the vertical scanning unit 2 controls the control signal pres [1] from the low level to the high level in synchronization with the horizontal synchronization signal HD to control the control signal psel [1] from the high level to the low level. Thereby, the reset transistor M3 of each pixel 100 belonging to the row corresponding to the vertical row address [1] is turned on, and the FD nodes enter a reset state again. Further, the select transistor M5 of each pixel 100 belonging to the row corresponding to the vertical row address [1] is turned off, and the pixels 100 are separated from the vertical output lines 106. Thereby, a series of processes of the second HD period end.

Similarly, at the time t19, the vertical scanning unit 2 controls the control signal pres [2] from the high level to the low level in synchronization with the horizontal synchronization signal HD to control the control signal psel [2] from the low level to the high level. Thereby, the reset transistor M3 of each pixel 100 belonging to the row corresponding to the vertical row address [2] is turned off, and the reset state of the FD nodes is released. Further, the select transistor M5 of each pixel 100 belonging to the row corresponding to the vertical row address [2] is turned on to have a state where a signal of the pixel 100 may be output to the vertical output line 106.

At the time t20, the vertical scanning unit 2 controls a control signal ptx [2] of the row corresponding to the vertical row address [2] to the high level. As described previously, since the control signals hblk_1 [0] and hblk_s [0] are at the high level, the high level control signal tx [0, 2] is input to the pixels 100 belonging to the row corresponding to the vertical row address [2] of the pixel block 12. Further, since the control signals hblk_1 [1] and hblk_s [1] are at the high level, the high level control signal tx [1, 2] is input to the pixels 100 belonging to the row corresponding to the vertical row address [2] of the pixel block 13. Thereby, the transfer transistors M1 are turned on in all the pixels 100 belonging to the row corresponding to the vertical row address [2], and signal charge accumulated in the photoelectric converter PD are transferred to the FD node.

Then, the control signal ptx [2] on the row corresponding to the vertical row address [2] is controlled to the low level by the vertical scanning unit 2, and the transfer transistors M1 are turned off in all the pixels 100 belonging to the row corresponding to the vertical row address [2]. Thereby, the potential of the FD node is fixed, and a signal in accordance with the amount of signal charge transferred to the FD node is output to the vertical output line 106 via the amplifier transistor M4 and the select transistor M5. The timing when the transfer transistor M1 is controlled to be turned off, that is, the timing when the control signal ptx [2] transitions from the high level to the low level is the timing when the exposure periods of long-time exposure and short-time exposure on the row corresponding to the vertical row address [2] end.

At the time t21, the horizontal synchronization signal HD is controlled to the high level, the third HD period of the third frame ends, and the fourth HD period of the third frame starts.

At the time t21, the vertical scanning unit 2 controls the control signal pres [2] from the low level to the high level in synchronization with the horizontal synchronization signal HD to control the control signal psel [2] from the high level to the low level. Thereby, the reset transistor M3 of each pixel 100 belonging to the row corresponding to the vertical row address [2] is turned on, and the FD nodes enter a reset state again. Further, the select transistor M5 of each pixel 100 belonging to the row corresponding to the vertical row address [2] is turned off, and the pixels 100 are separated from the vertical output lines 106. Thereby, a series of processes of the third HD period end.

Similarly, at the time t21, the vertical scanning unit 2 controls the control signal pres [3] from the high level to the low level in synchronization with the horizontal synchronization signal HD to control the control signal psel [3] from the low level to the high level. Thereby, the reset transistor M3 of each pixel 100 belonging to the row corresponding to the vertical row address [3] is turned off, and the reset state of the FD nodes is released. Further, the select transistor M5 of each pixel 100 belonging to the row corresponding to the vertical row address [3] is turned on to have a state where a signal of the pixel 100 may be output to the vertical output line 106.

At the time t22, the vertical scanning unit 2 controls a control signal ptx [3] of the row corresponding to the vertical row address [3] to the high level. As described previously, since the control signals hblk_1 [0] and hblk_s [0] are at the high level, the high level control signal tx [0, 3] is input to the pixels 100 belonging to the row corresponding to the vertical row address [3] of the pixel block 12. Further, since the control signals hblk_1 [1] and hblk_s [1] are at the high level, the high level control signal tx [1, 3] is input to the pixels 100 belonging to the row corresponding to the vertical row address [3] of the pixel block 13. Thereby, the transfer transistors M1 are turned on in all the pixels 100 belonging to the row corresponding to the vertical row address [3], and signal charge accumulated in the photoelectric converter PD are transferred to the FD node.

Then, the control signal ptx [3] on the row corresponding to the vertical row address [3] is controlled to the low level by the vertical scanning unit 2, and the transfer transistors M1 are turned off in all the pixels 100 belonging to the row corresponding to the vertical row address [3]. Thereby, the potential of the FD node is fixed, and a signal in accordance with the amount of signal charge transferred to the FD node is output to the vertical output line 106 via the amplifier transistor M4 and the select transistor M5. The timing when the transfer transistor M1 is controlled to be turned off, that is, the timing when the control signal ptx [3] transitions from the high level to the low level is the timing when the exposure periods of long-time exposure and short-time exposure on the row corresponding to the vertical row address [3] end.

At the time t23, the vertical scanning unit 2 controls the control signal pres [3] from the low level to the high level in synchronization with the horizontal synchronization signal HD to control the control signal psel [3] from the high level to the low level. Thereby, the reset transistor M3 of each pixel 100 belonging to the row corresponding to the vertical row address [3] is turned on, and the FD nodes enter a reset state again. Further, the select transistor M5 of each pixel 100 belonging to the row corresponding to the vertical row address [3] is turned off, and the pixels 100 are separated from the vertical output lines 106. Thereby, a series of processes of the fourth HD period end.

Such driving of the imaging device 1000 as described above enables control of a shutter operation on a pixel block basis.

Next, a process performed on the signal Vout read out from the pixel unit 1 will be described with reference to FIG. 9 and FIG. 10 while illustrating a more specific configuration of the amplifier 5 and the column AD conversion unit 6.

As illustrated in FIG. 9, the amplifier 5 includes a plurality of column amplifiers 50 corresponding to respective columns of the pixels 100 forming the pixel unit 1. Each of the column amplifiers 50 includes a column amplifier 500 and a column amplifier 501. The input terminals of the column amplifiers 500 and 501 are connected in parallel to the vertical output line 106 on a corresponding column. Gains different from each other may be set for the column amplifier 500 and the column amplifier 501. The gain setting values of the column amplifiers 500 and 501 are preset by the timing generation unit 4 and provided to the column amplifiers 500 and 501 with setting values r_gain1 and r_gain2 output from the timing generation unit 4. The column amplifier 500 outputs a signal amplified at a predetermined gain (setting value r_gain1) as a signal amp1 from the output terminal. The column amplifier 501 outputs a signal amplified at a predetermined gain (setting value r_gain2) as a signal amp2 from the output terminal.

As illustrated in FIG. 9, the column AD conversion unit 6 includes a sample and hold circuit 60, an AD converter circuit 61, and a memory 62 in association with each of the column amplifier 500 and the column amplifier 501 of the column amplifier 50 on each column. The sample and hold circuit 60 temporarily holds the signal amp1 output from the column amplifier 500 (or the signal amp2 output from the column amplifier 501) of the column amplifier 50. The AD converter circuit 61 converts the signal amp1 held in the sample and hold circuit 60 (or the signal amp2 output from the column amplifier 501), which is an analog signal, into a digital signal. For example, the AD converter circuit 61 compares a signal held in the sample and hold circuit 60 with a ramp signal provided from another block by using a comparator (not illustrated) and sets, as a digital value, a count value corresponding to the time until the level relationship of these signals changes. The memory 62 holds a digital value of a signal converted by the AD converter circuit 61 on a bit basis.

FIG. 10 is a timing chart illustrating the operation of the first HD period of the third frame in the timing chart of FIG. 8 (from the time t15 to the time t17) in more detail. The time t24, the time t25, and the time t27 in FIG. 10 correspond to the time t15, the time t16, and the time t17 in FIG. 8.

As described previously, the control signals hblk_1 [0], hblk_1 [1], hblk_s [0], hblk_s [1], psel [0] are at the high level over the entire period of the first HD period of the third frame, and the control signal pres [0] is at the low level.

In the period from the time t25 to the time t26, the vertical scanning unit 2 controls the control signal ptx [0] on the row corresponding to the vertical row address [0] to the high level. Thereby, the control signal tx [0, 0] input to the pixels 100 belonging to the row corresponding to the vertical row address [0] of the pixel block 10 transitions to the high level. Further, the control signal tx [1, 0] input to the pixels 100 belonging to the row corresponding to the vertical row address [0] of the pixel block 11 transitions to the high level.

Thereby, in all the pixels 100 belonging to the row corresponding to the vertical row address [0], the transfer transistor M1 is turned on, and signal charge accumulated in the photoelectric converter PD are transferred to the FD node. A signal in accordance with the amount of signal charge transferred to the FD node are then output to the vertical output line 106 via the amplifier transistor M4 and the select transistor M5.

FIG. 10 represents a signal output from the pixels 100 of the pixel block 10 as Vout [0, 0], and a signal output from the pixels 100 of the pixel block 11 as Vout [1, 0]. Note that FIG. 10 indicates that the signal Vout before the time t25 is in a state where the level is low and the signal Vout on and after the time t25 is in a state where the level is high. Since the pixel block 10 is bright as a whole as illustrated in FIG. 7, the signal Vout [0, 0] is at a relatively higher level. On the other hand, since the pixel block 11 is dark as a whole as illustrated in FIG. 7, the signal Vout [1, 0] is at a relatively lower level.

While the signal Vout is being output from the vertical output line 106, the timing generation unit 4 outputs a setting value r_gain1 to the column amplifier 500 and outputs a setting value r_gain2 to the column amplifier 501. As an example here, the setting value r_gain1 is set so as to multiply the signal Vout by 0.5, and the setting value r_gain2 is set so as to multiply the signal Vout by 2.

Thereby, signals amp1 [0, 0] and amp2 [0, 0] having a reduced level obtained by multiplying, by 0.5, the signal Vout [0, 0] whose level is originally high are output from the column amplifiers 500 and 501 on the column corresponding to the pixel block 10. On the other hand, signals amp1 [1, 0] and amp2 [1, 0] having an increased level obtained by multiplying, by 2, the signal Vout [1, 0] whose level is originally low are output from the column amplifiers 500 and 501 on the column corresponding to the pixel block 11.

After the control signal ptx [0] transitions from the high level to the low level at the time t26, since the control signal psel is still at the high level, the signal Vout is held as it stands. Similarly, the 0.5-fold output is held as the signal amp1, and the 2-fold output is held as the signal amp2.

As described above, in the present embodiment, in the imaging device that may control exposure time on a pixel block basis, an output signal may be amplified at multiple types of gains. Therefore, for example, with a configuration in which a dark (low level) signal is amplified at a high gain and a bright (high level) signal is amplified at a low gain, an image in which blacked up shadows or blown out highlights is suppressed over an object to a background may be acquired.

Second Embodiment

Figure 11:
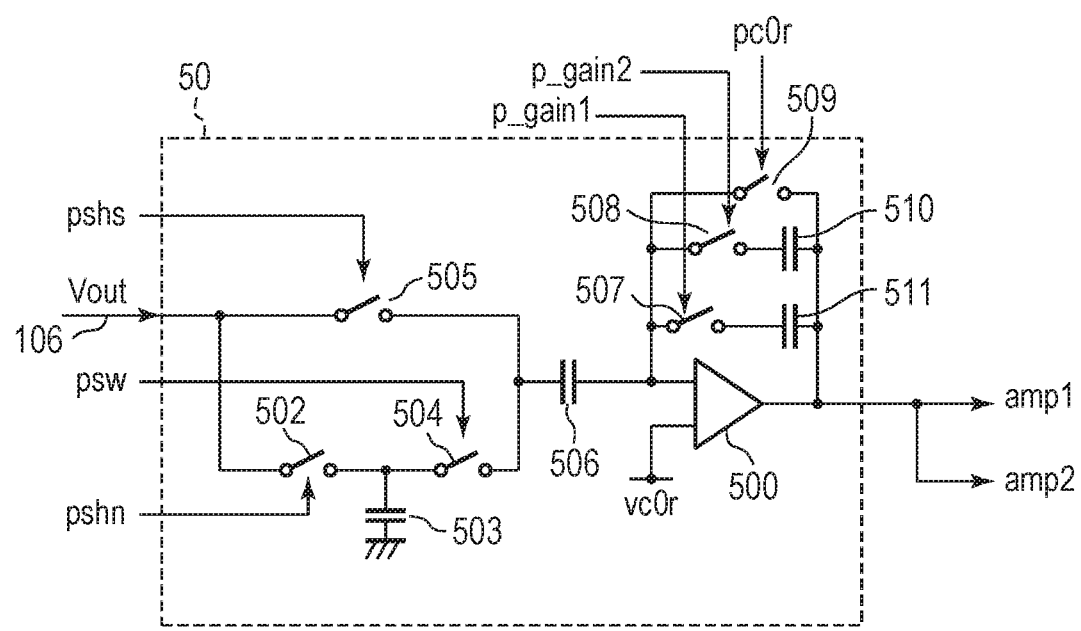
FIG. 11 is a circuit diagram illustrating a configuration example of an amplifier in an imaging device according to a second embodiment of the present invention.

An imaging device and a method of driving the same according to a second embodiment of the present invention will be described with reference to FIG. 11 and FIG. 12. Components similar to those of the imaging device according to the first embodiment are labeled with the same references, and the description thereof will be omitted or simplified.

In the imaging device according to the first embodiment, the two column amplifiers 500 and 501 are provided in the column amplifier 50, and the signals amp1 and amp2 are obtained at the same time from these two column amplifiers 500 and 501. In the present embodiment, an imaging device configured to switch a gain of one column amplifier included in the column amplifier 50 and output the signal amp1 and the signal amp2 in a time division manner will be described.

First, the imaging device according to the present embodiment will be described by using FIG. 11. FIG. 11 is a circuit diagram illustrating a configuration example of a column amplifier of an amplifier in the imaging device according to the present embodiment.

The imaging device according to the present embodiment is the same as the imaging device according to the first embodiment except for a difference in the configuration of the column amplifier 50. That is, as illustrated in FIG. 11, the column amplifier 50 of the imaging device according to the present embodiment includes a column amplifier 500, capacitors 503, 506, 510, and 511, and switches 502, 504, 505, 507, 508, and 509.

One terminal of the switch 502 and one terminal of the switch 505 are connected to the vertical output line 106. The other terminal of the switch 502 is connected to one terminal of the capacitor 503 and one terminal of the switch 504. The other terminal of the capacitor 503 is connected to the ground node. The other terminal of the switch 505 and the other terminal of the switch 504 are connected to one terminal of the capacitor 506. The other terminal of the capacitor 506 is connected to one terminal of the switch 507, one terminal of the switch 508, one terminal of the switch 509, and one input terminal of the column amplifier 500. A voltage vc0r is supplied to the other input terminal of the column amplifier 500. The other terminal of the switch 507 is connected to one terminal of the capacitor 511. The other terminal of the switch 508 is connected to one terminal of the capacitor 510. The output terminal of the column amplifier 500 that is also the output terminal of the column amplifier 50 is connected to the other terminal of the switch 509, the other terminal of the capacitor 510, and the other terminal of the capacitor 511. The column amplifier 500 is a differential amplifier, for example, the one input terminal described above is an inverting input terminal, for example, and the other input terminal described above is a non-inverting input terminal, for example.

The connection state (conduction/non-conduction) of the switch 502 is controlled by the control signal pshn. The connection state of the switch 504 is controlled by the control signal psw. The connection state of the switch 505 is controlled by the control signal pshs. The connection state of the switch 507 is controlled by the control signal p_gain1. The connection state of the switch 508 is controlled by the control signal p_gain2. The connection state of the switch 509 is controlled by the control signal pc0r. It is assumed here that each of the switches 502, 504, 505, 507, 508, and 509 is turned on (conduction state) when the corresponding control signal is at the high level and is turned off (non-conduction state) when the corresponding control signal is at the low level.

Next, a method of driving the imaging device according to the present embodiment will be described by using FIG. 12. FIG. 12 is a timing chart illustrating the method of driving the imaging device according to the present embodiment.

The method of driving the imaging device according to the present embodiment is basically the same as the method of driving the imaging device according to the first embodiment except for a difference in the operation of the third frame in the timing chart of FIG. 8. The control signals pc0r, pshs, pshn, pshn, psw, p_gain1, and p_gain2 that appear for the first time in the present embodiment are maintained at a low level during the periods of the first frame and the second frame.

Figure 12:
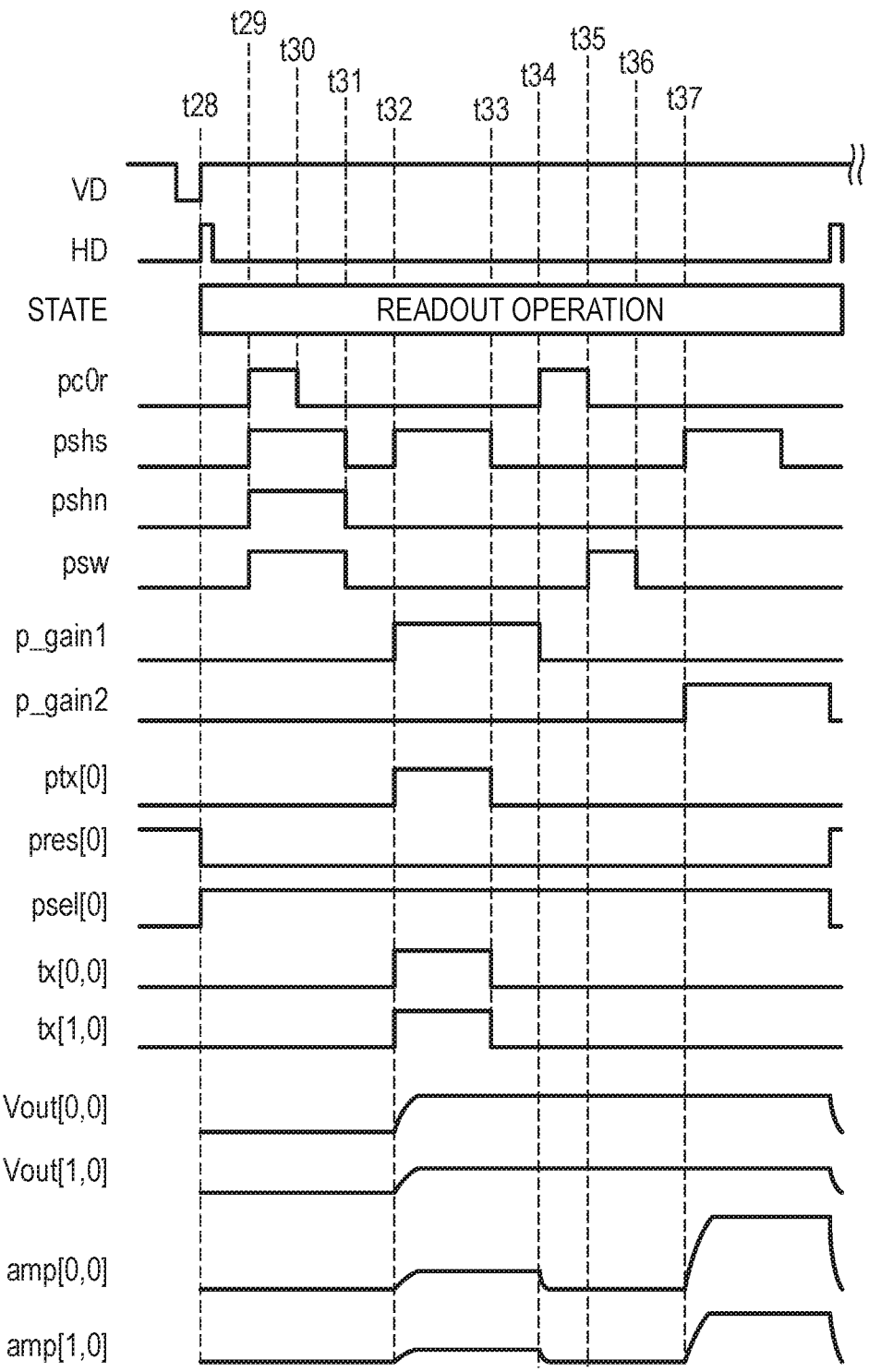
FIG. 12 is a timing chart illustrating a method of driving the imaging device according to the second embodiment of the present invention.

FIG. 12 corresponds to the first HD period of the third frame in the timing chart of FIG. 8. The time t28 and the time t32 in FIG. 12 correspond to the time t15 and the time t16 in FIG. 8.

As described previously, the control signals hblk_1 [0], hblk_1 [1], hblk_s [0], and hblk_s [1] (not illustrated) are at the high level over the entire period of the first HD period of the third frame. Further, the control signal pres [0] is at the low level, and the control signal psel [0] is at the high level.

First, at the time t29 before the time t32 when controlling the control signal ptx [0] to the high level, the timing generation unit 4 controls the control signals pc0r, pshs, pshn, and psw from the low level to the high level. Thereby, the switches 509, 505, 502, and 504 are turned on.

The switch 509 is a reset switch of the column amplifier 500. When the switch 509 is turned on, one input terminal and the output terminal of the column amplifier 500 are connected to each other to form a voltage follower, and the output voltage of the column amplifier 500 is reset to the voltage vc0r. As this time, when the switch 509 and the switches 505, 502, and 504 are turned on at the same time, the capacitors 503 and 506 are also reset to the voltage vc0r.

Next, at the time t30, the timing generation unit 4 controls the control signal pc0r from the high level to the low level. Thereby, the switch 509 is turned off, and the reset state of the column amplifier 500 is released. At this time, the timing generation unit 4 maintains the control signals pshs, pshn, and psw at the high level. Thereby, the signal Vout (N-signal) output to the vertical output line 106 is held in the capacitors 503 and 506.

Next, at the time t31, the timing generation unit 4 controls the control signals pshs, pshn, and psw to the high level to the low level. Thereby, holding of the N-signal in the capacitors 503 and 506 is completed.

Next, in the period from the time t32 to the time t33, the vertical scanning unit 2 controls the control signal ptx [0] on the row corresponding to the vertical row address [0] to the high level. Thereby, the control signal tx [0, 0] input to the pixels 100 belonging to the row corresponding to the vertical row address [0] of the pixel block 10 transitions to the high level. Further, the control signal tx [1, 0] input to the pixels 100 belonging to the row corresponding to the vertical row address [0] of the pixel block 11 transitions to the high level.

Thereby, in each of the pixels 100 belonging to the row corresponding to the vertical row address [0] of the pixel block 10, the transfer transistor M1 is turned on, and signal charge accumulated in the photoelectric converter PD are transferred to the FD node. The signal Vout [0, 0] in accordance with the amount of signal charge transferred to the FD node is then output to the vertical output line 106 on a corresponding column via the amplifier transistor M4 and the select transistor M5. Further, in each of the pixels 100 belonging to the row corresponding to the vertical row address [0] of the pixel block 11, the transfer transistor M1 is turned on, and signal charge accumulated in the photoelectric converter PD are transferred to the FD node. The signal Vout [1, 0] in accordance with the amount of signal charge transferred to the FD node is then output to the vertical output line 106 on a corresponding column via the amplifier transistor M4 and the select transistor M5.

Further, similarly, in the period from the time t32 to the time t33, the timing generation unit 4 controls the control signal pshs from the low level to the high level. Thereby, the switch 505 is turned on, and the vertical output line 106 and one terminal of the capacitor 506 are connected to each other. Thereby, in the column amplifier 50 connected to the pixels 100 of the pixel block 10, the signal Vout [0, 0] from the pixel 100 is input as a change component to the column amplifier 500 via the capacitor 506 in which the N-signal is held. Further, in the column amplifier 50 connected to the pixels 100 of the pixel block 11, the signal Vout [1, 0] from the pixel 100 is input as a change component to the column amplifier 500 via the capacitor 506 in which the N-signal is held.

Further, in a period from the time t32 to the time t34, the timing generation unit 4 controls the control signal p_gain1 from the low level to the high level. Thereby, the switch 507 is turned on, and a first feedback path is formed in which one input terminal and the output terminal of the column amplifier 500 are connected to each other via the capacitor 511. Thereby, the column amplifier 500 of the column amplifier 50 connected to the pixels 100 of the pixel block 10 outputs a signal amp [0, 0] obtained by amplifying the signal Vout [0, 0] from the pixels 100 at a gain of C0/C1-fold. Further, the column amplifier 500 of the column amplifier 50 connected to the pixels 100 of the pixel block 11 outputs a signal amp [1, 0] obtained by amplifying the signal Vout [1, 0] from the pixels 100 at a gain of C0/C1-fold.

Here, the value C0 is the capacitance value of the capacitor 506, and the value C1 is a capacitance value of the capacitor 511. When the capacitance ratio C0/C1-fold is 0.5, the signal amp [0, 0] output from the column amplifier 500 corresponds to amp1 [0, 0] of FIG. 10, and the signal amp [1, 0] output from the column amplifier 500 corresponds to amp1 [1, 0] of FIG. 10.

Next, in the period from the time t34 to the time t35, the timing generation unit 4 controls the control signal pc0r from the low level to the high level. Thereby, the switch 509 is turned on, the output voltage of the column amplifier 500 (signal amp [0, 0] or amp [1, 0]) is reset to the voltage vc0r, and the capacitor 506 is similarly reset to the voltage vc0r.

Next, in the period from the time t35 to the time t36, the timing generation unit 4 controls the control signal psw from the low level to the high level. Thereby, the switch 504 is turned on, and the N-signal held in the capacitor 503 is transferred to the capacitor 506.

Next, at the time t37, the timing generation unit 4 controls the control signal pshs from the low level to the high level. Thereby, the switch 505 is turned on, and the vertical output line 106 and one terminal of the capacitor 506 are connected to each other. Thereby, in the column amplifier 50 connected to the pixels 100 of the pixel block 10, the signal Vout [0, 0] from the pixels 100 is input as a change component to the column amplifier 500 via the capacitor 506 in which the N-signal is held. Further, in the column amplifier 50 connected to the pixels 100 of the pixel block 11, the signal Vout [1, 0] from the pixels 100 is input as a change component to the column amplifier 500 via the capacitor 506 in which the N-signal is held.

Further, similarly, at the time t37, the timing generation unit 4 controls the control signal p_gain2 from the low level to the high level. Thereby, the switch 508 is turned on, a second feedback path is formed in which one input terminal and the output terminal of the column amplifier 500 are connected to each other via the capacitor 510. Thereby, the column amplifier 500 of the column amplifier 50 connected to the pixels 100 of the pixel block 10 outputs the signal amp [0, 0] obtained by amplifying the signal Vout [0, 0] from the pixels 100 at a gain of C0/C2-fold. Further, the column amplifier 500 of the column amplifier 50 connected to the pixels 100 of the pixel block 11 outputs the signal amp [1, 0] obtained by amplifying the signal Vout [1, 0] from the pixels 100 at a gain of C0/C2-fold.

Here, the value C0 is the capacitance value of the capacitor 506, and the value C2 is a capacitance value of the capacitor 510. When the capacitance ratio C0/C2-fold is 2, the signal amp [0, 0] output from the column amplifier 500 corresponds to amp2 [0, 0] of FIG. 10, and the signal amp [1, 0] output from the column amplifier 500 corresponds to amp2 [1, 0] of FIG. 10.

As described above, according to the present embodiment, in the imaging device that may control exposure time on a pixel block basis, even when the gain of the column amplifier 500 is switched in a time division manner, an output signal may be amplified at multiple types of gains. Therefore, for example, with a configuration in which a dark (low level) signal is amplified at a high gain and a bright (high level) signal is amplified at a low gain, an image in which blacked up shadows or blown out highlights is suppressed over an object to a background may be acquired. Further, according to the configuration of the present embodiment, since the column amplifier 50 is not required to include a plurality of the same amplifier circuits, an increase in the circuit area of the amplifier 5 may also be prevented.

Note that, in the first embodiment, since the signal amp1 and the signal amp2 are simultaneously output, the column AD conversion unit 6 is required to include two sets of the sample and hold circuit 60, the AD converter circuit 61, and the memory 62 on each column. In contrast, in the present embodiment, since the signal amp1 and the signal amp2 are output in a time division manner, at least one set of the sample and hold circuit 60 and the AD converter circuit 61 is sufficient on each column. The memory 62 on each column may be formed of a memory that holds a digital value of the signal amp1 and a memory that holds a digital value of the signal amp2.

Third Embodiment

An imaging device and a method of driving the same according to a third embodiment of the present invention will be described with reference to FIG. 13 to FIG. 17. Components similar to those of the imaging device according to the first and second embodiments are labeled with the same references, and the description thereof will be omitted or simplified.

Figure 13:
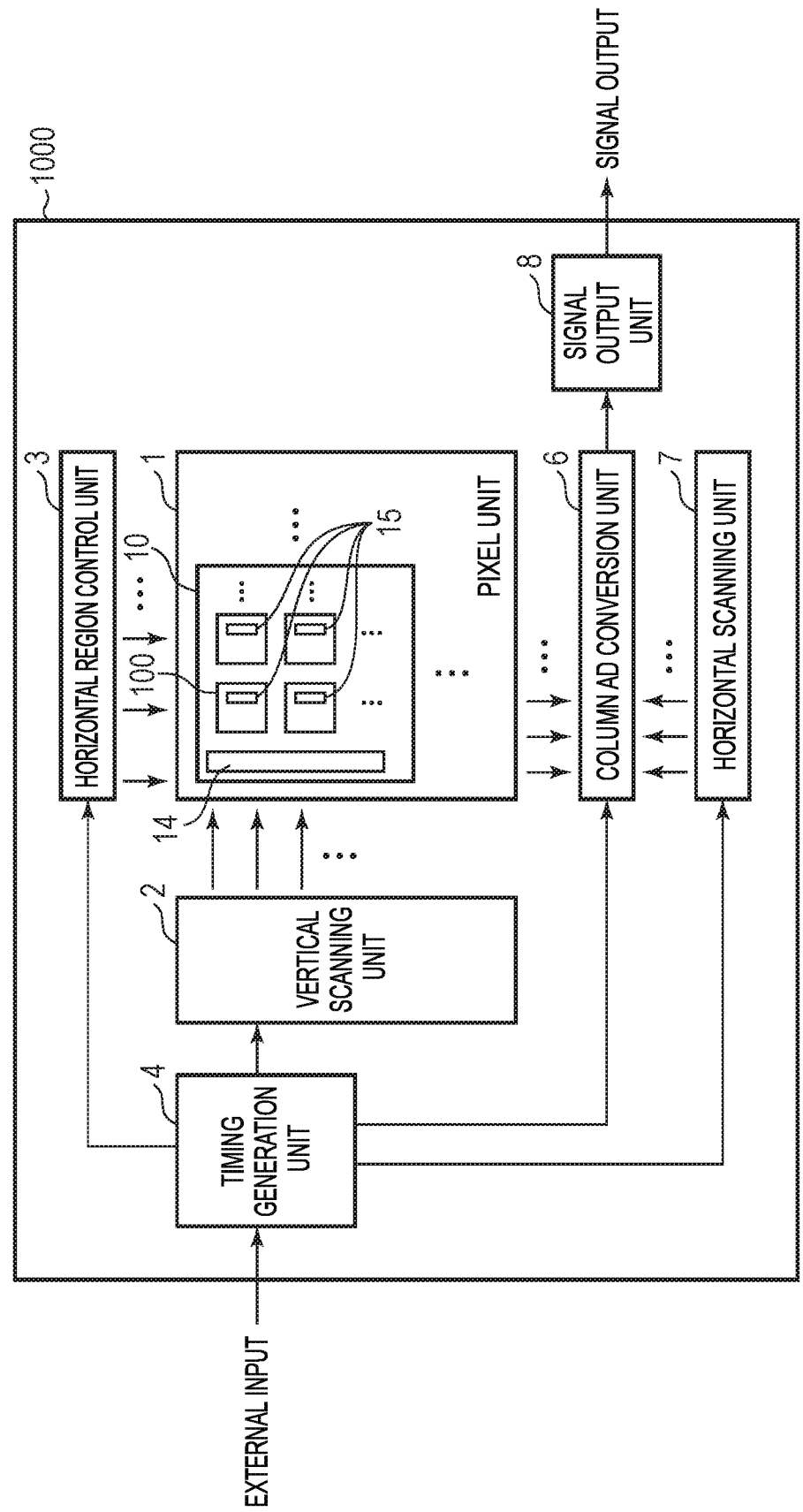
FIG. 13 is a block diagram illustrating a general configuration of an imaging device according to a third embodiment of the present invention.
Figure 14:
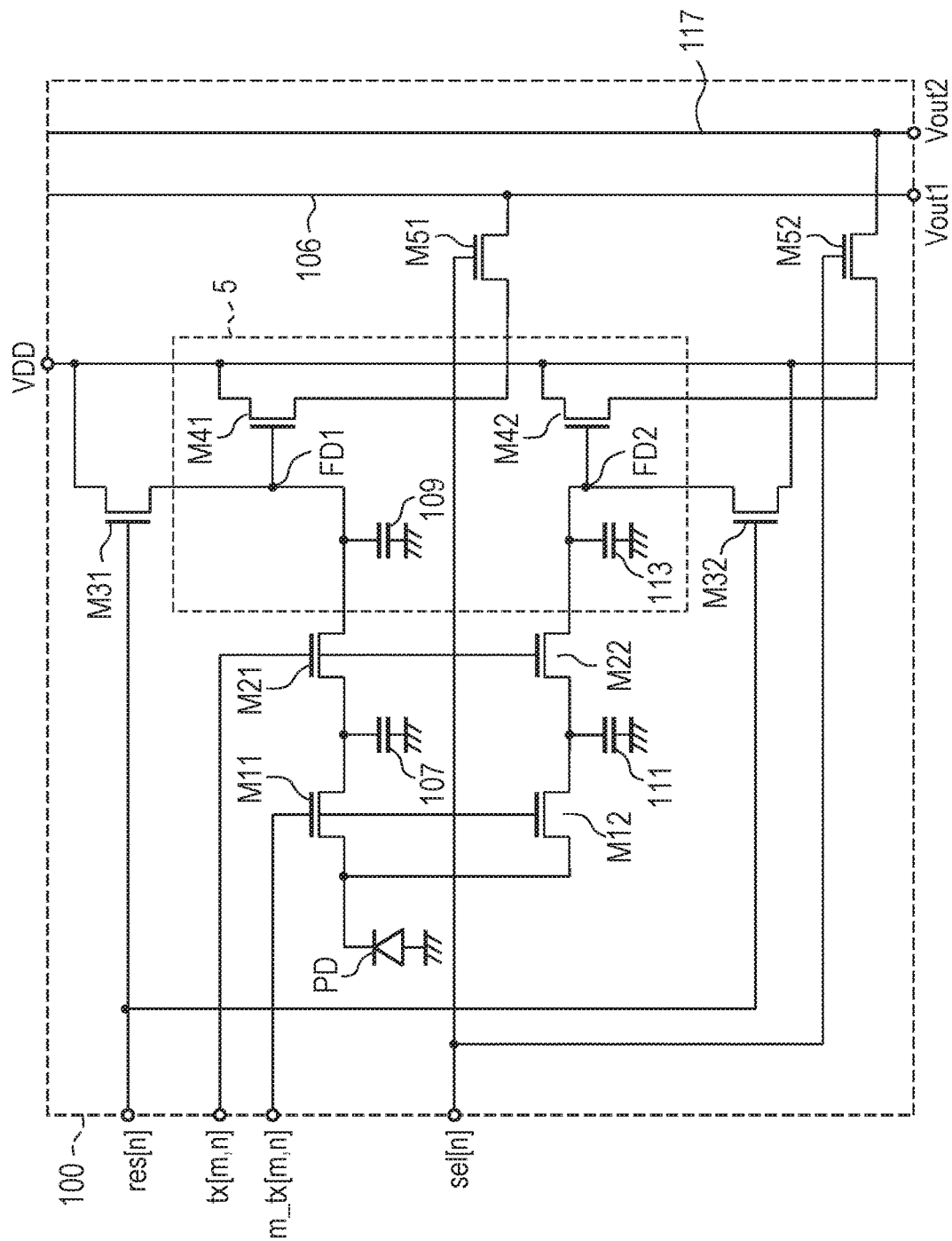
FIG. 14 is a circuit diagram illustrating a configuration example of a pixel in the imaging device according to the third embodiment of the present invention.
Figure 15:
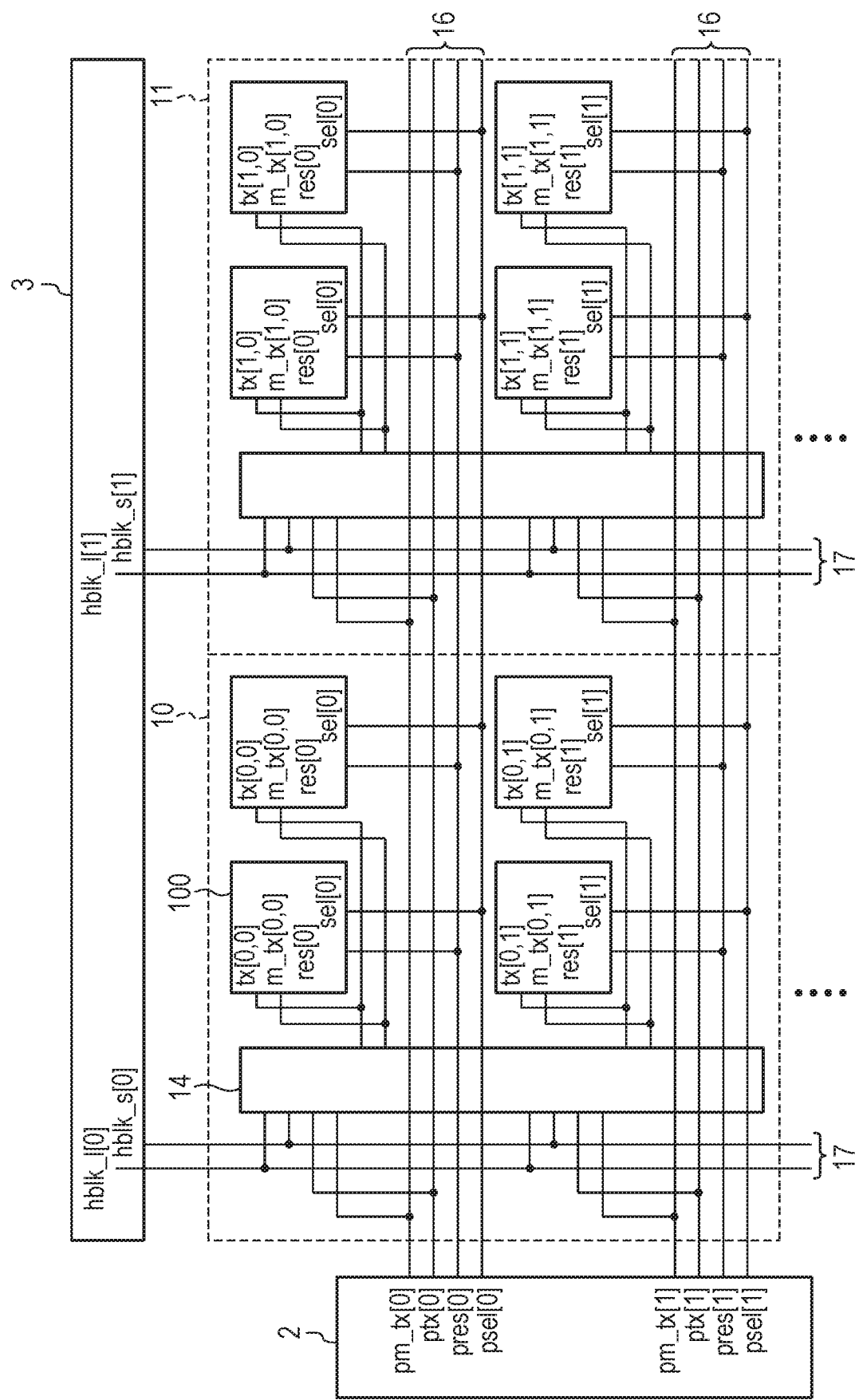
FIG. 15 is a circuit diagram illustrating a connection example between pixel blocks and a vertical scanning unit and a horizontal region control unit in the imaging device according to the third embodiment of the present invention.
Figure 16:
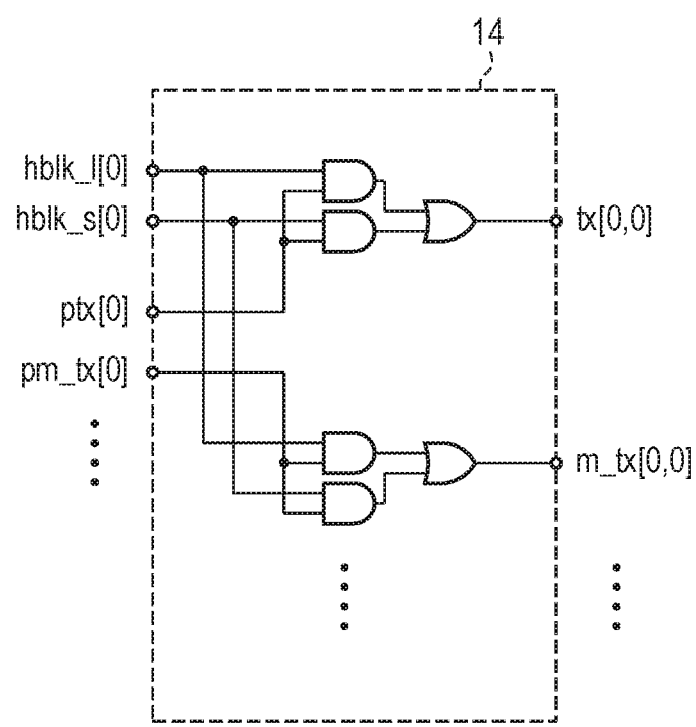
FIG. 16 is a circuit diagram illustrating a configuration example of an in-pixel-block control unit in the imaging device according to the third embodiment of the present invention.

First, the structure of the imaging device according to the present embodiment will be described by using FIG. 13 to FIG. 16. FIG. 13 is a block diagram illustrating the general configuration of the imaging device according to the present embodiment. FIG. 14 is a circuit diagram illustrating a configuration example of a pixel in the imaging device according to the present embodiment. FIG. 15 is a circuit diagram illustrating a connection example between pixel blocks and a vertical scanning unit and a horizontal region control unit in the imaging device according to the present embodiment. FIG. 16 is a circuit diagram illustrating a configuration example of an in-pixel-block control unit in the imaging device according to the present embodiment.

As illustrated in FIG. 13, the imaging device 1000 according to the present embodiment includes the pixel unit 1, the vertical scanning unit 2, the horizontal region control unit 3, the timing generation unit 4, the column AD conversion unit 6, the horizontal scanning unit 7, and the signal output unit 8. The pixel unit 1 includes a plurality of pixel blocks 10 that are two-dimensionally arranged. Each of the plurality of pixel blocks 10 includes a plurality of pixels 100 arranged two-dimensionally over a plurality of rows and a plurality of columns, the in-pixel-block control unit 14, and the amplifiers 15. That is, the imaging device 1000 according to the present embodiment is different from the imaging device 1000 according to the first embodiment in that the amplifier 15 of the pixel 100 has at least a part of the function of the amplifier 5 in the imaging device 1000 according to the first embodiment.

That is, as illustrated in FIG. 14, the pixel 100 of the imaging device 1000 according to the present embodiment includes the photoelectric converter PD, transfer transistors M11, M12, M21, and M22, reset transistors M31 and M32, and amplifier transistors M41 and M42. Further, the pixel 100 of the imaging device 1000 according to the present embodiment further includes select transistors M51 and M52 and capacitors 107, 109, 111, and 113. The amplifier transistors M41 and M42 and the capacitors 109 and 113 form the amplifier 15 of the pixel 100.

The photoelectric converter PD is a photodiode, for example. The photodiode forming the photoelectric converter PD has an anode and a cathode, the anode is connected to a ground node, and the cathode is connected to the sources of the transfer transistors M11 and M12.

The drain of the transfer transistor M11 is connected to the source of the transfer transistor M21. The connection node between the drain of the transfer transistor M11 and the source of the transfer transistor M21 includes a capacitance component that functions as a holding portion of charge. This capacitance component is represented by the capacitor 107 in FIG. 14. The drain of the transfer transistor M21 is connected to the source of the reset transistor M31 and the gate of the amplifier transistor M41. The connection node of the drain of the transfer transistor M21, the source of the reset transistor M31, and the gate of the amplifier transistor M41 is an FD node FD1. The capacitance component coupled to the FD node FD1 functions as a holding portion of charge transferred from the capacitor 107 and also functions as a charge-to-voltage conversion unit. This capacitance component is represented by the capacitor 109 in FIG. 14. The drain of the reset transistor M31 and the drain of the amplifier transistor M41 are connected to a power supply node that supplies the voltage VDD. The source of the amplifier transistor M41 is connected to the drain of the select transistor M51. The source of the select transistor M51 is connected to the vertical output line 106. The vertical output line 106 is connected to a current source (not illustrated).

The drain of the transfer transistor M12 is connected to the source of the transfer transistor M22. The connection node between the drain of the transfer transistor M12 and the source of the transfer transistor M22 includes a capacitance component that functions as a holding portion of charge. This capacitance component is represented by the capacitor 111 in FIG. 14. In one example, the capacitance value of the capacitor 111 is the same as the capacitance value of the capacitor 107. The drain of the transfer transistor M22 is connected to the source of the reset transistor M32 and the gate of the amplifier transistor M42. The connection node of the drain of the transfer transistor M22, the source of the reset transistor M32, and the gate of the amplifier transistor M42 is an FD node FD2. The capacitance component coupled to the FD node FD2 functions as a holding portion of charge transferred from the capacitor 111 and also functions as a charge-to-voltage conversion unit. This capacitance component is represented by the capacitor 113 in FIG. 14. Note that the capacitance value of the capacitor 113 is larger than the capacitance value of the capacitor 109. The drain of the reset transistor M32 and the drain of the amplifier transistor M42 are connected to a power supply node that supplies the voltage VDD. The source of the amplifier transistor M42 is connected to the drain of the select transistor M52. The source of the select transistor M52 is connected to a vertical output line 117. The vertical output line 117 is connected to a current source (not illustrated).

The photoelectric converter PD converts (photoelectrically converts) incident light into amount of charge in accordance with the light amount and accumulates the generated charge. When turned on, the transfer transistor M11 transfers charge of the photoelectric converter PD to the capacitor 107. When turned on, the transfer transistor M21 transfers charge of the capacitor 107 to the capacitor 109 of the FD node FD1. The FD node FD1 has a voltage in accordance with the amount of charge transferred from the capacitor 107 through charge-to-voltage conversion by using the capacitor 109. The amplifier transistor M41 is configured such that the voltage VDD is supplied to the drain and a bias current is supplied to the source from a current source (not illustrated) via the select transistor M51 and forms an amplifier (a source follower circuit) whose gate is the input node. Thereby, the amplifier transistor M41 outputs a signal based on the voltage of the FD node FD1 to the vertical output line 106 via the select transistor M51. When turned on, the reset transistor M31 resets the capacitor 109 of the FD node FD1 to a voltage in accordance with the voltage VDD.

When turned on, the transfer transistor M12 transfers charge of the photoelectric converter PD to the capacitor 111. When turned on, the transfer transistor M22 transfers charge of the capacitor 111 to the capacitor 113 of the FD node FD2. The FD node FD2 has a voltage in accordance with the amount of charge transferred from the capacitor 111 through charge-to-voltage conversion by using the capacitor 113. The amplifier transistor M42 is configured such that the voltage VDD is supplied to the drain and a bias current is supplied to the source from a current source (not illustrated) via the select transistor M52 and forms an amplifier (a source follower circuit) whose gate is the input node. Thereby, the amplifier transistor M42 outputs a signal based on the voltage of the FD node FD2 to the vertical output line 117 via the select transistor M52. When turned on, the reset transistor M32 resets the capacitor 113 of the FD node FD2 to a voltage in accordance with the voltage VDD.

As described previously, the capacitance value of the capacitor 109 coupled to the FD node FD1 and the capacitance value of the capacitor 113 coupled to the FD node FD2 are different from each other. That is, the gain of the amplifier including the amplifier transistor M41 and the gain of the amplifier including the amplifier transistor M42 are different from each other.

The transfer transistors M11 and M12 are controlled by a common control signal m_tx [m, n] supplied to the gate. The transfer transistors M21 and M22 are controlled by a common control signal tx [m, n] supplied to the gate. The reset transistors M31 and M32 are controlled by a common control signal res [n] supplied to the gate. The select transistors M51 and M52 are controlled by a common control signal sel [n] supplied to the gate.

FIG. 15 illustrates the connection between the pixel blocks 10 and 11 of the pixel unit 1 and the vertical scanning unit 2 and the horizontal region control unit 3. A difference from the case of the first embodiment illustrated in FIG. 5 is that the vertical scanning unit 2 is configured to further supply a control signal pm_tx [n]. The control signal pm_tx [n] is supplied to the in-pixel-block control unit 14 of a pixel block arranged on a row corresponding to the vertical row address [n] and is utilized to generate the control signal m_tx [n] supplied to the pixels 100.

The in-pixel-block control unit 14 of each pixel block may be formed of a circuit illustrated in FIG. 16, for example. FIG. 16 illustrates a configuration example of the in-pixel-block control unit 14 provided in the pixel block 10 as an example.

The in-pixel-block control unit 14 of the pixel block 10 is input with the control signals hblk_1 [0], hblk_s [0], and ptx [0] and outputs the control signal tx [0, 0] to the pixels 100 arranged on the row corresponding to the vertical row address [0]. The control signal tx [0, 0] transitions to a high level by the control signal ptx [0] being controlled to a high level when the control signal hblk_1 [0] or the control signal hblk_s [0] is at a high level. Further, the in-pixel-block control unit 14 of the pixel block 10 is input with the control signals hblk_1 [0], hblk_s [0], and pm_tx [0] and outputs the control signal m_tx [0, 0] to the pixels 100 arranged on the row corresponding to the vertical row address [0]. The control signal m_tx [0, 0] transitions to a high level by the control signal pm_tx [0] being controlled to a high level when the control signal hblk_1 [0] or the control signal hblk_s [0] is at a high level. The same applies to the pixels 100 arranged on the row corresponding to the vertical row address [1].

The circuit that implements such operations in the in-pixel-block control unit 14 is not particularly limited and may be formed of the logic circuit illustrated in FIG. 16, for example. The logic circuit illustrated in FIG. 16 includes an AND gate that calculates a logical product of the control signals hblk_1 [0] and ptx [0], an AND gate that calculates a logical product of the control signals hblk_s [0] and ptx [0], and an OR gate that calculates a logical sum of these output values. The output of the OR gate is the control signal tx [0, 0]. Further, the logic circuit illustrated in FIG. 16 includes an AND gate that calculates a logical product of the control signals hblk_1 [0] and pm_tx [0], an AND gate that calculates a logical product of the control signals hblk_s [0] and pm_tx [0], and an AND gate that calculates a logical sum of these output values. The output of the OR gate is the control signal m_tx [0, 0].

In such a way, the control signals tx [m, n] and m_tx [m, n] to be provided to the pixels 100 are generated by the in-pixel-block control unit 14. The control signals pres [n] and psel [n] generated by the vertical scanning unit 2 are directly provided to the pixels 100 arranged on a row corresponding to the vertical row address [n] as the control signals res [n] and sel [n]. As illustrated in FIG. 14, the control signal m_tx [m, n] is provided to the gates of the transfer transistors M11 and M12. The control signal tx [m, n] is provided to the gates of the transfer transistors M21 and M22. The control signal res [n] is provided to the gates of the reset transistors M31 and M32. The control signal sel [n] is provided to the gates of the select transistors M51 and M52.

Figure 17:
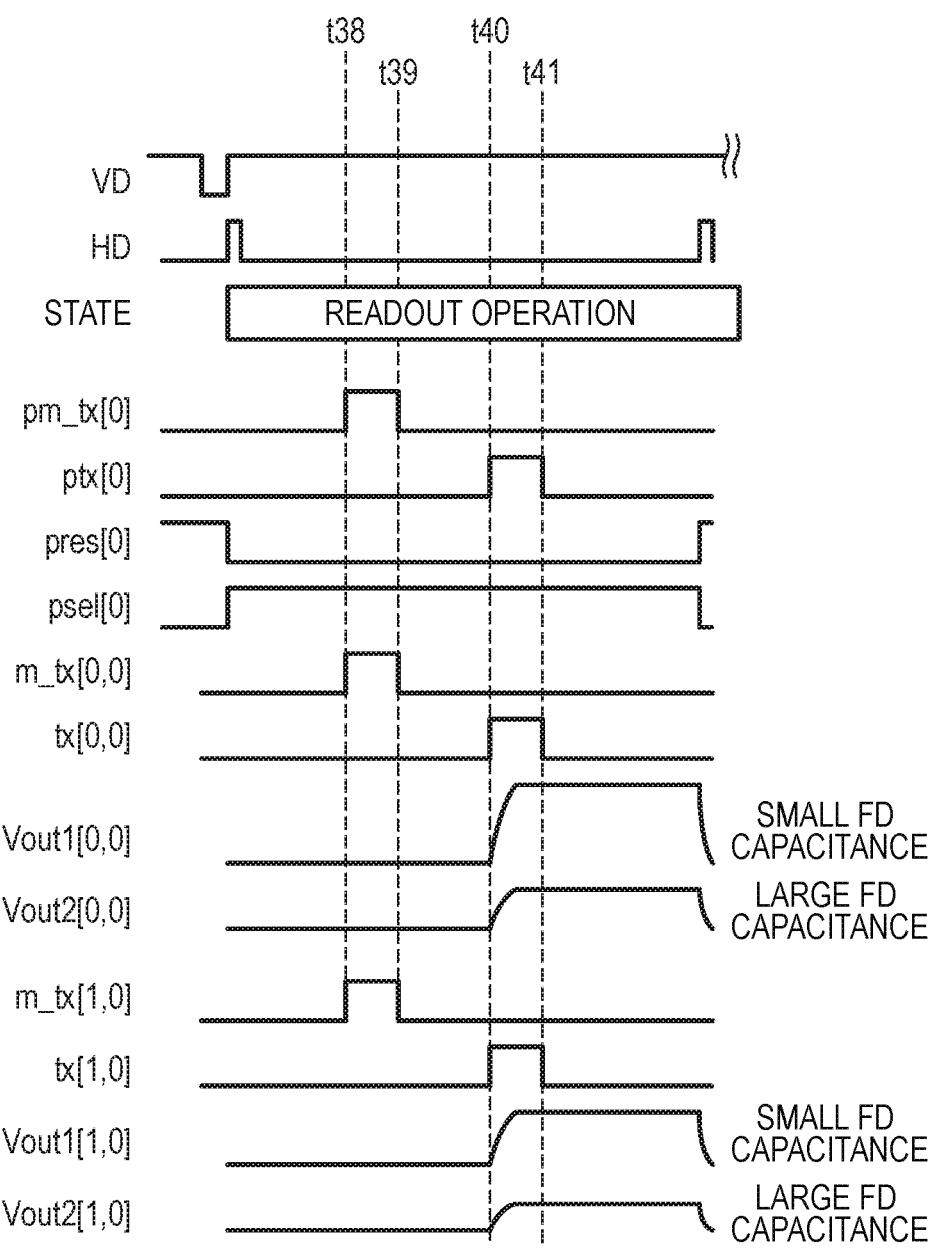
FIG. 17 is a timing chart illustrating a method of driving the imaging device according to the third embodiment of the present invention.

Next, the method of driving the imaging device according to the present embodiment will be described by using FIG. 17. FIG. 17 is a timing chart illustrating the method of driving the imaging device according to the present embodiment.

The method of driving the imaging device according to the present embodiment is basically the same as the method of driving the imaging device according to the first embodiment except for a difference in the operation of the third frame in the timing chart of FIG. 8. In the first frame and the second frame, the control signal pm_tx [n] may be driven at the same time as the control signal ptx [n]. By controlling the control signal pres [n] to the high level when the control signals ptx [n] and pm_tx [n] are at the high level, it is possible to reset even the photoelectric converter PD at the same time as the reset of the FD nodes FD1 and FD2.

FIG. 17 corresponds to the first HD period of the third frame in the timing chart of FIG. 8. As described previously, the control signals hblk_1 [0], hblk_1 [1], hblk_s [0], and hblk_s [1] (not illustrated) are at the high level over the entire period of the first HD period of the third frame. Further, the control signal pres [0] is at the low level, and the control signal psel [0] is at the high level.

In the period from the time t38 to the time t39, the vertical scanning unit 2 controls the control signal pm_tx [0] on the row corresponding to the vertical row address [0] to the high level. Thereby, the control signal m_tx [0, 0] input to the pixels 100 belonging to the row corresponding to the vertical row address [0] of the pixel block 10 transitions to the high level. Further, the control signal m_tx [1, 0] input to the pixels 100 belonging to the row corresponding to the vertical row address [0] of the pixel block 11 transitions to the high level. Thereby, in each pixel 100 belonging to the row corresponding to the vertical row address [0], the transfer transistors M11 and M12 are turned on, and signal charge accumulated in the photoelectric converter PD are transferred to the capacitors 107 and 111, respectively.

Next, in the period from the time t40 to the time t41, the vertical scanning unit 2 controls the control signal ptx [0] on the row corresponding to the vertical row address [0] to the high level. Thereby, the control signal tx [0, 0] input to the pixels 100 belonging to the row corresponding to the vertical row address [0] of the pixel block 10 transitions to the high level. Further, the control signal tx [1, 0] input to the pixels 100 belonging to the row corresponding to the vertical row address [0] of the pixel block 11 transitions to the high level.

Thereby, in all the pixels 100 belonging to the row corresponding to the vertical row address [0], the transfer transistor M21 is turned on, and signal charge accumulated in the capacitor 107 are transferred to the FD node FD1. The FD node FD1 then has a voltage in accordance with the capacitance value of the capacitor 109 and the amount of the transferred signal charge. Thereby, a signal in accordance with the amount of signal charge transferred to the FD node FD1 is output to the vertical output line 106 via the amplifier transistor M41 and the select transistor M51.

Further, in all the pixels 100 belonging to the row corresponding to the vertical row address [0], the transfer transistor M22 is turned on, and signal charge accumulated in the capacitor 111 are transferred to the FD node FD2. The FD node FD2 then has a voltage in accordance with the capacitance value of the capacitor 113 and the amount of the transferred signal charge. Thereby, a signal in accordance with the amount of signal charge transferred to the FD node FD2 is output to the vertical output line 117 via the amplifier transistor M42 and the select transistor M52.

At this time, since the capacitance value of the capacitor 113 coupled to the FD node FD2 is larger than the capacitance value of the capacitor 109 coupled to the FD node FD1, the voltage of the FD node FD2 after signal charge are transferred is smaller than the voltage of the FD node FD1 after signal charge are transferred. That is, the gain of the amplifier including the amplifier transistor M41 is larger than the gain of the amplifier including the amplifier transistor M42.

Thereby, the level of a signal Vout1 [0, 0] output from the vertical output line 106 connected to the pixels 100 of the pixel block 10 is larger than the level of a signal Vout2 [0, 0] output from the vertical output line 117. Similarly, the level of the signal Vout1 [1, 0] output from the vertical output line 106 connected to the pixels 100 of the pixel block 11 is larger than the level of the signal Vout2 [1, 0] output from the vertical output line 117.

As described above, according to the present embodiment, in the imaging device that may control exposure time on a pixel block basis, even when the gain of the amplifier within the pixel 100 is switched in a time division manner, an output signal may be amplified at multiple types of gains. Therefore, for example, with a configuration in which a dark (low level) signal is amplified at a high gain and a bright (high level) signal is amplified at a low gain, an image in which blacked up shadows or blown out highlights is suppressed over an object to a background may be acquired. Further, in the present embodiment, not only a mere gain-up but also an effect of a reduction of random noise may be expected for the output from the smaller FD capacitor, and an effect of an increase of the number of saturation electrons may be expected for output from the larger FD capacitor.

Note that, while the amplifier 5 is not provided between the pixel unit 1 and the column AD conversion unit 6 in the present embodiment, the amplifier 5 of this case may be further provided. In such a case, the amplifier 5 may be an amplifier having a switchable gain as illustrated in the first embodiment or may be an amplifier having a constant gain.

Fourth Embodiment

An imaging device and a method of driving the same according to a fourth embodiment of the present invention will be described with reference to FIG. 18 to FIG. 21. Components similar to those of the imaging device according to the first to third embodiments are labeled with the same references, and the description thereof will be omitted or simplified.

Figure 18:
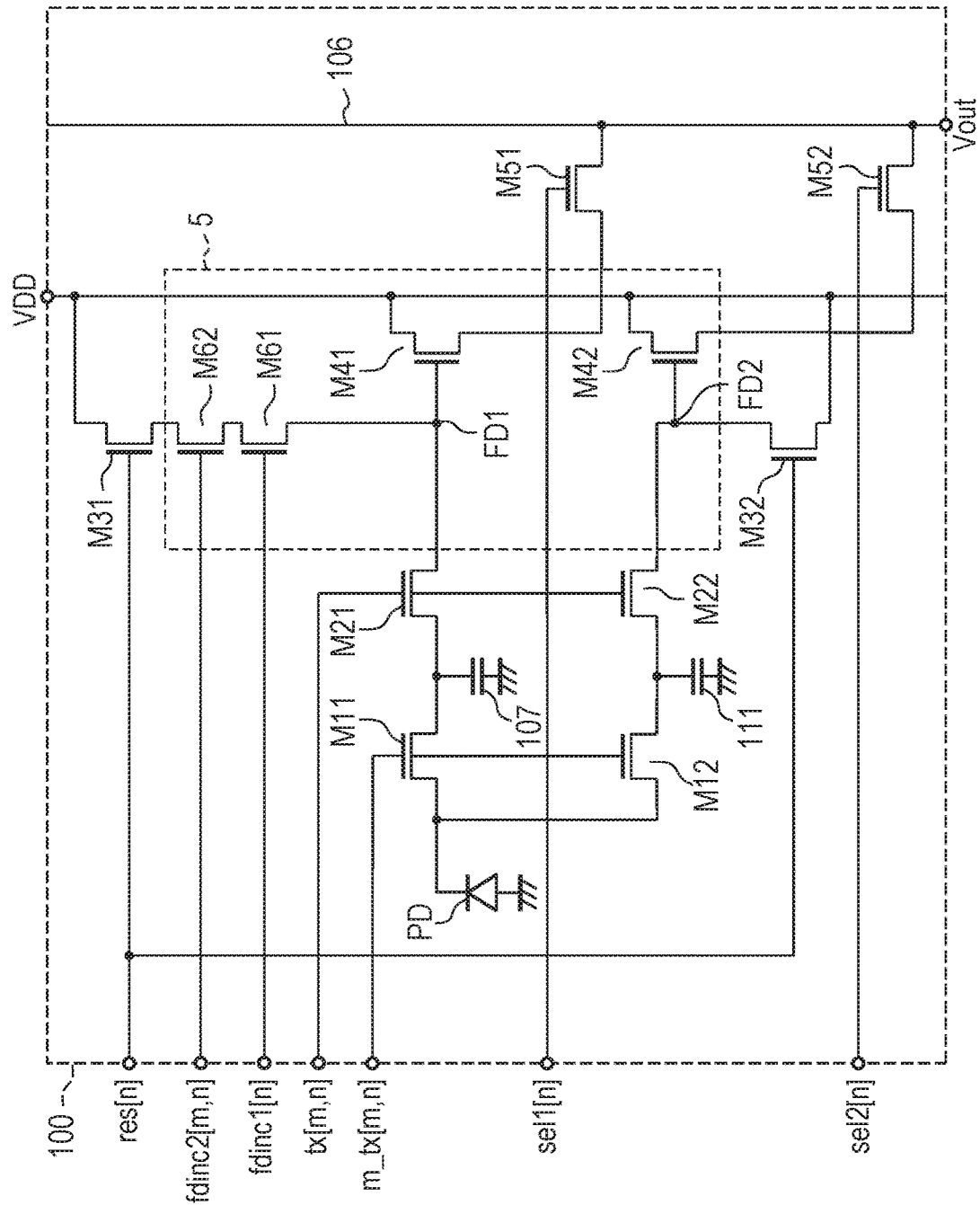
FIG. 18 is a circuit diagram illustrating a configuration example of a pixel in an imaging device according to a fourth embodiment of the present invention.
Figure 19:
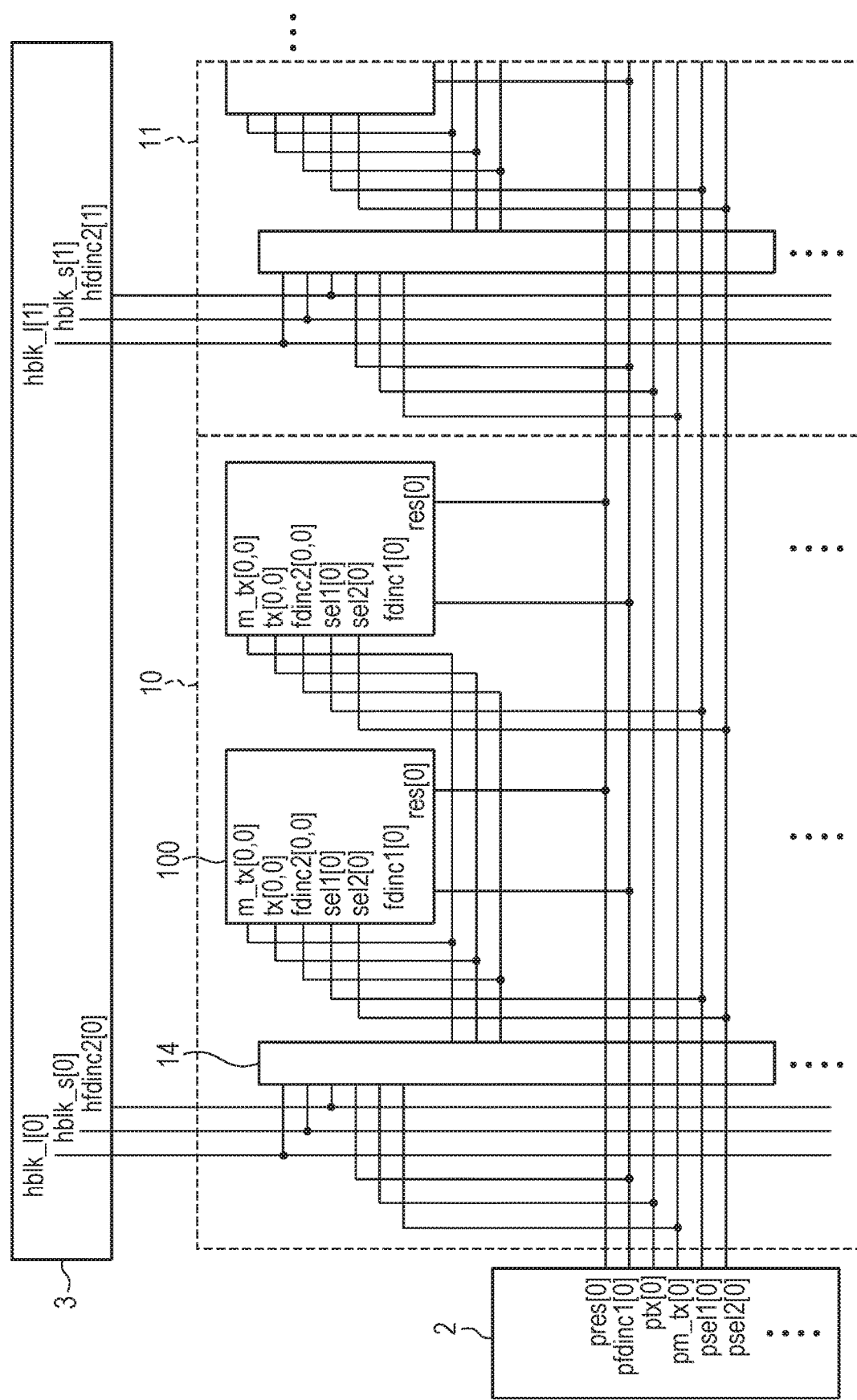
FIG. 19 is a circuit diagram illustrating a connection example between pixel blocks and a vertical scanning unit and a horizontal region control unit in the imaging device according to the fourth embodiment of the present invention.
Figure 20:
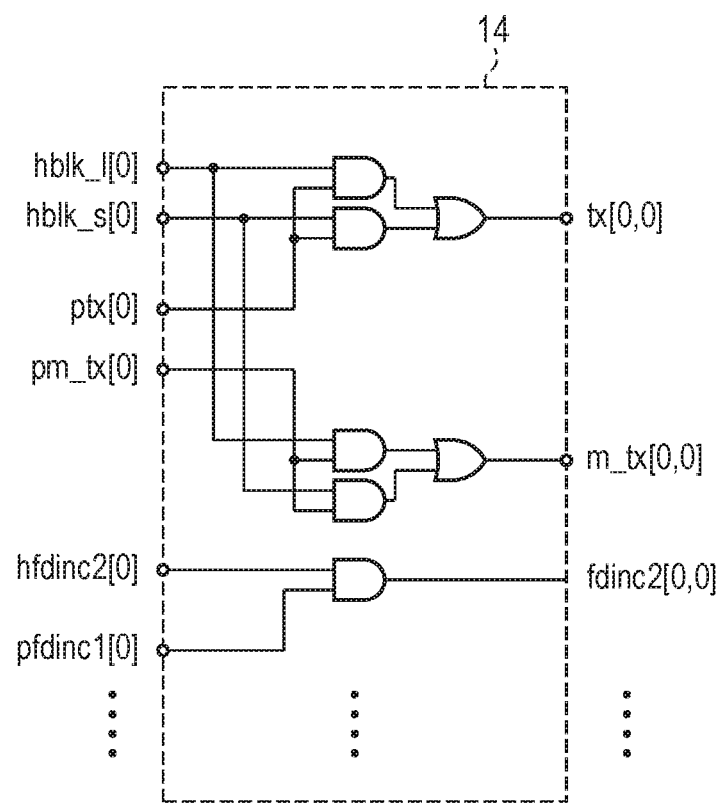
FIG. 20 is a circuit diagram illustrating a configuration example of an in-pixel-block control unit in the imaging device according to the fourth embodiment of the present invention.

First, the structure of the imaging device according to the present embodiment will be described by using FIG. 18 to FIG. 20. FIG. 18 is a circuit diagram illustrating the general configuration of a pixel in the imaging device according to the present embodiment. FIG. 19 is a circuit diagram illustrating a connection example between pixel blocks and a vertical scanning unit and a horizontal region control unit in the imaging device according to the present embodiment. FIG. 20 is a circuit diagram illustrating a configuration example of an in-pixel-block control unit in the imaging device according to the present embodiment.

The entire configuration of the imaging device according to the present embodiment is the same as the entire configuration of the imaging device according to the third embodiment illustrated in FIG. 13. The imaging device according to the present embodiment is different from the imaging device according to the third embodiment in the configuration of the pixel 100. That is, as illustrated in FIG. 18, the pixel 100 of the imaging device according to the present embodiment further includes MOS transistors M61 and M62 between the FD node FD1 and the source of the reset transistor M31.

The source of the MOS transistor M61 is connected to the FD node FD1. The drain of the MOS transistor M61 is connected to the source of the MOS transistor M62. The drain of the MOS transistor M62 is connected to the source of the reset transistor M31. A control signal fdinc1 [n] is provided from the vertical scanning unit 2 to the gate of the MOS transistor M61. The MOS transistor M61 is turned on when the control signal fdinc1 [n] is at a high level and turned off when the control signal fdinc1 [n] is at a low level. A control signal fdinc2 [m, n] is provided from the in-pixel-block control unit 14 to the gate of the MOS transistor M62. The MOS transistor M62 is turned on when the control signal fdinc2 [m, n] is at a high level and turned off when the control signal fdinc2 [m, n] is at a low level.

Such a configuration of the pixel 100 enables a variable FD capacitance of the FD node FD1. That is, when the control signal fdinc1 [n] is at the high level and the control signals fdinc2 [m, n] and res [n] are at the low level, a capacitance obtained by the MOS transistor M61 being turned on may be added to the FD capacitance of the FD node FD1. Further, when the control signal fdinc1 [n] and the control signal fdinc2 [m, n] are at the high level and the control signal res [n] is at the low level, a capacitance obtained by both the MOS transistors M61 and M62 being turned on may be added to the FD capacitance of the FD node FD1. That is, the level of the FD capacitance of the FD node FD1 may be controlled by using the control signals fdinc1 [n] and fdinc2 [m, n].

Further, the present embodiment is configured such that the select transistors M51 and M52 are controlled by the individual control signals sel1 [n] and sel2 [n]. Both the output signals via the select transistors M51 and M52 are output to the vertical output line 106. That is, in the present embodiment, the signal Vout output via the select transistor M51 and the signal Vout output via the select transistor M52 are output in a time division manner.

FIG. 19 illustrates the connection between the pixel blocks 10 and 11 of the pixel unit 1 and the vertical scanning unit 2 and the horizontal region control unit 3. Here, the vertical scanning unit 2 and the horizontal region control unit 3 in the imaging device according to the present embodiment will be described mainly for the difference from the third embodiment.

In the imaging device according to the present embodiment, the vertical scanning unit 2 is configured to further supply a control signal pfdinc1 [n]. Further, the vertical scanning unit 2 is configured to supply a control signal psel1 [n] to the select transistor M51 and supply a control signal psel2 [n] to the select transistor M52 rather than supply a common control signal psel [n] to the select transistors M51 and M52. Further, in the imaging device according to the present embodiment, the horizontal region control unit 3 is configured to further supply a control signal hfdinc2 [m].

The in-pixel-block control unit 14 generates the control signals tx [m, n], m_tx [m, n], and fdinc2 [m, n] based on the control signals ptx [n], pm_tx [n], pfdinc1 [n], hblk_1 [m], hblk_s [m], and hfdinc2 [m]. The control signals pres [n], psel1 [n], and psel2 [n] are supplied to the pixels 100 as the control signals res[n], sel1 [n], and sel2 [n] as they stand. The control signal pfdinc1 [n] is supplied to the pixel 100 as the control signal fdinc1 [n] as it stands in addition to supplied to the in-pixel-block control unit 14.

The in-pixel-block control unit 14 of each pixel block may be formed of a circuit illustrated in FIG. 20, for example. FIG. 20 illustrates a configuration example of the in-pixel-block control unit 14 provided in the pixel block 10 as an example.

The in-pixel-block control unit 14 is the same as the imaging device according to the third embodiment illustrated in FIG. 16 except that it is configured to further output a control signal fdinc2 [m, n] as an input of the control signals hfdinc2 [m] and pfdinc1 [n]. For example, the in-pixel-block control unit 14 of the pixel block 10 is input with the control signals hfdinc2 [0] and pfdinc1 [0] and outputs the control signal fdinc2 [0, 0] to the pixels 100 arranged on the row corresponding to the vertical row address [0]. The control signal fdinc2 [0, 0] is at the high level when both the control signal hfdinc2 [0] and the control signal pfdinc1 [0] are at the high level. That is, it is controlled whether or not to output the control signal hfdinc2 [0] to the pixels 100 based on the control signal pfdinc1 [0]. The same applies to the pixels 100 arranged on the row corresponding to the vertical row address [1].

The circuit that implements such operation in the in-pixel-block control unit 14 is not particularly limited and may be formed of the logic circuit illustrated in FIG. 20, for example. The logic circuit illustrated in FIG. 20 includes an AND gate that calculates a logical product of the control signals hfdinc2 [0] and pfdinc1 [0] in addition to the logic circuit illustrated in FIG. 16. The output of the AND gate is the control signal fdinc2 [0, 0].

In such a way, the control signals tx [m, n], m_tx [m, n], and fdinc2 [m, n] to be provided to the pixels 100 are generated by the in-pixel-block control unit 14. The control signals psel1 [n], psel2 [n], and pfdinc1 [n] generated by the vertical scanning unit 2 are directly provided to the pixels 100 arranged on the row corresponding to the vertical row address [n] as the control signals sel1 [n], sel2 [n], and fdinc1 [n]. As illustrated in FIG. 18, the control signal m_tx [m, n] is provided to the gates of the transfer transistors M11 and M12. The control signal tx [m, n] is provided to the gates of the transfer transistors M21 and M22. The control signal res [n] is provided to the gates of the reset transistors M31 and M32. The control signal sel1 [n] is provided to the gate of the select transistor M51. The control signal sel2 [n] is provided to the gate of the select transistor M52. The control signal fdinc1 [n] is provided to the gate of the MOS transistor M61. The control signal fdinc2 [m, n] is provided to the gate of the MOS transistor M62.

Figure 21:
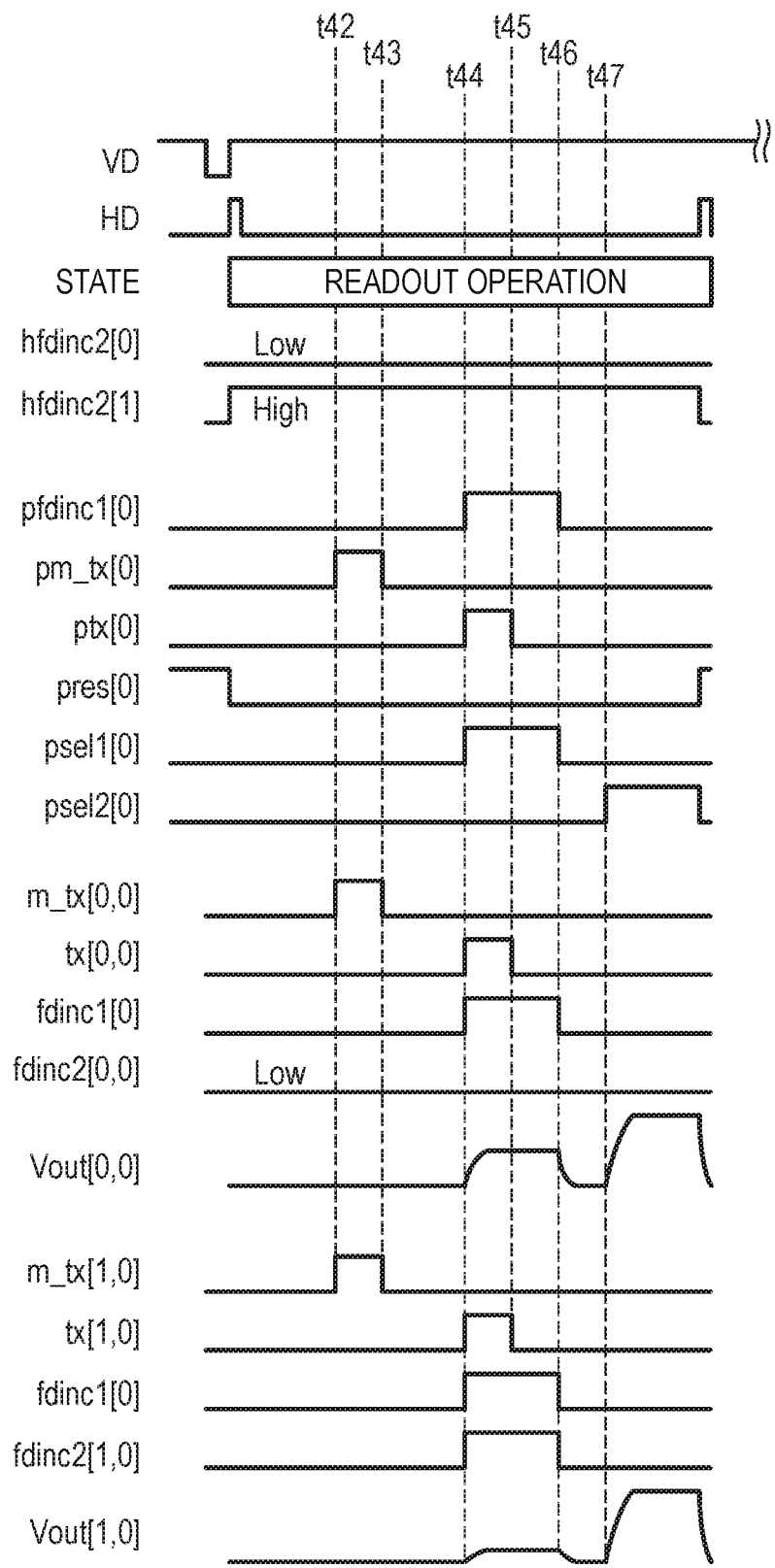
FIG. 21 is a timing chart illustrating a method of driving the imaging device according to the fourth embodiment of the present invention.

Next, the method of driving the imaging device according to the present embodiment will be described by using FIG. 21. FIG. 21 is a timing chart illustrating the method of driving the imaging device according to the present embodiment.

The method of driving the imaging device according to the present embodiment is basically the same as the method of driving the imaging device according to the first embodiment except for a difference in the operation of the third frame in the timing chart of FIG. 8 as with the third embodiment. That is, in the first frame and the second frame, the control signal pm_tx [n] may be driven at the same time as the control signal ptx [n]. By controlling the control signal pres [n] to the high level when the control signals ptx [n] and pm_tx [n] are at the high level, it is possible to reset even the photoelectric converter PD at the same time as the reset of the FD nodes FD1 and FD2.

FIG. 21 corresponds to the first HD period of the third frame in the timing chart of FIG. 8. As described previously, the control signals hblk_1 [0], hblk_1 [1], hblk_s [0], and hblk_s [1] (not illustrated) are at the high level over the entire period of the first HD period of the third frame. Further, the control signal pres [0] is at the low level, and the control signal psel [0] is at the high level. The control signal hfdinc2 [0] is set to the low level, and the control signal hfdinc2 [1] is set to the high level over the entire period of the first HD period of the third frame.

In the period from the time t42 to the time t43, the vertical scanning unit 2 controls the control signal pm_tx [0] on the row corresponding to the vertical row address [0] to the high level. Thereby, the control signal m_tx [0, 0] input to the pixels 100 belonging to the row corresponding to the vertical row address [0] of the pixel block 10 transitions to the high level. Further, the control signal m_tx [1, 0] input to the pixels 100 belonging to the row corresponding to the vertical row address [0] of the pixel block 11 transitions to the high level. Thereby, in the pixels 100 belonging to the row corresponding to the vertical row address [0], the transfer transistors M11 and M12 are turned on, and signal charge accumulated in the photoelectric converter PD are transferred to the capacitors 107 and 111, respectively.

Next, in the period from the time t44 to the time t45, the vertical scanning unit 2 controls the control signal ptx [0] on the row corresponding to the vertical row address [0] to the high level. Thereby, the control signal tx [0, 0] input to the pixels 100 belonging to the row corresponding to the vertical row address [0] of the pixel block 10 transitions to the high level. Further, the control signal tx [1, 0] input to the pixels 100 belonging to the row corresponding to the vertical row address [0] of the pixel block 11 transitions to the high level. Thereby, the transfer transistors M21 and M22 are turned on, and signal charge accumulated in the capacitors 107 and 111 are transferred to the FD nodes FD1 and FD2, respectively, in all the pixels 100 belonging to the row corresponding to the vertical row address [0].

Further, in the period from the time t44 to the time t46, the vertical scanning unit 2 controls the control signals pfdinc1 [0] and psel1 [0] on the row corresponding to the vertical row address [0] to the high level. Thereby, the control signals fdinc1 [0] and sel1 [0] are controlled to the high level, and the MOS transistor M61 and the select transistor M51 are turned on in each pixel 100 belonging to the row corresponding to the vertical row address [0].

At this time, since the control signals hfdinc2 [0] is at the low level, the control signal fdinc2 [0, 0] is at the low level, and the MOS transistor M62 is turned off in each pixel 100 belonging to the row corresponding to the vertical row address [0] of the pixel block 10. Thereby, in the pixels 100 belonging to the row corresponding to the vertical row address [0] of the pixel block 10, the capacitance value of the FD node FD1 increases for the capacitance of the MOS transistor M61 in the on-state with respect to the capacitance value to the capacitor 107. In such a way, the signal Vout [0, 0] in accordance with the increased capacitance value of the FD node FD1 and the amount of the transferred signal charge is output to the vertical output line 106 via the amplifier transistor M41 and the select transistor M51. At this time, the level of the signal Vout [0, 0] decreases compared to a case where the capacitor coupled to the FD node FD1 is only the capacitor 107.

Further, since the control signals hfdinc2 [1] is at the high level, the control signal fdinc2 [1, 0] is at the high level, and the MOS transistor M62 is turned off in each pixel 100 belonging to the row corresponding to the vertical row address [1] of the pixel block 11. Thereby, in the pixels 100 belonging to the row corresponding to the vertical row address [1] of the pixel block 10, the capacitance value of the FD node FD1 increases for the capacitances of the MOS transistors M61 and M62 in the on-state with respect to the capacitance value to the capacitor 107. In such a way, a signal in accordance with the increased capacitance value of the FD node FD1 and the amount of the transferred signal charge is output to the vertical output line 106 via the amplifier transistor M41 and the select transistor M51. At this time, the level of the signal Vout [1, 0] decreases compared to a case where the capacitor coupled to the FD node FD1 is the capacitor 107 and the capacitor when the MOS transistor M61 is turned on.

In such a way, in the present embodiment, increase or decrease of the capacitance value of the FD node FD1 may be controlled on a pixel block basis in accordance with the level of the control signal hfdinc2 [m].

Next, at the time t47, the vertical scanning unit 2 controls the control signal psel2 [0] on the row corresponding to the vertical row address [0] to the high level. Thereby, the control signal sel2 [0] transitions to the high level, and the select transistor M52 is turned on in each pixel 100 belonging to the row corresponding to the vertical row address [0].

At this time, signal charge accumulated in the capacitor 111 are transferred to the FD node FD2 in the period from the time t44 to the time t45. Therefore, from the pixels 100 of the pixel block 10, the signal Vout [0, 0] in accordance with the amount of signal charge transferred to the FD node FD2 is output to the vertical output line 106 via the amplifier transistor M42 and the select transistor M52. The level of the signal Vout [0, 0] at this time increases to be higher than the level of the signal Vout [0, 0] in the period from the time t44 to the time t46 due to a small capacitance value of the FD node FD2.

Further, from the pixels 100 of the pixel block 11, the signal Vout [1, 0] in accordance with the amount of signal charge transferred to the FD node FD2 is output to the vertical output line 106 via the amplifier transistor M42 and the select transistor M52. The level of the signal Vout [0, 0] at this time increases to be higher than the level of the signal Vout [1, 0] in the period from the time t44 to the time t46 due to a small capacitance value of the FD node FD2.

As described above, according to the present embodiment, in the imaging device that may control exposure time on a pixel block basis, even when the gain of the amplifier within the pixel is switched in a time division manner, an output signal may be amplified at multiple types of gains. Therefore, for example, with a configuration in which a dark (low level) signal is amplified at a high gain and a bright (high level) signal is amplified at a low gain, an image in which blacked up shadows or blown out highlights is suppressed over an object to a background may be acquired. Further, according to the configuration of the present embodiment, since a plurality of column circuits are not required to be included in each column, an increase in the circuit area may also be prevented.

In a modified example of the present embodiment, the transfer transistor M12, the capacitor 111, the transfer transistor M22, the reset transistor M32, the amplifier transistor M42, the select transistor M52, and the FD node FD2 of FIG. 18 are deleted. Accordingly, wirings connected to these elements and circuits used for supplying control signals to these elements are deleted. Further, the capacitor 107 and the transfer transistor M21 are deleted. Thus, the transfer transistor M11 connects the photoelectric converter PD to the FD node FD1.

Furthermore, in the plurality of pixels 100 included in one pixel block 10, the MOS transistors M61 are controlled independently of each other. Further, in the plurality of pixels 100 included in one pixel block 10, the MOS transistors M62 are controlled independently of each other.

According to such a configuration, in one frame, the one pixel block 10 output a plurality of signals read out at gains different from each other. Note that, in this modified example, a signal of one pixel 100 is not required to be amplified at a plurality of gains in one frame.

Also in the modified example, in the imaging device that may control exposure time on a pixel block basis, a signal may be amplified at a suitable gain.

Fifth Embodiment

Figure 22:
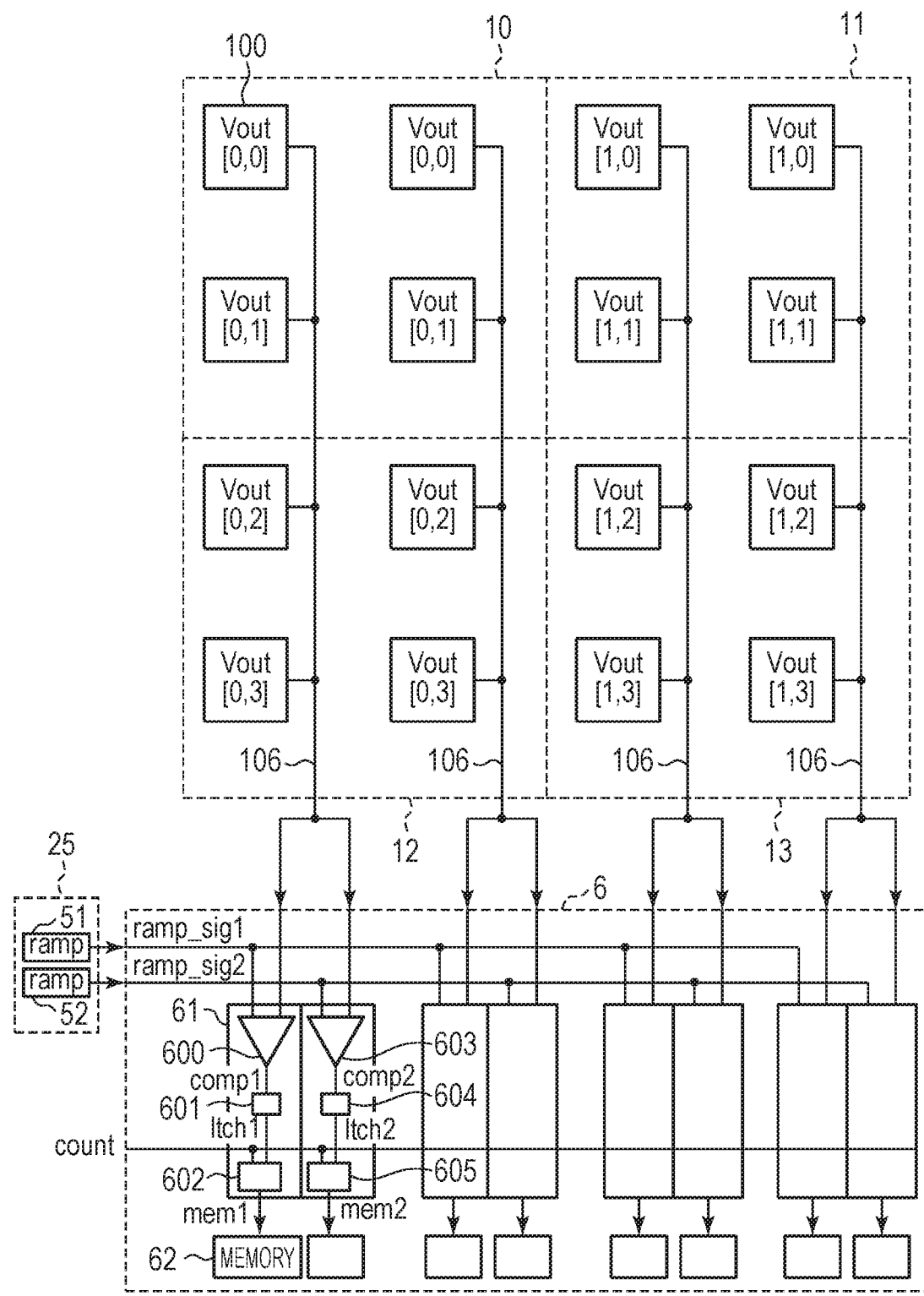
FIG. 22 is a schematic diagram illustrating a configuration example of an amplifier and a column AD conversion unit in an imaging device according to a fifth embodiment of the present invention.
Figure 23:
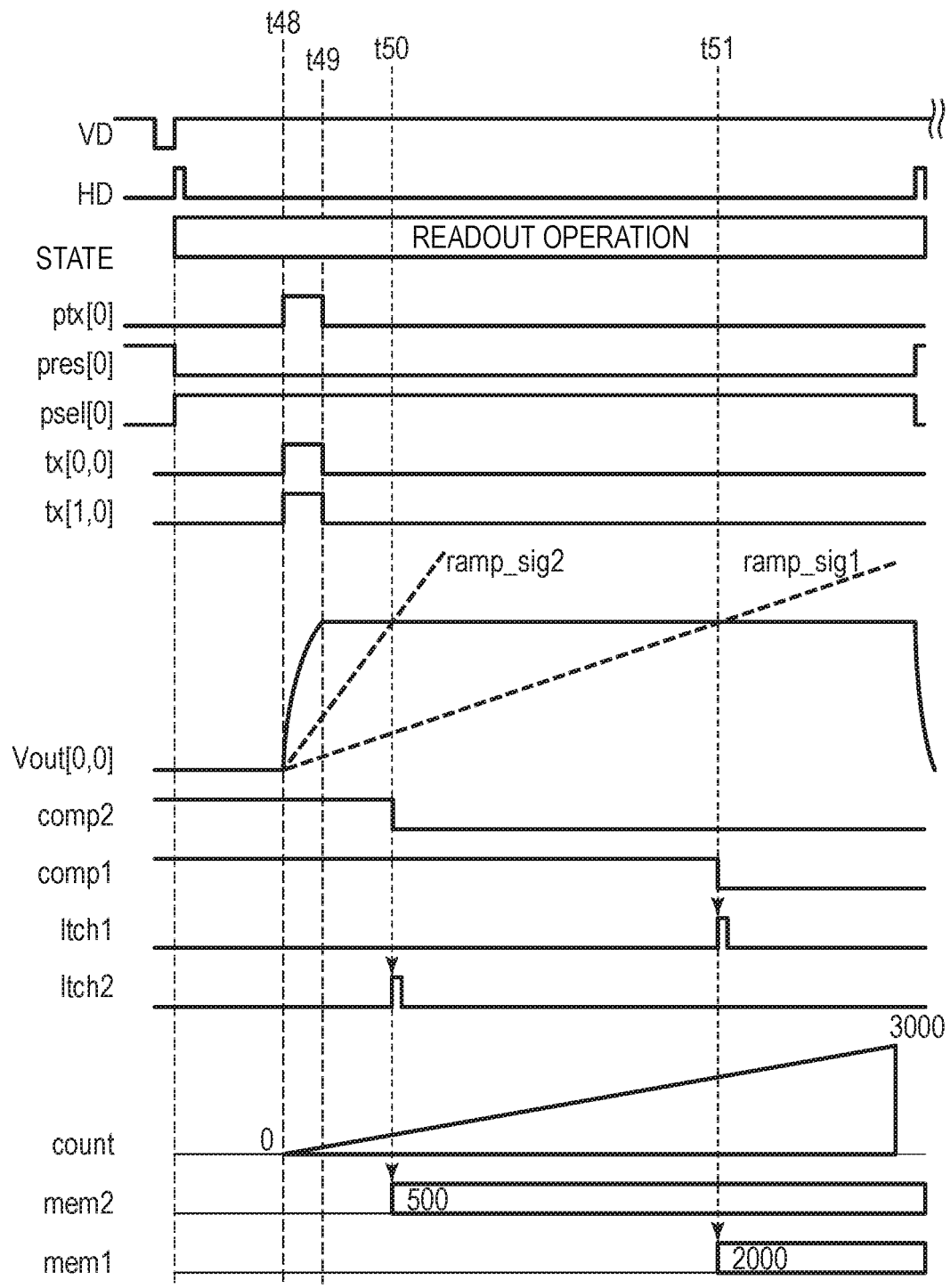
FIG. 23 is a timing chart illustrating a method of driving the imaging device according to the fifth embodiment of the present invention.

An imaging device and a method of driving the same according to a fifth embodiment of the present invention will be described with reference to FIG. 22 and FIG. 23. Components similar to those of the imaging device according to the first to fourth embodiments are labeled with the same references, and the description thereof will be omitted or simplified.

First, the structure of the imaging device according to the present embodiment will be described by using FIG. 22. FIG. 22 is a schematic diagram illustrating a configuration example of an amplifier and a column AD conversion unit in the imaging device according to the present embodiment.

The imaging device according to the present embodiment is basically the same as the imaging device according to the first embodiment except for a difference in the configuration of the amplifier 5 and the column AD conversion unit 6. That is, as illustrated in FIG. 22, the imaging device according to the present embodiment further includes a ramp signal generation unit 25 that supplies a plurality of ramp signals that have different rates of a signal level change with lapse of time. The ramp signal generation unit 25 includes a ramp signal generator 51 and a ramp signal generator 52. The column AD conversion unit 6 includes the AD converter circuit 61 and two memories 62 in association with each column of the pixels 100 forming the pixel unit 1. The AD converter circuit 61 includes comparators 600 and 603, latch circuits 601 and 604, and holding units 602 and 605.

The vertical output line 106 on each column is connected to one input terminal of the comparator 600 and one input terminal of the comparator 603. The output terminal of the comparator 600 is connected to the input terminal of the latch circuit 601. The output terminal of the latch circuit 601 is connected to the input terminal of the holding unit 602. The output terminal of the comparator 603 is connected to the input terminal of the latch circuit 604. The output terminal of the latch circuit 604 is connected to the input terminal of the holding unit 605. The output terminals of the holding units 602 and 605 are connected to the memory 62, respectively. The ramp signal generator 51 is connected to the other input terminal of the comparator 600 of the AD converter circuit 61 on each column. The ramp signal generator 52 is connected to the other input terminal of the comparator 603 of the AD converter circuit 61 on each column.

The signal Vout output from the pixel unit 1 via the vertical output line 106 on each column is input to one input terminal of the comparator 600 of the AD converter circuit 61 on each column and one input terminal of the comparator 603 of the AD converter circuit 61 on each column.

The ramp signal generator 51 outputs a ramp signal ramp_sig1, and the ramp signal generator 52 outputs a ramp signal ramp_sig2. Each of the ramp signals ramp_sig1 and ramp_sig2 is a signal whose signal level changes with lapse of time. As an example here, the ramp signal ramp_sig2 has a larger rate (slope) of a signal level change with the lapse of time than the ramp signal ramp_sig1. The ramp signal ramp_sig1 output from the ramp signal generator 51 is supplied to the other input terminal of the comparator 600 of the AD converter circuit 61 on each column. The ramp signal ramp_sig2 output from the ramp signal generator 52 is supplied to the other input terminal of the comparator 603 of the AD converter circuit 61 on each column.

The comparator 600 compares the level of the signal Vout with the level of the ramp signal ramp_sig1 and, when the level relationship between these signals changes, inverts the signal level of the signal comp1 that is the output of the comparator 600. As an example here, the comparator 600 outputs a high-level signal comp1 when the level of the signal Vout is higher than the level of the ramp signal ramp_sig1. Further, the comparator 600 outputs a low-level signal comp1 when the level of the signal Vout is lower than the level of the ramp signal ramp_sig1. The latch circuit 601 outputs a pulse signal (latch signal ltch1) to the holding unit 602 in response to inversion of the signal comp1 from the comparator 600. The holding unit 602 is configured to receive a count value "count" where counting is started in synchronization with ramp start of the ramp signal ramp_sig1 and configured to hold a count value obtained when receiving the latch signal ltch1 from the latch circuit 601. The memory 62 holds a count value held by the holding unit 602 on a bit basis as a digital value mem1 of the signal Vout.

Similarly, the comparator 603 compares the level of the signal Vout with the level of the ramp signal ramp_sig2 and, when the level relationship between these signals changes, inverts the signal level of the signal comp2 that is the output of the comparator 603. As an example here, the comparator 603 outputs a high-level signal comp2 when the level of the signal Vout is higher than the level of the ramp signal ramp_sig2. Further, the comparator 603 outputs a low-level signal comp2 when the level of the signal Vout is lower than the level of the ramp signal ramp_sig2. The latch circuit 604 outputs a pulse signal (latch signal ltch2) to the holding unit 605 in response to inversion of the signal comp2 from the comparator 603. The holding unit 605 is configured to receive a count value "count" where counting is started in synchronization with ramp start of the ramp signal ramp_sig2 and configured to hold a count value obtained when receiving the latch signal ltch2 from the latch circuit 604. The memory 62 holds a count value held by the holding unit 605 on a bit basis as a digital value mem2 of the signal Vout.

As described previously, the ramp signal generators 51 and 52 output ramp signals controlled so that the slopes thereof are different from each other. Therefore, even with the same signal Vout output from the pixel unit 1, the digital value mem1 and the digital value mem2 obtained by AD conversion by the column AD conversion unit 6 are different values. That is, in the present embodiment, instead of amplifying a pixel signal at a plurality of gains by using the amplifier 5, ramp signals supplied from the ramp signal generation unit 25 are used to perform AD conversion of a pixel signal at a plurality of conversion gains.

Next, the method of driving the imaging device according to the present embodiment will be described by using FIG. 23. FIG. 23 is a timing chart illustrating the method of driving the imaging device according to the present embodiment.

The method of driving the imaging device according to the present embodiment is basically the same as the method of driving the imaging device according to the first embodiment except for a difference in the operation of the third frame in the timing chart of FIG. 8. FIG. 23 corresponds to the first HD period of the third frame in the timing chart of FIG. 8. As described previously, the control signals hblk_1 [0], hblk_1 [1], hblk_s [0], and hblk_s [1] (not illustrated) are at the high level over the entire period of the first HD period of the third frame. Further, the control signal pres [0] is at the low level, and the control signal psel [0] is at the high level.

In the period from the time t48 to the time t49, the vertical scanning unit 2 controls the control signal ptx [0] on the row corresponding to the vertical row address [0] to the high level. Thereby, the control signal tx [0, 0] input to the pixels 100 belonging to the row corresponding to the vertical row address [0] of the pixel block 10 transitions to the high level. Further, the control signal tx [1, 0] input to the pixels 100 belonging to the row corresponding to the vertical row address [0] of the pixel block 11 transitions to the high level. Thereby, in each of all the pixels 100 belonging to the row corresponding to the vertical row address [0], the transfer transistor M1 is turned on, signal charge accumulated in the photoelectric converter PD are transferred to the FD node. The signal Vout in accordance with the amount of the signal charge transferred to the FD node is then output to the vertical output line 106 via the amplifier transistor M4 and the select transistor M5.

In such a way, from each pixel 100 belonging to the row corresponding to the vertical row address [0] of the pixel block 10, the signal Vout [0, 0] is output. Further, from each pixel 100 belonging to the row corresponding to the vertical row address [0] of the pixel block 11, the signal Vout [1, 0] is output. In the following description, the signal Vout [0, 0] out of these signal Vout [0, 0] and signal Vout [1, 0] is focused on for illustration.

Similarly, at the time t48, the ramp signal generator 51 starts outputting the ramp signal ramp_sig1. Further, the ramp signal generator 52 starts outputting the ramp signal ramp_sig2. Further, the timing generation unit 4 starts count-up of the count value "count" output to the AD converter circuit 61. Immediately after the start of output of the ramp signals ramp_sig1 and ramp_sig2, the level of the signal Vout [0, 0] is larger than the level of the ramp signals ramp_sig1 and ramp_sig2. Therefore, the comparators 600 and 603 output high-level signals comp1 and comp2.

At the subsequent time t50, the level of the signal Vout [0, 0] matches the level of the ramp signal ramp_sig2. Thereby, the signal comp2 output by the comparator 603 transitions from the high level to the low level. In response to the change of the signal comp2, the latch circuit 604 outputs the latch signal ltch2. The latch signal ltch2 is formed as a pulse in response to detection of a falling edge of the signal comp2. This pulse is used as a clock input of a D-flip flop, for example, a count value "count" is input to the D-input of the same D-flip flop, and thereby the holding unit 605 may hold the count value "count" at the time of input of the latch signal ltch2. FIG. 23 illustrates the case where 500 is held as a count value "count" in the holding unit 605 as an example. This value corresponds to the digital value mem2.

At the subsequent time t51, the level of the signal Vout [0, 0] matches the level of the ramp signal ramp_sig1. Thereby, the signal comp1 output by the comparator 600 transitions from the high level to the low level. In response to the change of the signal comp1, the latch circuit 601 outputs the latch signal ltch1. The latch signal ltch1 is formed as a pulse in response to detection of a falling edge of the signal comp1. This pulse is used as a clock input of a D-flip flop, for example, a count value "count" is input to the D-input of the same D-flip flop, and thereby the holding unit 602 may hold the count value "count" at the time of input of the latch signal ltch1. FIG. 23 illustrates the case where 2000 is held as a count value "count" in the holding unit 602 as an example. This value corresponds to the digital value mem1.

With such a configuration of the ramp signal generation unit 25 and the column AD conversion unit 6, a plurality of signals having different values may be output for a single signal Vout. Thereby, in a case of a dark signal, for example, the gradation may be ensured by using the ramp signal ramp_sig1 whose signal slope is gentle. On the other hand, in a case of a bright signal, even when the 1HD period is insufficient and no output from the ramp signal ramp_sig1 is obtained, the output may be reliably obtained by using the ramp signal ramp_sig2 whose signal slope is steep.

As described above, according to the present embodiment, in the imaging device that may control exposure time on a pixel block basis, by switching the AD conversion gain in the AD conversion unit, it is possible to amplify an output signal at multiple types of gains. Therefore, for example, with a configuration in which AD conversion is performed at a high gain on a dark (low level) signal and AD conversion is performed at a low gain on a bright (high level) signal, an image in which blacked up shadows or blown out highlights is suppressed over an object to a background may be acquired.

Sixth Embodiment

Figure 24:
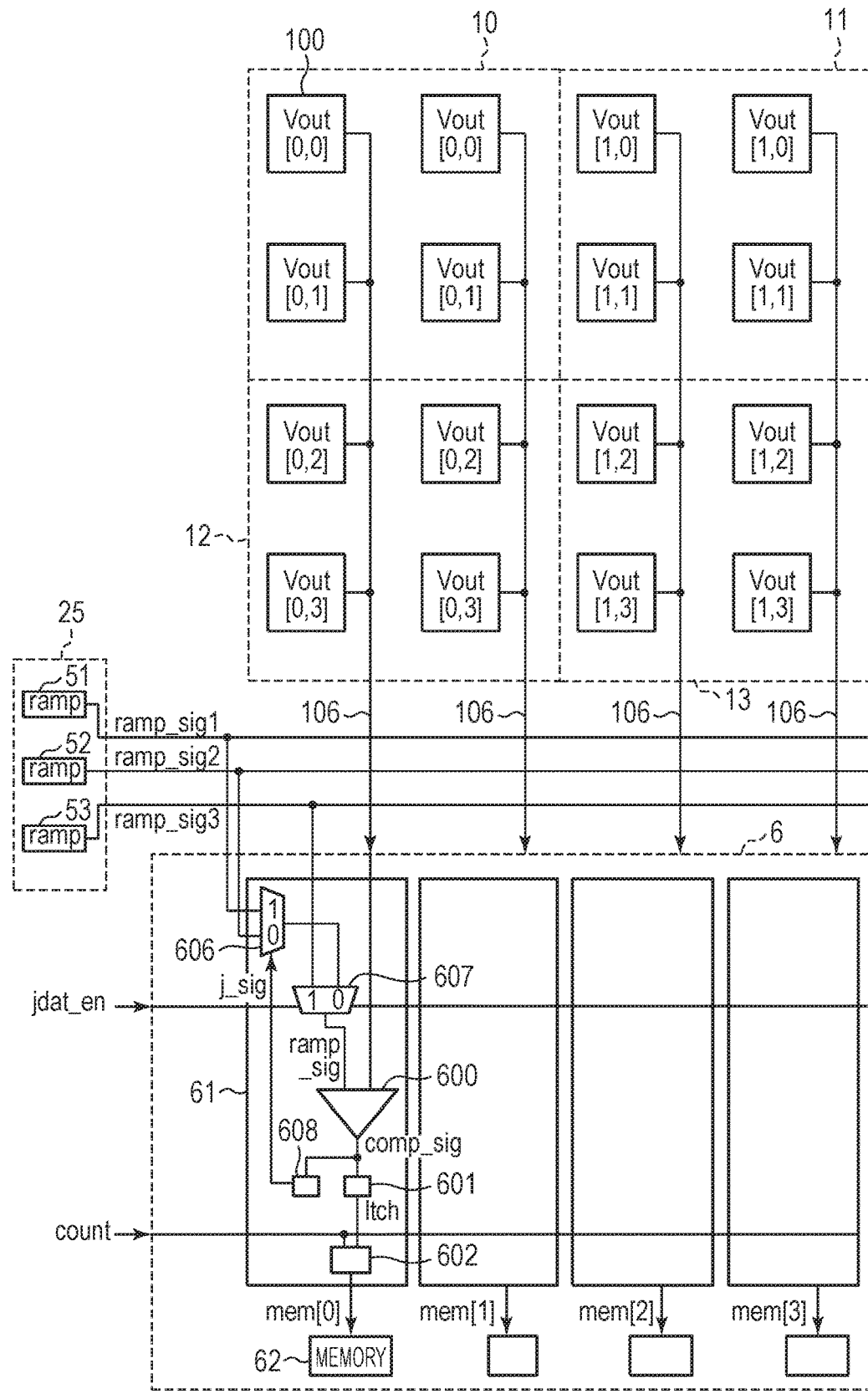
FIG. 24 is a general diagram illustrating a configuration example of an amplifier and a column AD conversion unit in an imaging device according to a sixth embodiment of the present invention.
Figure 25:
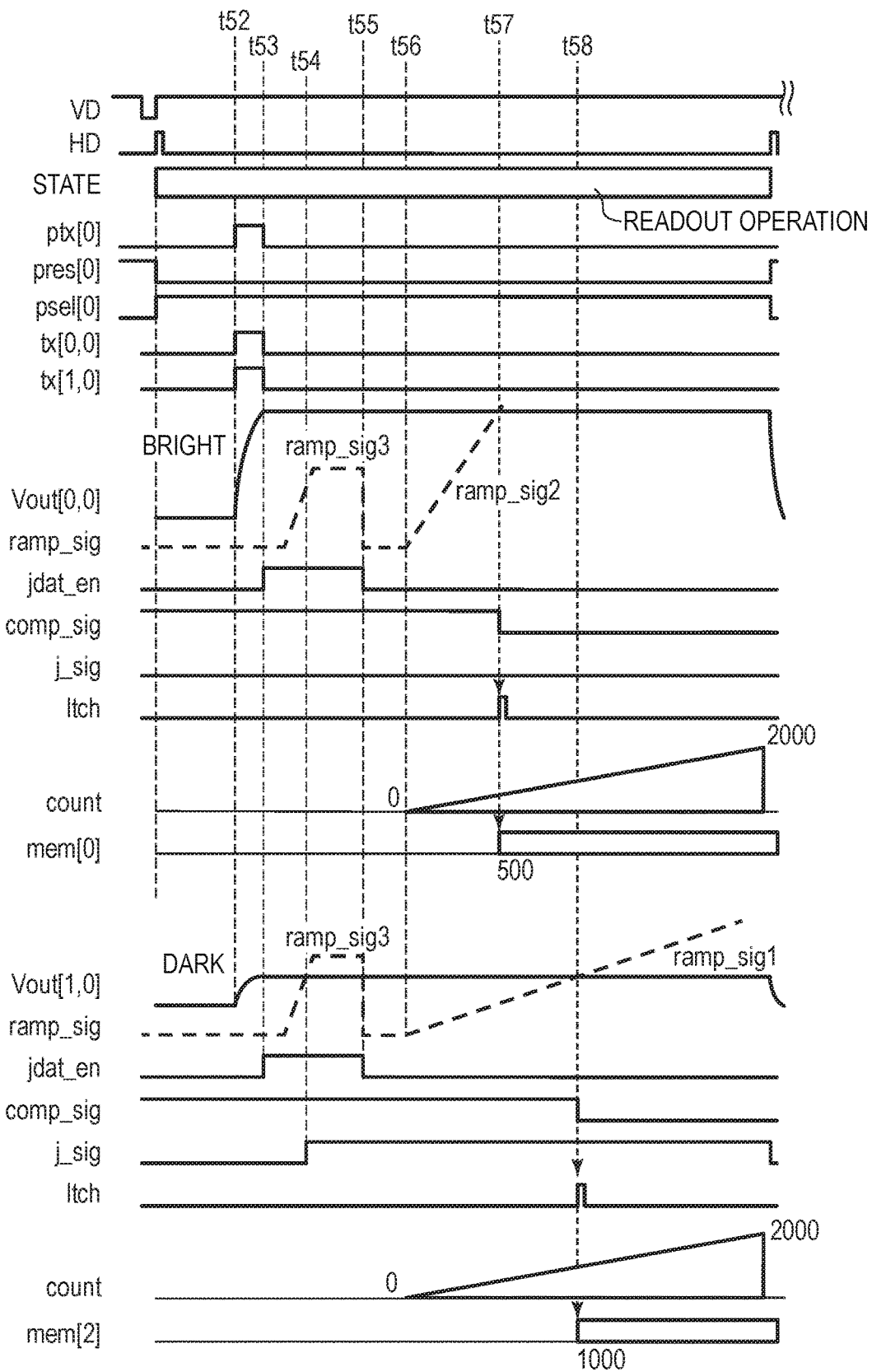
FIG. 25 is a timing chart illustrating a method of driving the imaging device according to the sixth embodiment of the present invention.

An imaging device and a method of driving the same according to a sixth embodiment of the present invention will be described with reference to FIG. 24 and FIG. 25. Components similar to those of the imaging device according to the first to fifth embodiments are labeled with the same references, and the description thereof will be omitted or simplified.

First, the structure of the imaging device according to the present embodiment will be described by using FIG. 24. FIG. 24 is a schematic diagram illustrating a configuration example of an amplifier and a column AD conversion unit in the imaging device according to the present embodiment.

The imaging device according to the present embodiment is basically the same as the imaging device according to the fifth embodiment except for a difference in the configuration of the ramp signal generation unit 25 and the column AD conversion unit 6. That is, as illustrated in FIG. 24, in the imaging device according to the present embodiment, the ramp signal generation unit 25 further includes a ramp signal generator 53 in addition to the ramp signal generators 51 and 52. The column AD conversion unit 6 includes the AD converter circuit 61 and the memory 62 in association with each column of the pixels 100 forming the pixel unit 1. The AD converter circuit 61 includes the comparator 600, the latch circuit 601, the holding unit 602, selectors 606 and 607, and an inverter 608.

The vertical output line 106 on each column is connected to one input terminal of the comparator 600. The output terminal of the comparator 600 is connected to the input terminal latch circuit 601 and the input terminal of the inverter 608. The output terminal of the latch circuit 601 is connected to the input terminal of the holding unit 602. The output terminal of the inverter 608 is connected to the control terminal of the selector 606. The output terminal of the holding unit 602 is connected to the memory 62.

The ramp signal generator 51 is connected to one input terminal of the selector 606 of the AD converter circuit 61 on each column. The ramp signal generator 52 is connected to the other input terminal of the selector 606 of the AD converter circuit 61 on each column. The ramp signal generator 53 is connected to one input terminal of the selector 607 of the AD converter circuit 61 on each column. The output terminal of the selector 606 is connected to the other input terminal of the selector 607. The output terminal of the selector 607 is connected to the other input terminal of the comparator 600.

The signal Vout output from the pixel unit 1 via the vertical output line 106 on each column is input to one input terminal of the comparator 600 of the AD converter circuit 61 on each column.

The ramp signal generator 51 outputs the ramp signal ramp_sig1, the ramp signal generator 52 outputs the ramp signal ramp_sig2, and the ramp signal generator 53 outputs a ramp signal ramp_sig3. The ramp signals ramp_sig1, ramp_sig2, and ramp_sig3 are signals whose signal level changes with lapse of time. The ramp signal ramp_sig1 output from the ramp signal generator 51 is supplied to one input terminal of the selector 606 of the AD converter circuit 61 on each column. The ramp signal ramp_sig2 output from the ramp signal generator 52 is supplied to the other input terminal of the selector 606 of the AD converter circuit 61 on each column. The ramp signal ramp_sig3 output from the ramp signal generator 53 is supplied to one input terminal of the selector 607.

The selector 606 defines a signal output from the inverter 608 as a select signal j_sig, selects one of the ramp signal ramp_sig1 and the ramp signal ramp_sig2, and supplies the selected one to the other input terminal of the selector 607. For example, the selector 606 selects the ramp signal ramp_sig1 when the select signal j_sig is at the high level and selects the ramp signal ramp_sig2 when the select signal j_sig is at the low level.

The selector 607 selects one of the ramp signal ramp_sig3 and the output signals from the selector 606 (the ramp signal ramp_sig1 or the ramp signal ramp_sig2) in accordance with a select signal jdat_en supplied from the timing generation unit 4. The ramp signal ramp_sig selected by the selector 607 is input to the other input terminal of the comparator 600.

The comparator 600 compares the level of the signal Vout with the level of the ramp signal ramp_sig and, when the level relationship of these signals changes, inverts the signal level of the signal comp_sig that is the output of the comparator 600. As an example here, the comparator 600 outputs a high-level signal comp_sig when the level of the signal Vout is higher than the level of the ramp signal ramp_sig. Further, the comparator 600 outputs a low-level signal comp_sig when the level of the signal Vout is lower than the level of the ramp signal ramp_sig.

The latch circuit 601 outputs a pulse signal (latch signal itch) to the holding unit 602 in response to an inversion of the signal comp_sig from the comparator 600. The holding unit 602 is configured to receive a count value "count" where counting is started in synchronization with ramp start of the ramp signals ramp_sig1 and ramp_sig2. Further, the holding unit 602 is configured to hold a count value received when receiving the latch signal itch from the latch circuit 601. The memory 62 holds a count value held by the holding unit 602 on a bit basis as a digital value mem of the signal Vout.

Next, the method of driving the imaging device according to the present embodiment will be described by using FIG. 25. FIG. 25 is a timing chart illustrating the method of driving the imaging device according to the present embodiment.

The method of driving the imaging device according to the present embodiment is basically the same as the method of driving the imaging device according to the first embodiment except for a difference in the operation of the third frame in the timing chart of FIG. 8. FIG. 25 corresponds to the first HD period of the third frame in the timing chart of FIG. 8. As described previously, the control signals hblk_1 [0], hblk_1 [1], hblk_s [0], and hblk_s [1] (not illustrated) are at the high level over the entire period of the first HD period of the third frame. Further, the control signal pres [0] is at the low level, and the control signal psel [0] is at the high level.

In the period from the time t52 to the time t53, the vertical scanning unit 2 controls the control signal ptx [0] on the row corresponding to the vertical row address [0] to the high level. Thereby, the control signal tx [0, 0] input to the pixels 100 belonging to the row corresponding to the vertical row address [0] of the pixel block 10 transitions to the high level. Further, the control signal tx [1, 0] input to the pixels 100 belonging to the row corresponding to the vertical row address [0] of the pixel block 11 transitions to the high level. Thereby, in each of all the pixels 100 belonging to the row corresponding to the vertical row address [0], the transfer transistor M1 is turned on, signal charge accumulated in the photoelectric converter PD are transferred to the FD node. The signal Vout in accordance with the amount of the signal charge transferred to the FD node is then output to the vertical output line 106 via the amplifier transistor M4 and the select transistor M5.

In such a way, from each pixel 100 belonging to the row corresponding to the vertical row address [0] of the pixel block 10, the signal Vout [0, 0] is output. Further, from each pixel 100 belonging to the row corresponding to the vertical row address [0] of the pixel block 11, the signal Vout [1, 0] is output. Here, when a case where the region of the pixel block 10 is bright and the region of the pixel block 11 is dark as with the case of FIG. 7 is assumed, the level of the signal Vout [0, 0] is large and the level of the signal Vout [1, 0] is small as illustrated in FIG. 25.

Next, in the period from the time t53 to the time t55, the timing generation unit 4 controls the select signal jdat_en from the low level to the high level. Thereby, the selector 607 is ready to select and output the ramp signal ramp_sig3 out of the ramp signal ramp_sig3 and the output of the selector 606 as the ramp signal ramp_sig.

At the time t53, after the select signal jdat_en is controlled to the high level, the ramp signal generator 53 starts outputting the ramp signal ramp_sig3. The selector 607 outputs the ramp signal ramp_sig3 supplied from the ramp signal generator 53 as the ramp signal ramp_sig supplied to the other terminal of the comparator 600. Note that, as illustrated in FIG. 25, the ramp signal generator 53 controls the level of the ramp signal ramp_sig3 so as to be a constant value after exceeding a certain level.

At the subsequent time t54, the level of the signal Vout [1, 0] output from the pixel 100 of the pixel block 11 matches the level of the ramp signal ramp_sig. Thereby, the signal comp_sig output by the comparator 600 transitions from the high level to the low level. Thereby, the select signal j_sig output from the inverter 608 transitions from the low level to the high level. Thereby, in the AD converter circuit 61 corresponding to the pixel block 11, the selector 606 is ready to select and output the ramp signal ramp_sig1 out of the ramp signal ramp_sig1 and the ramp signal ramp_sig2.

On the other hand, the signal Vout [0, 0] output from the pixel 100 of the pixel block 10 is a signal whose level exceeds the saturation level of the ramp signal ramp_sig3, and the level of the ramp signal ramp_sig3 does not exceed the level of the signal Vout [0, 0]. Thus, the signal comp_sig output by the comparator 600 remains at the high level, and the select signal j_sig output from the inverter 608 remains to the low level. Thereby, in the AD converter circuit 61 corresponding to the pixel block 10, the selector 606 is ready to select and output the ramp signal ramp_sig2 out of the ramp signal ramp_sig1 and the ramp signal ramp_sig2.

In response to transition of the select signal jdat_en to the low level at the time t55, the selector 607 is ready to select and output the output of the selector 606 out of the ramp signal ramp_sig3 and the output of the selector 606 as the ramp signal ramp_sig. Thereby, the ramp signal ramp_sig2 from the ramp signal generator 52 is supplied as the ramp signal ramp_sig to the other input terminal of the comparator 600 of the AD converter circuit 61 corresponding to the pixel block 10. Further, the ramp signal ramp_sig1 from the ramp signal generator 51 is supplied as the ramp signal ramp_sig to the other input terminal of the comparator 600 of the AD converter circuit 61 corresponding to the pixel block 11.

Thereby, it is possible to perform AD conversion on the signals Vout [0, 0] and Vout [1, 0] by using a ramp signal having a suitable slope in accordance with the level of each of the signals Vout [0, 0] and Vout [1, 0]. As a result, a plurality of signals that have been subjected to AD conversion at conversion gains different from each other are output from the single pixel block 10. Here, the ramp signal ramp_sig3 is to provide a threshold used for determining which of the ramp signal ramp_sig1 or the ramp signal ramp_sig2 is used.

At the time t56, the ramp signal generator 51 starts outputting the ramp signal ramp_sig1, and the ramp signal generator 52 starts outputting the ramp signal ramp_sig2. Further, the timing generation unit 4 starts count-up of the count value "count" output to the AD converter circuit 61.

At the subsequent time t57, the level of the signal Vout [0, 0] matches the level of the ramp signal ramp_sig. Thereby, the signal comp_sig output by the comparator 600 transitions from the high level to the low level. In response to receiving the high level signal comp_sig, the latch circuit 601 outputs the latch signal itch to the holding unit 602. The holding unit 602 holds the count value "count" at the time of input of the latch signal itch. FIG. 25 illustrates the case where 500 is held as a count value "count" in the holding unit 602 as an example. This value corresponds to the digital value mem [0] of FIG. 24, for example.

The subsequent time t58, the level of the signal Vout [1, 0] matches the level of the ramp signal ramp_sig. Thereby, the signal comp_sig output by the comparator 600 transitions from the high level to the low level. In response to receiving the high level signal comp_sig, the latch circuit 601 outputs the latch signal itch to the holding unit 602. The holding unit 602 holds the count value "count" at the time of input of the latch signal Itch. FIG. 25 illustrates the case where 1000 is held as a count value "count" in the holding unit 602 as an example. This value corresponds to the digital value mem [2] of FIG. 24, for example.

As described above, according to the present embodiment, in the imaging device that may control exposure time on a pixel block basis, by switching the AD conversion gain in the AD conversion unit, it is possible to amplify an output signal at multiple types of gains. Therefore, for example, with a configuration in which AD conversion is performed at a high gain on a dark (low level) signal and AD conversion is performed at a low gain on a bright (high level) signal, an image in which blacked up shadows or blown out highlights is suppressed over an object to a background may be acquired. Further, in the present embodiment, since a signal level is determined before AD conversion to select a ramp signal suitable for AD conversion, it is not necessary to provide two parallel AD converter circuits on each column as with the fifth embodiment, and it is possible to reduce the circuit area.

Seventh Embodiment

Figure 26:
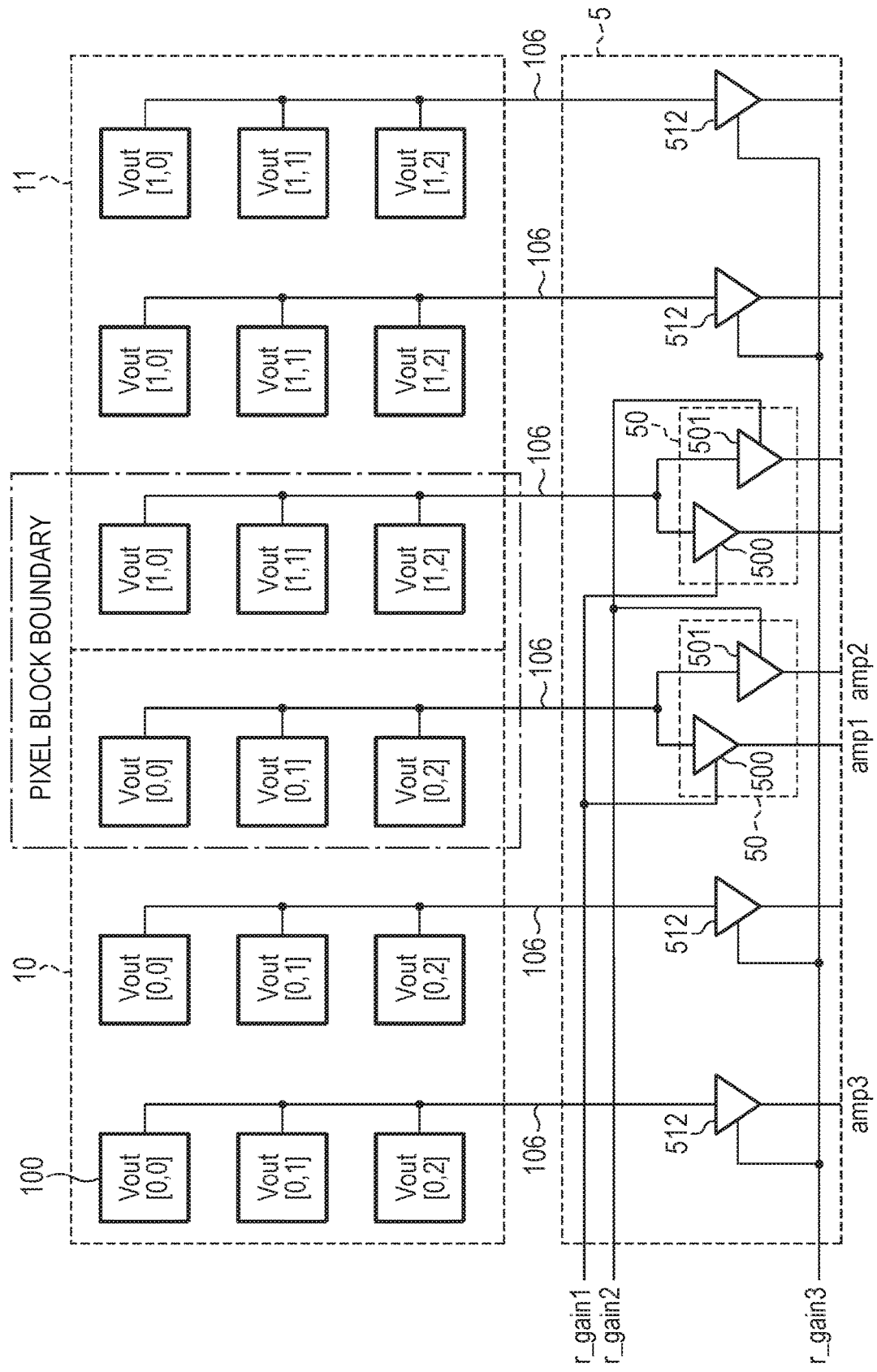
FIG. 26 is a schematic diagram illustrating a configuration example of an amplifier in an imaging device according to a seventh embodiment of the present invention.

An imaging device and a method of driving the same according to a seventh embodiment of the present invention will be described with reference to FIG. 26. Components similar to those of the imaging device according to the first to sixth embodiments are labeled with the same references, and the description thereof will be omitted or simplified. FIG. 26 is a schematic diagram illustrating a configuration example of an amplifier in the imaging device according to the present embodiment.

The imaging device according to the present embodiment is an imaging device in which the configuration of the column amplifier 50 of the amplifier 5 in the imaging device according to the first embodiment is applied to only the output from the pixels 100 at the boundary of the pixel block. For example, as illustrated in FIG. 26, when the third column of the pixel block 10 and the first column of the pixel block 11 are adjacent each other, the amplifier 5 includes the column amplifiers 50 connected to the vertical output lines 106 corresponding to these columns. With respect to these columns, two types of gain settings are possible for the signal Vout output from the pixels 100 as described in the first embodiment. Further, the amplifier 5 includes a column amplifier 512 that is connected to the vertical output line 106 on another column and whose gain is set by a setting value r_gain3 output from the timing generation unit 4. The column amplifier 512 outputs a signal amplified at a predetermined gain (setting value r_gain3) from the output terminal as a signal amp3.

In the imaging device according to the first embodiment, since two column amplifiers 500 and 501 are provided on all the columns, the circuit area of the amplifier 5 is large. In contrast, in the imaging device according to the present embodiment, since two column amplifiers 500 and 501 are provided on only the column located on the boundary of the pixel blocks, an increase of the circuit area of the amplifier 5 may be suppressed.

Further, when exposure time is significantly different between the pixel blocks 10 and 11, even when an object moves over a boundary part between the pixel blocks 10 and 11, a dark signal may be amplified at a high gain, and a bright signal may be amplified at a low gain at the boundary. Thereby, around the boundary, an image in which blacked up shadows or blown out highlights is suppressed over an object to a background may be acquired.

Eighth Embodiment

Figure 27:
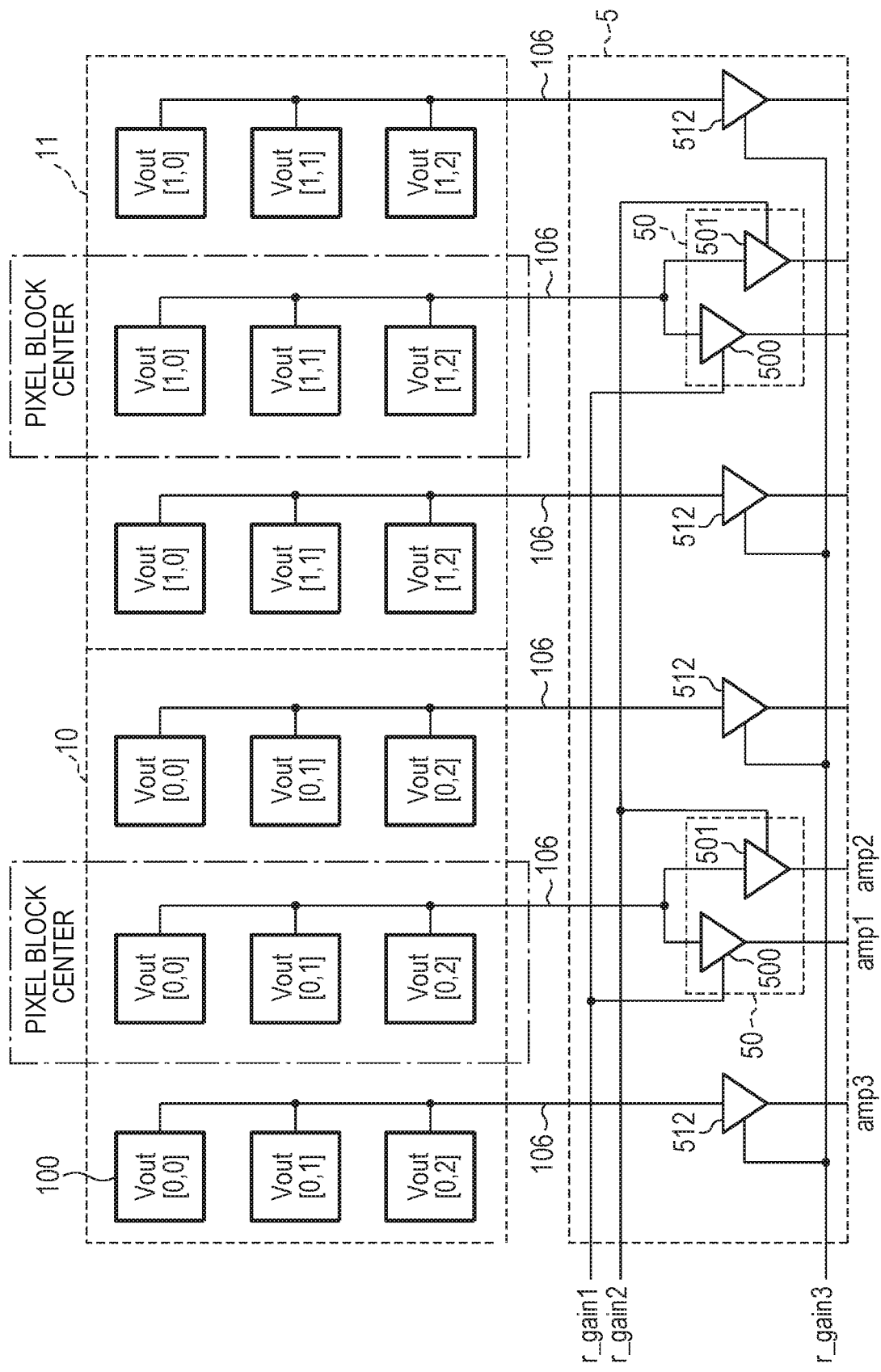
FIG. 27 is a schematic diagram illustrating a configuration example of an amplifier in an imaging device according to an eighth embodiment of the present invention.

An imaging device and a method of driving the same according to an eighth embodiment of the present invention will be described with reference to FIG. 27. Components similar to those of the imaging device according to the first to seventh embodiments are labeled with the same references, and the description thereof will be omitted or simplified. FIG. 27 is a schematic diagram illustrating a configuration example of an amplifier in the imaging device according to the present embodiment.

The imaging device according to the present embodiment is an imaging device in which the configuration of the column amplifier 50 of the amplifier 5 in the imaging device according to the first embodiment is applied to only the output from the pixels 100 at the center part of the pixel block. For example, as illustrated in FIG. 27, when the pixel blocks 10 and 11 each include the pixels 100 arranged on three columns, respectively, the amplifier 5 includes the column amplifiers 50 connected to the vertical output lines 106 corresponding to the second columns of the pixel blocks 10 and 11. With respect to these columns, two types of gain settings are possible for the signal Vout output from the pixels 100 as described in the first embodiment. Further, the amplifier 5 includes a column amplifier 512 that is connected to the vertical output line 106 on another column and whose gain is set by the setting value r_gain3 output from the timing generation unit 4. The column amplifier 512 outputs a signal amplified at a predetermined gain (setting value r_gain3) from the output terminal as the signal amp3.

In the imaging device according to the first embodiment, since two column amplifiers 500 and 501 are provided on all the columns, the circuit area of the amplifier 5 is large. In contrast, in the imaging device according to the present embodiment, since two column amplifiers 500 and 501 are provided on only the column located on the center part of each pixel block, an increase of the circuit area of the amplifier 5 may be suppressed.

Further, in the imaging device according to the present embodiment, a signal of the center part that is representative of a pixel block may be amplified at two different types of gains. Therefore, even in auto exposure control (AE control) to determine exposure amount in advance when the exposure time for each pixel block is determined, a dark signal may be amplified at a high gain, and a bright signal may be amplified at a low gain. Thereby, an image in which blacked up shadows or blown out highlights is suppressed over an object to a background may be acquired.

Ninth Embodiment

Figure 28:
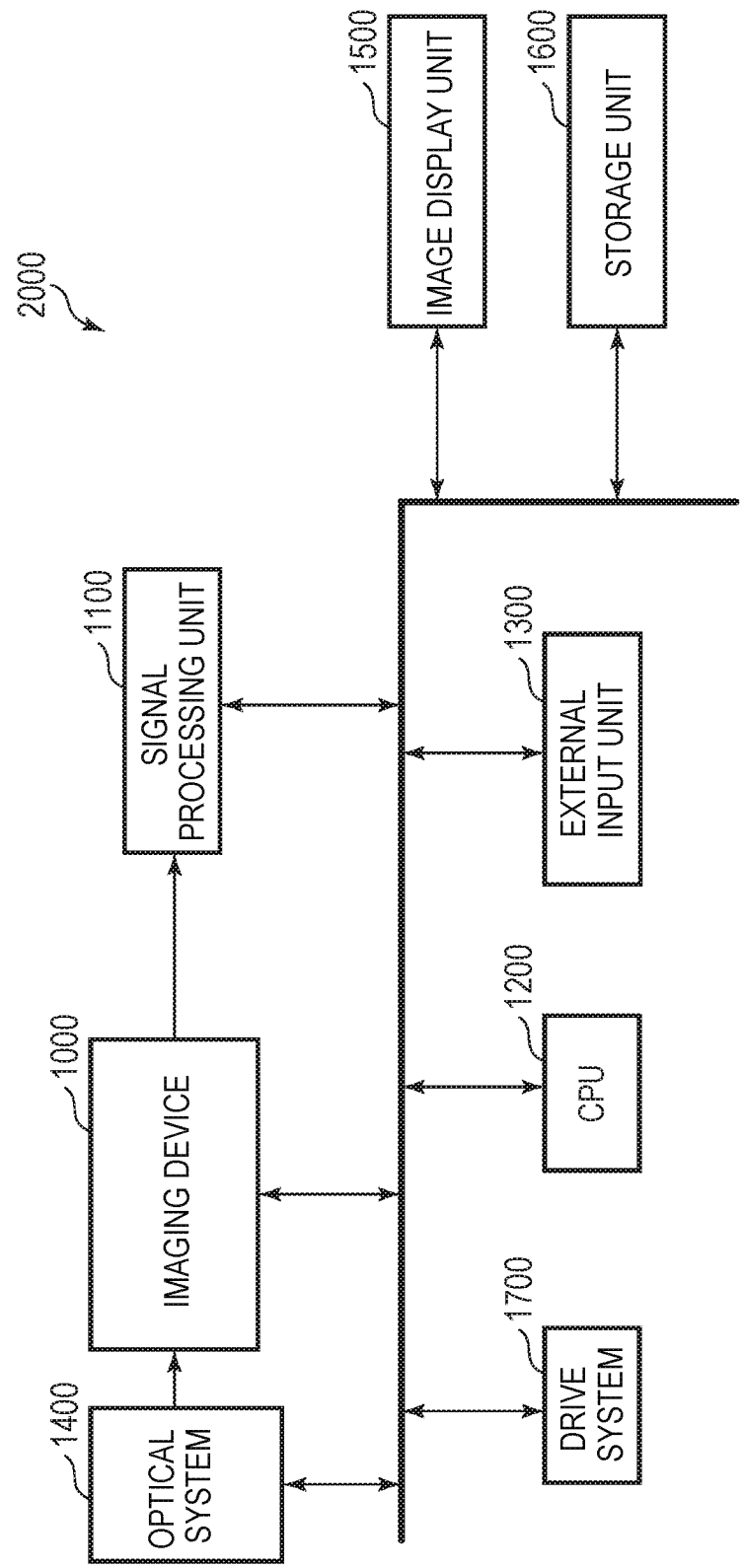
FIG. 28 is a block diagram illustrating a general configuration of an imagine system according to a ninth embodiment of the present invention.
Figure 29:
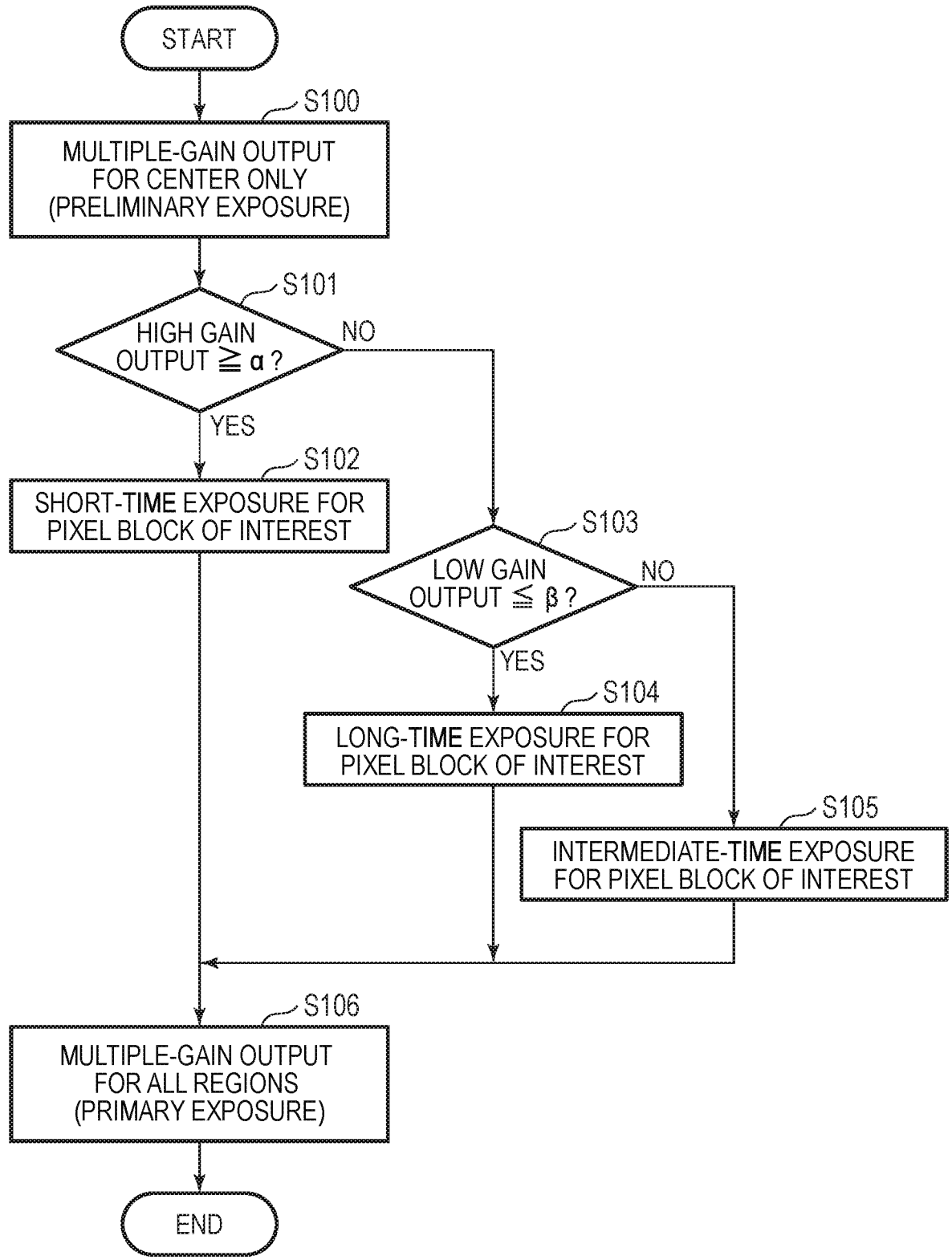
FIG. 29 is a flowchart illustrating a method of driving the imaging system according to the ninth embodiment of the present invention.

An imaging system according to a ninth embodiment of the present invention will be described by using FIG. 28 and FIG. 29. FIG. 28 is a block diagram illustrating the general configuration of the imaging system according to the present embodiment. FIG. 29 is a flowchart illustrating a method of driving the imaging system according to the present embodiment.

The imaging devices 1000 described in the above first to eighth embodiments may be applied to various imaging systems. An example of an applicable imaging system may be a digital still camera, a digital camcorder, a surveillance camera, a copier machine, a fax machine, a mobile phone, an on-vehicle camera, an observation satellite, or the like.

Further, a camera module including an optical system such as a lens and an imaging device is also included in the imaging system. FIG. 28 illustrates a block diagram of a digital still camera as one example of the above.

An imaging system 2000 illustrated in FIG. 28 as an example includes the imaging device 1000, a signal processing unit 1100, a CPU 1200, an external input unit 1300, an optical system 1400, an image display unit 1500, a storage unit 1600, and a drive system 1700.

The imaging device 1000 is the imaging device 1000 described in any of the first to eighth embodiments. Here, description is provided assuming the case where the imaging device 1000 has a configuration that may amplify the output of all the columns at a plurality of gains (the first embodiment). The optical system 1400 captures an optical image of an object on the imaging device 1000. The drive system 1700 drives a lens (not illustrated) or an aperture (not illustrated) forming the optical system 1400. The imaging device 1000 photoelectrically converts an optical image captured by the optical system 1400 to generate an analog image signal and performs AD conversion on this image signal to output the converted image signal.

The signal processing unit 1100 performs predetermined signal processing on an image signal output from the pixel 100 of the imaging device 1000. For example, the signal processing unit 1100 performs various correction processes or compression processes on an image signal and outputs the processed image signal. The image signal processed by the signal processing unit 1100 may be displayed on the image display unit 1500 or stored in the storage unit 1600. The storage unit 1600 may be built in the imaging system 2000 or may be removable from the imaging system 2000 as with a storage medium.

The CPU 1200 is responsible for various operations or the entire control of the digital still camera. The external input unit 1300 accepts information that is externally input such as information on an operation performed by the user on the imaging system 2000. The operation of the user may be, for example, pressing down of a shutter button or the like. The imaging system 2000 may further include a memory unit used for temporarily storing image data, an external interface unit used for communicating with an external computer or the like, or the like.

Next, one example of the operation of the imaging system 2000 according to the present embodiment will be described by using FIG. 29.

It is assumed that a shutter button that is an external input unit 1300 is in a half-pressed state by a user operation. This information is transferred to the imaging device 1000 by communication from the CPU 1200. The imaging device 1000 that has received information from CPU 1200 operates in accordance with a flowchart of FIG. 29.

In the present embodiment, a first drive mode to perform preliminary exposure and determine exposure time for each pixel block and a second drive mode to perform primary exposure based on the exposure time determined in the first drive mode are performed. In the first drive mode, a plurality of signals amplified at different gains are selectively output to each of the plurality of pixel blocks from the pixels 100 located at the center part of each pixel block. In the second drive mode, a plurality of signals are output to each of the plurality of pixel blocks from all the pixels 100 included in each pixel block.

First, under the control of the CPU 1200, the horizontal scanning unit 7 of the imaging device 1000 is controlled to read out a signal of the pixel 100 located at the center part of each pixel block. The readout control by the horizontal scanning unit 7 may be configured to read out only the signal of the pixel 100 of the address corresponding to the center part of the pixel block. Alternatively, when the horizontal scanning unit 7 is formed of a shift register, the control may be configured to scan only the pixels 100 at the center of a pixel block. Each of the signals from the pixels 100 output in such a way is amplified at a plurality of gains (here, two types, namely, a high gain and a low gain) by the amplifier 5 (step S100).

Next, the CPU 1200 determines whether or not, out of the signal read out at a high gain and the signal read out at a low gain from each of the pixel blocks of the imaging device 1000, the value of the signal read out at the high gain is greater than or equal to an arbitrary $\alpha$ value (step S101).

If the value of the signal read out at the high gain is greater than or equal to the $\alpha$ value as a result of the determination in step S101 (in FIG. 29, "YES"), the process proceeds to step S102. The condition of proceeding to step S102 is that the value of the signal read out at the high gain is greater than or equal to the $\alpha$ value and that the object state is significantly bright. Accordingly, the CPU 1200 determines controlling the timing generation unit 4 so that the exposure time is shorter for a pixel block in which the signal value read out at the high gain is greater than or equal to the $\alpha$ value (step S102).

If the value of the signal read out at the high gain is less than the $\alpha$ value as a result of the determination in step S101 (in FIG. 29, "NO"), the process proceeds to step S103. In step S103, the CPU 1200 determines whether or not, out of the signal read out at the high gain and the signal read out at the low gain from each of the pixel blocks of the imaging device 1000, the value of the signal read out at the low gain is less than or equal to an arbitrary $\beta$ value.

If the value of the signal read out at the low gain is less than or equal to the $\beta$ value as a result of the determination in step S103 (in FIG. 29, "YES"), the process proceeds step S104. The condition of proceeding to step S104 is that the value of the signal read out at the low gain is less than or equal to the $\beta$ value and that the object state is significantly dark. Accordingly, the CPU 1200 determines controlling the timing generation unit 4 so that the exposure time is longer for a pixel block in which the signal value read out at the low gain is less than or equal to the $\beta$ value (step S104).

If the value of the signal read out at the low gain is greater than the $\beta$ value as a result of the determination in step S103 (in FIG. 29, "NO"), the process proceeds to step S105. The condition of proceeding to step S105 is that the value of the signal read out at the low gain is greater than the $\beta$ value and the value of the signal read out at the high gain is less than the $\alpha$ value and that the object state is neither too dark nor too bright. Accordingly, the CPU 1200 determines controlling the timing generation unit 4 so that the exposure time is medium for a pixel block in which the value of the signal read out at the low gain is greater than the $\beta$ value and the value of the signal read out at the high gain is less than the $\alpha$ value (step S105).

The information indicating that the exposure time of each of all the pixel blocks has been determined in such a way is displayed on the image display unit 1500. The CPU 1200 determines a value of the aperture based on the determined exposure time of each pixel block and adjusts an aperture of the optical system 1400 via the drive system 1700.

The user who has received the information indicating that the exposure time of each of all the pixel blocks has been determined fully presses the shutter button that is the external input unit 1300, and thereby the process proceeds to step S106. In step S106, capturing of the object is performed by using the exposure time of each pixel block determined in step S102, S104, or S105. At this time, the operation of the horizontal scanning unit 7 controlled to read out only the pixel 100 at the center part of a pixel block in step S100 is changed to read out from all the pixels 100 of a pixel block.

Image data obtained in such a way is displayed on the image display unit 1500 and stored in the storage unit 1600.

As described above, according to the present embodiment, the imaging system to which the imaging device 1000 according to each of the first to eighth embodiments is applied may be realized.

Tenth Embodiment

Figure 30A:
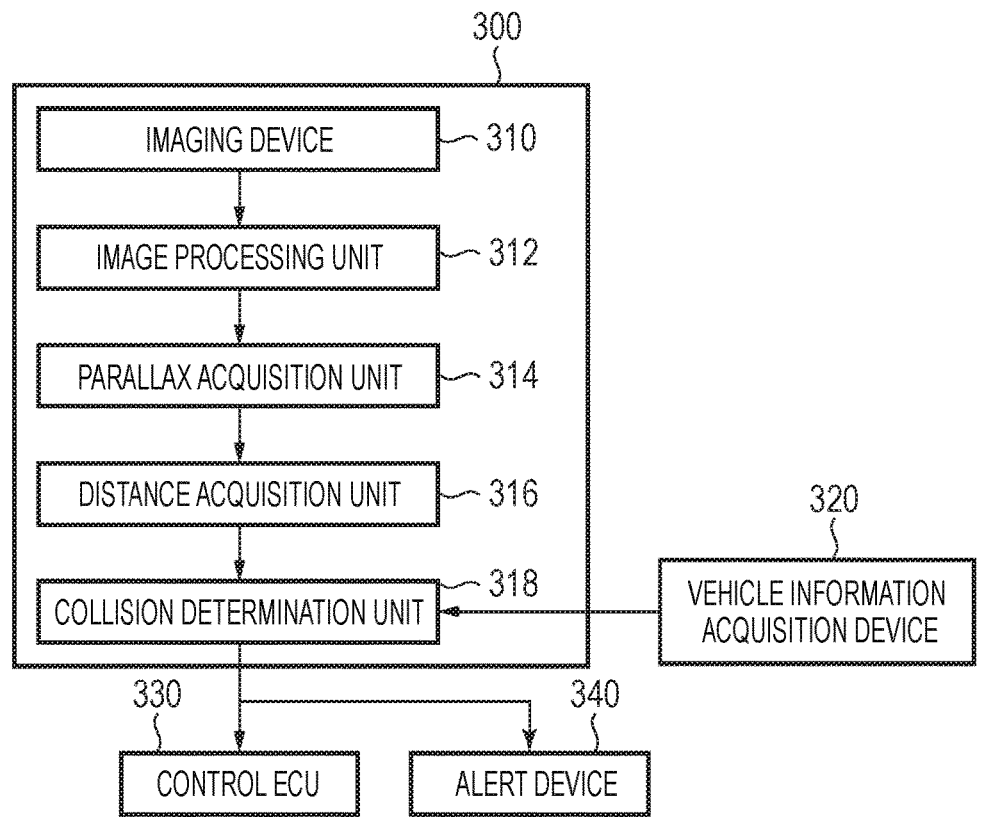
FIG. 30A is a diagram illustrating a configuration example of an imaging system according to a tenth embodiment of the present invention.
Figure 30B:
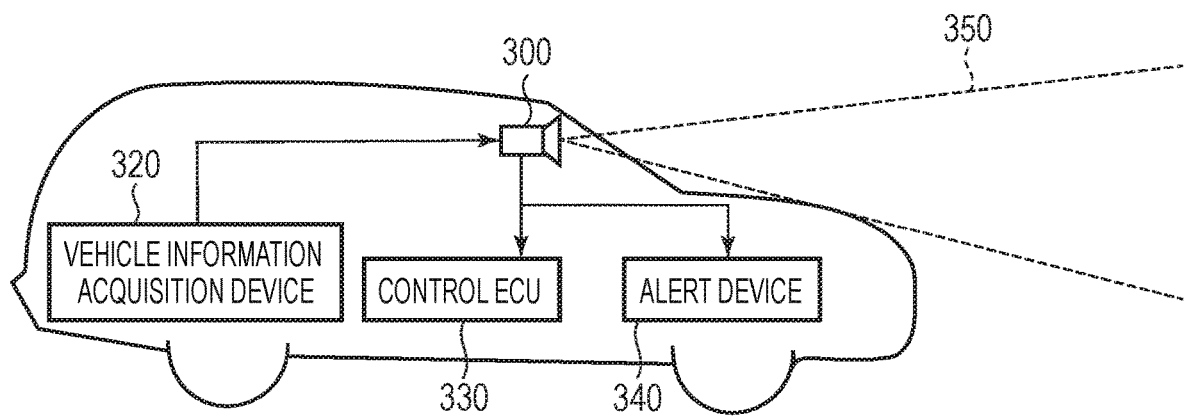
FIG. 30B is a diagram illustrating a configuration example of a movable object according to the tenth embodiment of the present invention.

An imaging system and a movable object according to a tenth embodiment of the present invention will be described with reference to FIG. 30A and FIG. 30B. FIG. 30A is a diagram illustrating a configuration of an imaging system according to the present embodiment. FIG. 30B is a diagram illustrating a configuration of a movable object according to the present embodiment.

FIG. 30A illustrates an example of an imaging system related to an on-vehicle camera. An imaging system 300 includes an imaging device 310. The imaging device 310 is the imaging device 1000 described in any of the above first to eighth embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the above distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 300 is connected to the vehicle information acquisition device 320 and may acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 30B illustrates the imaging system when a front area of a vehicle (a capturing area 350) is captured. The vehicle information acquisition device 320 transmits an instruction to the imaging system 300 or the imaging device 310. Such a configuration may further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and may be applied to a movable object (moving apparatus) such as a ship, an airplane, or an industrial robot, for example. In addition, the imaging system may be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, while the gain of the column amplifier is utilized in the first and second embodiments, the capacitance of the FD node is utilized in the third and fourth embodiments, and the AD conversion gain is utilized in the fifth and sixth embodiments to generate signals amplified at a plurality of gains, these may be combined in any manner.

Further, while signals amplified at a plurality of gains are output in parallel from the pixels 100 in the third embodiment, signals amplified at a plurality of gains may be output in a time division manner. In such a case, as with the case of the fourth embodiment, the select transistors M51 and M52 may be controlled by using separate control signals.

Similarly, while signals amplified at a plurality of gains are output in a time division manner in the fourth embodiment, signals amplified at a plurality of gains may be output in parallel from the pixels 100. In such a case, as with the case of the third embodiment, the vertical output lines 106 and 117 are provided in association with each of the select transistors M51 and M52, and the select transistors M51 and M52 may be controlled by using a common control signal.

Further, the imaging systems illustrated in the above ninth and tenth embodiments are an imaging system example to which the imaging device of the present invention may be applied, and the imaging system to which the imaging device of the present invention may be applied is not limited to the configuration illustrated in FIG. 28 and FIG. 30A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-156189, filed Aug. 23, 2018, which is hereby incorporated by reference herein in its entirety.

What is claimed is:

1. An imaging device comprising:
a plurality of pixels arranged to form a plurality of rows and a plurality of columns and each including a photoelectric converter;
an accumulation time controller that controls a length of accumulation time of the plurality of pixels; and
an amplifier that amplifies a signal based on charge generated by the photoelectric converter,
wherein the plurality of pixels are divided into a plurality of pixel blocks each including at least two of the plurality of pixels,
wherein the plurality of signals correspond to a common frame,
wherein the accumulation time controller sets a length of the accumulation time of each of the plurality of pixel blocks based on levels of the signals of the plurality of pixels that are output in a frame before the common frame,
wherein a length of the accumulation time in the common frame of a first block included in the plurality of pixel blocks is longer than a length of the accumulation time in the common frame of a second block included in the plurality of blocks,
wherein a gain applied by the amplifier to a signal output from a part of pixels included in the first block and a gain applied by the amplifier to a signal output from another part of pixels included in the first block are different from each other, and
wherein a gain applied by the amplifier to a signal output from a part of pixels included in the second block and a gain applied by the amplifier to a signal output from another part of pixels included in the second block are different from each other.

2. The imaging device according to claim 1, wherein the plurality of signals includes two signals obtained by amplifying, at different gains, a signal based on charge accumulated in the photoelectric converter of one of the pixels.

3. The imaging device according to claim 1, wherein the plurality of signals includes a signal obtained by amplifying, at a first gain, a signal based on charge accumulated in the photoelectric converter of a first pixel included in the one pixel block and a signal obtained by amplifying, at a second gain that is different from the first gain, a signal based on charge accumulated in the photoelectric converter of a second pixel included in the one pixel block.

4. The imaging device according to claim 1, wherein the amplifier includes a plurality of column amplifiers arranged on the same column and having different gains and amplifies the signal output from the pixel by the plurality of column amplifiers, respectively, to output the amplified signals in parallel as the plurality of signals.

5. The imaging device according to claim 1, wherein the amplifier includes a column amplifier having a variable gain and amplifies the signal output from the pixel at a plurality of different gains by the column amplifier to output the amplified signals in a time division manner as the plurality of signals.

6. The imaging device according to claim 1, wherein the pixel includes, as the amplifier, a plurality of holding units having capacitance values different from each other, and a plurality of amplifier transistors each provided to corresponding one of the plurality of holding units and configured to output a signal in accordance with a capacitance value of the corresponding one of the holding units and amount of charge transferred from the photoelectric converter and outputs signals output from the plurality of amplifier transistors in parallel as the plurality of signals.

7. The imaging device according to claim 1, wherein the pixel includes, as the amplifier, a plurality of holding units having capacitance values different from each other, and a plurality of amplifier transistors each provided to corresponding one of the plurality of holding units and configured to output a signal in accordance with a capacitance value of the corresponding one of the holding units and amount of charge transferred from the photoelectric converter and outputs signals output from the plurality of amplifier transistors in a time division manner as the plurality of signals.

8. The imaging device according to claim 6, wherein the capacitance value is variable in at least one of the plurality of holding units.

9. The imaging device according to claim 1, wherein the accumulation time controller includes
a vertical scanning unit that supplies a control signal to the plurality of pixels on a row basis,
a horizontal region control unit that supplies a control signal to the plurality of pixels on a column basis, and
a plurality of in-pixel-block control units provided in association with the plurality of pixel blocks, respectively, and configured to control the accumulation time in the photoelectric converter of each of the pixels arranged in a corresponding pixel block based on the control signal supplied from the vertical scanning unit and the control signal supplied from the horizontal region control unit.

10. The imaging device according to claim 1, wherein the pixel that outputs the plurality of signals based on charge accumulated in the photoelectric converter is arranged at a boundary part adjacent to another pixel block.

11. The imaging device according to claim 1, wherein the pixel that outputs the plurality of signals based on charge accumulated in the photoelectric converter is arranged at a center part of the pixel block.

12. The imaging device according to claim 1, wherein a first drive mode to selectively output, for the plurality of pixel blocks, the plurality of signals from the pixels located at a center part of each of the plurality of pixel blocks and a second drive mode to output, for the plurality of pixel blocks, the plurality of signals from all the pixels included in each of the plurality of pixel blocks are provided.

13. The imaging device according to claim 1,
wherein the gains applied by the amplifier to the signals of the pixels included in the first block are set based on levels of signals output from the pixels included in the first block in the common frame, and
wherein the gains applied by the amplifier to the signals of the pixels included in the second block are set based on levels of signals output from the pixels included in the second block in the common frame.

14. An imaging system comprising:
an imaging device, comprising:
a plurality of pixels arranged to form a plurality of rows and a plurality of columns and each including a photoelectric converter;
an accumulation time controller that controls a length of accumulation time of the plurality of pixels; and
an amplifier that amplifies a signal based on charge generated by the photoelectric converter,
wherein the plurality of pixels are divided into a plurality of pixel blocks each including at least two of the plurality of pixels, wherein the plurality of signals correspond to a common frame,
wherein the accumulation time controller sets a length of the accumulation time of each of the plurality of pixel blocks based on levels of the signals of the plurality of pixels that are output in a frame before the common frame,
wherein a length of the accumulation time in the common frame of a first block included in the plurality of pixel blocks is longer than a length of the accumulation time in the common frame of a second block included in the plurality of blocks,
wherein a gain applied by the amplifier to a signal output from a part of pixels included in the first block and a gain applied by the amplifier to a signal output from another part of pixels included in the first block are different from each other, and
wherein a gain applied by the amplifier to a signal output from a part of pixels included in the second block and a gain applied by the amplifier to a signal output from another part of pixels included in the second block are different from each other; and
a signal processing unit that processes signals output from the pixels of the imaging device.

15. A movable object comprising:
an imaging device, comprising:
  a plurality of pixels arranged to form a plurality of rows and a plurality of columns and each including a photoelectric converter;
  an accumulation time controller that controls a length of accumulation time of the plurality of pixels; and
  an amplifier that amplifies a signal based on charge generated by the photoelectric converter,
  wherein the plurality of pixels are divided into a plurality of pixel blocks each including at least two of the plurality of pixels,
  wherein the plurality of signals correspond to a common frame,
  wherein the accumulation time controller sets a length of the accumulation time of each of the plurality of pixel blocks based on levels of the signals of the plurality of pixels that are output in a frame before the common frame,
  wherein a length of the accumulation time in the common frame of a first block included in the plurality of pixel blocks is longer than a length of the accumulation time in the common frame of a second block included in the plurality of blocks,
  wherein a gain applied by the amplifier to a signal output from a part of pixels included in the first block and a gain applied by the amplifier to a signal output from another part of pixels included in the first block are different from each other, and
  wherein a gain applied by the amplifier to a signal output from a part of pixels included in the second block and a gain applied by the amplifier to a signal output from another part of pixels included in the second block are different from each other;
a distance information acquisition unit that acquires distance information on a distance to an object, from a parallax image based on signals from the imaging device; and
a control unit that controls the movable object based on the distance information.

16. An imaging device comprising:
a plurality of pixels arranged to form a plurality of rows and a plurality of columns and each including a photoelectric converter;
an accumulation time controller that controls a length of accumulation time of the plurality of pixels; and
an analog-to-digital (AD) converter that performs AD conversion on an analog signal generated by the pixel,
wherein the plurality of pixels are divided into a plurality of pixel blocks each including at least two of the plurality of pixels,
wherein the plurality of digital signals correspond to a common frame,
wherein the accumulation time controller sets a length of the accumulation time of each of the plurality of pixel blocks based on levels of the signals of the plurality of pixels that are output in a frame before the common frame,
wherein a length of the accumulation time in the common frame of a first block included in the plurality of pixel blocks is longer than a length of the accumulation time in the common frame of a second block included in the plurality of blocks,
wherein a gain applied by the AD converter to a signal output from a part of pixels included in the first block and a gain applied by the AD converter to a signal output from another part of pixels included in the first block are different from each other, and
wherein a gain applied by the AD converter to a signal output from a part of pixels included in the second block and a gain applied by the AD converter to a signal output from another part of pixels included in the second block are different from each other.

17. The imaging device according to claim 16, wherein the plurality of digital signals includes two digital signals obtained by performing AD conversion at different conversion gains on a single analog signal output from one of the pixels.

18. The imaging device according to claim 16, wherein the plurality of digital signals includes a digital signal obtained by performing AD conversion at a first conversion gain on an analog signal generated by a first pixel included in the one pixel block and a digital signal obtained by performing AD conversion at a second conversion gain, which is different from the first conversion gain, on an analog signal generated by a second pixel included in the one pixel block.

19. The imaging device according to claim 16,
wherein the AD converter is configured to convert the analog signal to a digital signal based on a result of comparison between a level of a signal output from the pixel and a level of a ramp signal, and
wherein the AD converter performs AD conversion of different conversion gains on the analog signal by using a plurality of ramp signals having different change rates of a signal level with lapse of time.

20. The imaging device according to claim 16, wherein the AD converter performs AD conversion of different conversion gains in parallel.

21. The imaging device according to claim 16, wherein the AD converter performs AD conversion of different conversion gains in a time division manner.

22. The imaging device according to claim 16, wherein the accumulation time controller includes
a vertical scanning unit that supplies a control signal to the plurality of pixels on a row basis,
a horizontal region control unit that supplies a control signal to the plurality of pixels on a column basis, and a plurality of in-pixel-block control units provided in association with the plurality of pixel blocks, respectively, and configured to control the accumulation time in the photoelectric converter of each of the pixels arranged in a corresponding pixel block based on the control signal supplied from the vertical scanning unit and the control signal supplied from the horizontal region control unit.

23. The imaging device according to claim 16, wherein the pixel that outputs the analog signal based on which the plurality of digital signals are obtained are arranged at a boundary part adjacent to another pixel block.

24. The imaging device according to claim 16, wherein the pixel that outputs the analog signal based on which the plurality of digital signals are obtained are arranged at a center part of the pixel block.

25. The imaging device according to claim 16, wherein a first drive mode to selectively output, for the plurality of pixel blocks, the plurality of signals from the pixels located at a center part of each of the plurality of pixel blocks and a second drive mode to output, for the plurality of pixel blocks, the plurality of signals from all the pixels included in each of the plurality of pixel blocks are provided.

26. The imaging device according to claim 16,
wherein the gains applied by the AD converter to the signals of the pixels included in the first block are set based on levels of signals output from the pixels included in the first block in the common frame, and
wherein the gains applied by the AD converter to the signals of the pixels included in the second block are set based on levels of signals output from the pixels included in the second block in the common frame.

27. An imaging system comprising:
an imaging device, comprising:
a plurality of pixels arranged to form a plurality of rows and a plurality of columns and each including a photoelectric converter;
an accumulation time controller that controls a length of accumulation time of the plurality of pixels; and
an analog-to-digital (AD) converter that performs AD conversion on an analog signal generated by the pixel,
wherein the plurality of pixels are divided into a plurality of pixel blocks each including at least two of the plurality of pixels,
wherein the plurality of digital signals correspond to a common frame,
wherein the accumulation time controller sets a length of the accumulation time of each of the plurality of pixel blocks based on levels of the signals of the plurality of pixels that are output in a frame before the common frame,
wherein a length of the accumulation time in the common frame of a first block included in the plurality of pixel blocks is longer than a length of the accumulation time in the common frame of a second block included in the plurality of blocks,
wherein a gain applied by the AD converter to a signal output from a part of pixels included in the first block and a gain applied by the AD converter to a signal output from another part of pixels included in the first block are different from each other, and
wherein a gain applied by the AD converter to a signal output from a part of pixels included in the second block and a gain applied by the AD converter to a signal output from another part of pixels included in the second block are different from each other; and
a signal processing unit that processes signals output from the pixels of the imaging device.

28. A movable object comprising:
an imaging device, comprising:
a plurality of pixels arranged to form a plurality of rows and a plurality of columns and each including a photoelectric converter;
an accumulation time controller that controls a length of accumulation time of the plurality of pixels; and
an analog-to-digital (AD) converter that performs AD conversion on an analog signal generated by the pixel,
wherein the plurality of pixels are divided into a plurality of pixel blocks each including at least two of the plurality of pixels,
wherein the plurality of digital signals correspond to a common frame,
wherein the accumulation time controller sets a length of the accumulation time of each of the plurality of pixel blocks based on levels of the signals of the plurality of pixels that are output in a frame before the common frame,
wherein a length of the accumulation time in the common frame of a first block included in the plurality of pixel blocks is longer than a length of the accumulation time in the common frame of a second block included in the plurality of blocks,
wherein a gain applied by the AD converter to a signal output from a part of pixels included in the first block and a gain applied by the AD converter to a signal output from another part of pixels included in the first block are different from each other, and
wherein a gain applied by the AD converter to a signal output from a part of pixels included in the second block and a gain applied by the AD converter to a signal output from another part of pixels included in the second block are different from each other;
a distance information acquisition unit that acquires distance information on a distance to an object, from a parallax image based on signals from the imaging device; and
a control unit that controls the movable object based on the distance information.

29. An imaging device comprising:
a plurality of pixels arranged to form a plurality of rows and a plurality of columns and each including a photoelectric converter;
an accumulation time controller that controls a length of accumulation time of the plurality of pixels; and
an analog-to-digital (AD) converter that performs AD conversion on an analog signal generated by the pixel,
wherein the plurality of pixels are divided into a plurality of pixel blocks each including at least two of the plurality of pixels,
wherein the AD converter is configured to output a plurality of digital signals which are obtained by performing AD conversion using a plurality of ramp signals having different slopes on a signal of one pixel of one pixel block of the plurality of pixel blocks,
wherein the plurality of digital signals correspond to a common frame,
wherein the accumulation time controller sets a length of the accumulation time of each of the plurality of pixel blocks based on levels of the signals of the plurality of pixels that are output in a frame before the common frame, wherein a length of the accumulation time in the common frame of a first block included in the plurality of pixel blocks is longer than a length of the accumulation time in the common frame of a second block included in the plurality of blocks, wherein a gain applied by the AD converter to a signal output from a part of pixels included in the first block and a gain applied by the AD converter to a signal output from another part of pixels included in the first block are different from each other, and wherein a gain applied by the AD converter to a signal output from a part of pixels included in the second block and a gain applied by the AD converter to a signal output from another part of pixels included in the second block are different from each other.

30. The imaging device according to claim 29, wherein the plurality of digital signals includes two digital signals obtained by two times of AD conversion using two ramp signals having slops different from each other for a single analog signal generated by one of the pixels.

31. The imaging device according to claim 29, wherein the plurality of digital signals includes a digital signal obtained by performing AD conversion using a ramp signal of a first slope on an analog signal generated by a first pixel included in the one pixel block and a digital signal obtained by performing AD conversion using a ramp signal of a second slope, which is different from the first slope, on an analog signal generated by a second pixel included in the one pixel block.

32. An imaging system comprising:
an imaging device, comprising:
a plurality of pixels arranged to form a plurality of rows and a plurality of columns and each including a photoelectric converter;
an accumulation time controller that controls a length of accumulation time of the plurality of pixels; and
an analog-to-digital (AD) converter that performs AD conversion on an analog signal generated by the pixel,
wherein the plurality of pixels are divided into a plurality of pixel blocks each including at least two of the plurality of pixels,
wherein the AD converter is configured to output a plurality of digital signals which are obtained by performing AD conversion using a plurality of ramp signals having different slopes on a signal of one pixel of one pixel block of the plurality of pixel blocks,
wherein the plurality of digital signals correspond to a common frame,
wherein the accumulation time controller sets a length of the accumulation time of each of the plurality of pixel blocks based on levels of the signals of the plurality of pixels that are output in a frame before the common frame,
wherein a length of the accumulation time in the common frame of a first block included in the plurality of pixel blocks is longer than a length of the accumulation time in the common frame of a second block included in the plurality of blocks,
wherein a gain applied by the AD converter to a signal output from a part of pixels included in the first block and a gain applied by the AD converter to a signal output from another part of pixels included in the first block are different from each other, and
wherein a gain applied by the AD converter to a signal output from a part of pixels included in the second block and a gain applied by the AD converter to a signal output from another part of pixels included in the second block are different from each other; and
a signal processing unit that processes signals output from the pixels of the imaging device.

33. A movable object comprising:
an imaging device, comprising:
a plurality of pixels arranged to form a plurality of rows and a plurality of columns and each including a photoelectric converter;
an accumulation time controller that controls a length of accumulation time of the plurality of pixels; and
an analog-to-digital (AD) converter that performs AD conversion on an analog signal generated by the pixel,
wherein the plurality of pixels are divided into a plurality of pixel blocks each including at least two of the plurality of pixels,
wherein the AD converter is configured to output a plurality of digital signals which are obtained by performing AD conversion using a plurality of ramp signals having different slopes on a signal of one pixel of one pixel block of the plurality of pixel blocks,
wherein the plurality of digital signals correspond to a common frame,
wherein the accumulation time controller sets a length of the accumulation time of each of the plurality of pixel blocks based on levels of the signals of the plurality of pixels that are output in a frame before the common frame,
wherein a length of the accumulation time in the common frame of a first block included in the plurality of pixel blocks is longer than a length of the accumulation time in the common frame of a second block included in the plurality of blocks,
wherein a gain applied by the AD converter to a signal output from a part of pixels included in the first block and a gain applied by the AD converter to a signal output from another part of pixels included in the first block are different from each other, and
wherein a gain applied by the AD converter to a signal output from a part of pixels included in the second block and a gain applied by the AD converter to a signal output from another part of pixels included in the second block are different from each other;
a distance information acquisition unit that acquires distance information on a distance to an object, from a parallax image based on signals from the imaging device; and
a control unit that controls the movable object based on the distance information.

34. An imaging device comprising:
a plurality of pixels arranged to form a plurality of rows and a plurality of columns and each including a photoelectric converter;
an accumulation time controller that controls a length of accumulation time of the plurality of pixels;
an analog-to-digital (AD) converter that performs AD conversion on an analog signal generated by the pixel; and
a first ramp signal generator and a second ramp signal generator, the first ramp signal generator outputting a first ramp signal of a first slope, and the second ramp signal generator outputting a second ramp signal of a second slope larger than the first slope, wherein the plurality of pixels are divided into a plurality of pixel blocks each including at least two of the plurality of pixels, wherein the accumulation time controller is configured to control the accumulation time individually for the plurality of pixel blocks, wherein the plurality of pixel blocks includes a first pixel block and a second pixel black, a signal to be output from a pixel of the second pixel block being brighter than a signal to be output from a pixel of the first pixel block, wherein the AD converter includes a first AD conversion circuit arranged correspondingly to the pixel of the first pixel block and a second AD conversion circuit arranged correspondingly to the pixel of the second pixel block, wherein the first ramp signal generator and the second ramp signal generator are connected to the first AD conversion circuit and the second AD conversion circuit so that each of the first ramp signal output from the first ramp signal generator and the second ramp signal output from the second ramp signal generator are capable of inputting to each of the first AD conversion circuit and the second AD conversion circuit, and wherein, in a common frame, the first AD conversion circuit compares a signal output from the first pixel block with the first ramp signal and the second AD conversion circuit compares a signal output from the second pixel block with the second ramp signal.

35. The imaging device according to claim 34, wherein the first pixel block is a block on which a short-time exposure is performed and the second pixel block is a block on which a long-time exposure is performed.

* * * * *